(12) United States Patent
Yanagawa et al.

(10) Patent No.: US 7,080,399 B1
(45) Date of Patent: Jul. 18, 2006

(54) NETWORK CONTROL SYSTEM, AND CONTROLLER, TARGET AND CONSUMER FOR USE IN THE NETWORK CONTROL SYSTEM

(75) Inventors: Yoshifumi Yanagawa, Kyoto (JP); Hiroyuki Iitsuka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/646,830

(22) PCT Filed: Jan. 21, 2000

(86) PCT No.: PCT/JP00/00307

§ 371 (c)(1),
(2), (4) Date: Nov. 9, 2000

(87) PCT Pub. No.: WO00/44146

PCT Pub. Date: Jul. 27, 2000

(30) Foreign Application Priority Data

Jan. 22, 1999 (JP) .................................. 11-014532
Feb. 26, 1999 (JP) .................................. 11-049488

(51) Int. Cl.
*H04N 7/173* (2006.01)
(52) U.S. Cl. .................... 725/109; 725/93; 725/98; 725/116; 725/118; 725/146
(58) Field of Classification Search .................... 725/98, 725/111, 118, 119, 120, 148, 74, 82, 93, 116, 725/146, 109; 370/232, 253, 392, 395.1, 370/395.51, 395.64, 402; 709/227, 228, 709/229
See application file for complete search history.

(56) References Cited

U.S. PATENT DOCUMENTS 5,668,809 A * 9/1997 Rostoker et al. ............ 370/392

(Continued)

FOREIGN PATENT DOCUMENTS

EP 0637157 A2 2/1995

(Continued)

OTHER PUBLICATIONS

Koji Okamura, "Design and Implementation of Selective RTP Translator", Information Networking, 1998. (ICOIN-12). Proceedings., Twelfth International Conference on Tokyo, Japan Jan. 21-23, 1998, Los Alamitos, CA, USA, IEEE Comput. Soc, US, Jan. 21, 1998, pp. 298-303, XPO10265322 ISBN: 0-8186-7225-0.

*Primary Examiner*—Kieu-Oanh Bui
(74) *Attorney, Agent, or Firm*—Wenderoth, Lind & Ponack, L.L.P.

(57) ABSTRACT

A network control system which transmits mass data efficiently, speedily, and reliably, and which includes a controller that can easily decide what a target has transmitted. The controller and the target are used in this network control system. The network control system includes the a controller for transmitting a message, the target for performing processing according to the message, and an initiator for establishing a connection for data transmission between the controller and the target, and the system performs data transmission by using plural protocols. Either or both of the controller and the target is/are present in a device, and the target is constructed so as to receive a message by a first one of the plural protocols and to transmit data onto the connection by a second one of the plural protocols according to the received message.

33 Claims, 22 Drawing Sheets

U.S. PATENT DOCUMENTS

| | | |
|---|---|---|
| 5,787,259 A | 7/1998 | Haroun et al. |
| 5,867,484 A * | 2/1999 | Shaunfield ............ 370/395.51 |
| 5,872,784 A * | 2/1999 | Rostoker et al. ....... 370/395.64 |
| 6,088,739 A * | 7/2000 | Pugh et al. ................. 719/315 |

FOREIGN PATENT DOCUMENTS

| | | |
|---|---|---|
| EP | 0812091 | 12/1997 |
| EP | 0849884 A1 | 6/1998 |
| EP | 0872986 | 10/1998 |
| EP | 0978965 A1 | 2/2000 |
| JP | 9-149325 | 6/1997 |
| JP | 10-285664 | 10/1998 |
| WO | 98/48543 | 10/1998 |

\* cited by examiner

NETWORK CONTROL SYSTEM, AND CONTROLLER, TARGET AND CONSUMER FOR USE IN THE NETWORK CONTROL SYSTEM

TECHNICAL FIELD

The present invention relates to a network control system for controlling an audio video computer system (hereinafter referred to as "AVC system") comprising devices for handling video data, audio data, information data and the like, and to a target, a controller, and a consumer which are used in this network control system. Especially, the present invention relates to a mass data transmission/reception system for transmitting information for generating, on a screen, a graphical user interface (hereinafter referred to as "GUI") which supports a user operation on the devices, by using graphics, texts and the like.

BACKGROUND ART

In recent years, a device control system has been developed to display graphics and icons comprising data and texts for display on a TV screen so as to indicate the functions of the device, and to control the device by selectively controlling the graphics or icons with a remote controller of the TV. Further, a network control system has been developed to connect digital devices such as a digital VTR by using the IEEE 1394-1995 standard, and to exchange video/audio data between the devices.

Hereinafter, such a network control system will be described briefly.

An AVC system utilizing the conventional network control system is constructed such that each AV device is connected with another AV device by a serial bus which can periodically give a chance of equal communication in a bi-directional packet communication system, without changing the connection of each AV device. A digital interface based on the IEEE 1394 standard is used, for example, as the serial bus.

Each AV device stores its own data for display. The AV device transmits the display data to a controller in response to a request from the controller having a graphic display function, such as a television receiver.

Upon receipt of the display data, the controller displays the display data. When the controller reads the display data, the controller issues a read command to the AV device, and reads desired data as a response from the AV device. When the desired data is larger than the buffer amount in each AV device, the controller repeatedly issues the read command so as to obtain the remaining data.

Further, the controller has the function of inquiring about data that is required for the display of the connected AV device, and the function of controlling the display screen based on the display data that is transmitted from the AV device.

Each AV device has a recording medium which stores the display data, and the function of selecting appropriate display data in response to the inquiry about the display data from the controller.

In the network control system for the AVC system so constructed, the display data is stored in each device (AV device) and the graphics of each device (AV device) are displayed on the screen of the controller by outputting the display data in response to the display request from the controller (television receiver).

Japanese Published Patent Application No. Hei. 9-149325 discloses an example of a conventional network control system, and Japanese Published Patent Application No. Hei. 10-290238 discloses an example of a mass data transmission method.

In the above-described construction, however, the controller must repeatedly issue the command according to the buffer amount of the AV device when the AV device transmits mass data and, therefore, overhead increases and the transmission efficiency of the transmission line is degraded. As the result, the data transmission time is increased.

The present invention is made to solve the above-described problems, and an object of the present invention is to provide a network control system which can transmit mass data such as icon data efficiently, rapidly, and reliably, and which can decide what is transmitted from the target even when the target spontaneously transmits it. Further, another object of the present invention is to provide a controller, a target, and a consumer for the network control system.

SUMMARY OF THE INVENTION

In order to solve the above-described problems, a network control system according to a first aspect of the present invention is a network control system for transmitting data between devices by using plural protocols (data transmission modes), in a network in which at least two devices for handling at least one kind of data among video data, audio data, and information data, are connected through a transmission line. In this network control system, each of the devices includes either or both of at least one controller which transmits a message and at least one target which receives the message and performs processing according to the received message. The network control system comprises, at least, the controller, the target, and an initiator for establishing a connection for data transmission between the controller and the target. The plural protocols comprise a first protocol which comprises message transmission for transmitting the message and a message response which is a response to the message transmission, and a second protocol for data transmission onto the connection which is established by the initiator. Further, the target transmits data onto the connection by using the second protocol according to the message received by the first protocol.

Since the network control system is constructed as described above, an appropriate protocol can be used for mass data such as icon data, which results in rapid data transmission with high transmission efficiency.

A network control system according to a second aspect of the present invention is a network control system for transmitting data between devices by using plural protocols, in a network in which at least two devices for handling at least one kind of data among video data, audio data, and information data, are connected through a transmission line. In this network control system, each of the devices includes either or both of at least one controller which transmits a message and at least one target which receives the message and performs processing according to the received message. The network control system comprises, at least, the controller, the target, and an initiator for establishing a connection for data transmission between the controller and the target. The plural protocols comprise a first protocol which comprises message transmission for transmitting the message and a message response which is a response to the message transmission, and a second protocol for data transmission onto the connection. The initiator establishes, before data transmission, a connection of the second protocol between the controller and the target. When the controller receives the data from the target, the controller makes a data request by using the first protocol. The target transmits the data onto the connection by using the second protocol according to the data request, and the controller receives the data by using the second protocol.

In the network control system so constructed, when a control code and mass data are transmitted, an appropriate protocol can be used for each transmission, which results in satisfactory transmission efficiency. Further, since data transmission and control code transmission do not coexist in the same protocol, a distinction between them is facilitated and, moreover, the processes performed by the controller and the target are simplified, which results in increased processing speed.

A network control system according to a third aspect of the present invention is a network control system for transmitting data between devices by using plural protocols, in a network in which at least two devices for handling at least one kind of data among video data, audio data, and information data, are connected through a transmission line. In this network control system, each of the devices includes either or both of at least one target which receives a message and performs processing according to the received message, and at least one controller which transmits the message and establishes a connection for data transmission with the target. The network control system comprises, at least, the controller and the target. The plural protocols comprise a first protocol which comprises message transmission for transmitting the message and a message response which is a response to the message transmission, and a second protocol for data transmission onto the connection. The controller establishes, before data transmission, a connection of the second protocol to the target. When the controller receives the data from the target, the controller makes a data request by using the first protocol. The target transmits the data onto the connection by using the second protocol according to the data request, and the controller receives the data by using the second protocol.

In the network control system so constructed, an appropriate protocol can be used for mass data, such as icon data, in the relatively simple construction, which results in rapid data transmission with high transmission efficiency.

A network control system according to a fourth aspect of the present invention is a network control system for transmitting data between devices by using plural protocols, in a network in which at least two devices for handling at least one kind of data among video data, audio data, and information data, are connected through a transmission line. In this network control system, each of the devices includes either or both of at least one controller which transmits a message and at least one target which receives the message and performs processing according to the received message. The network control system comprises, at least, the controller, the target, and an initiator for establishing a connection for data transmission between the controller and the target. The plural protocols comprise a first protocol which comprises message transmission for transmitting the message and a message response which is a response to the message transmission, and a second protocol for data transmission onto the connection. The initiator establishes, before data transmission, a connection between the controller and the target by using the second protocol. The target spontaneously transmits data to the controller through the connection by using the second protocol, and the controller receives the data by using the second protocol.

In the network control system is so constructed, rapid data transmission with high transmission efficiency is achieved. Further, since the target can spontaneously transmit data to the controller, the target can transmit mass data such as icon data by an appropriate protocol, and the controller can easily recognize the data transmission.

A network control system according to a fifth aspect of the present invention is a network control system for transmitting data between devices by using plural protocols, in a network in which at least two devices for handling at least one kind of data among video data, audio data, and information data, are connected through a transmission line. In this network control system, each of the devices includes either or both of at least one target which receives a message and performs processing according to the received message, and at least one controller which transmits the message and establishes a connection for data transmission with the target. The network control system comprises, at least, the controller and the target. The plural protocols comprise a first protocol which comprises message transmission for transmitting the message and a message response which is a response to the message transmission, and a second protocol for data transmission onto the connection. The controller establishes, before data transmission, a connection of the second protocol to the target. The target spontaneously transmits data to the controller through the connection by using the second protocol, and the controller receives the data by using the second protocol.

In the network control system so constructed, rapid data transmission with high transmission efficiency is achieved. Further, since the target can spontaneously transmit data to the controller, the target can transmit mass data such as icon data by an appropriate protocol, and the controller can easily recognize the data transmission.

A network control system according to a sixth aspect of the present invention is a network control system for transmitting data between devices by using plural protocols, in a network in which at least two devices for handling at least one kind of data among video data, audio data, and information data, are connected through a transmission line. In this network control system, each of the devices comprises at least one of the following units: at least one controller which receives and transmits a message; at least one target which performs processing according to the message and which includes at least one internal function control means; a consumer which receives data from the target; and an initiator which establishes a connection for data transmission between the target and the consumer. The network control system comprises, at least, the controller, the target, the consumer, and the initiator. The plural protocols comprise a first protocol which comprises message transmission for transmitting the message and a message response which is a response to the message transmission, and a second protocol for data transmission onto the connection. When the internal function control means performs the data transmission, a connection management means in the target connects the output of the internal function control means to the connection of the second protocol, according to a request of the internal function control means.

In the network control system so constructed, an appropriate protocol can be used for mass data such as icon data, which results in rapid data transmission with high transmission efficiency. Further, the initiator need not create an internal connection of the target, and the target can arbitrarily create its internal connection, whereby the target can change the internal connection according to the responsivity of each internal function control means to perform data transmission. As a result, the target can be designed with desired performance. Further, the internal connection of the target can be established as desired, and plural internal function control means can share one connection of the second protocol, whereby the resources such as buffers and plugs which are needed for the second protocol are utilized effectively. As a result, the construction of the target is simplified, and the processing inside the target is simplified, which results in a reduced load on the target. Furthermore, since only one connection is needed even when controlling the target having plural internal function control means, the construction and processing of the controller can be simplified. Moreover, even when a device having a new function comes on, this target can cope with the new function, and the consumer and the controller can easily support this target.

A network control system according to a seventh aspect of the present invention is a network control system for transmitting data between devices by using plural protocols, in a network in which at least two devices for handling at least one kind of data among video data, audio data, and information data, are connected through a transmission line. In the network control system, each of the devices comprises at least one of the following units: at least one controller which receives and transmits a message; at least one target which performs processing according to the message and which includes at least one internal function control means; a consumer which receives data from the target; and an initiator which establishes a connection for data transmission between the target and the consumer. The network control system comprises, at least, the controller, the target, the consumer, and the initiator. The plural protocols comprise a first protocol which comprises message transmission for transmitting the message and a message response which is a response to the message transmission, and a second protocol for data transmission onto the connection. Further, the target transmits data including an identifier which specifies the output source of the data, onto the connection, according to the second protocol.

In the network control system so constructed, since the target used in this system transmits the data including the identifier of the source of the data onto the connection by the second protocol, the consumer can easily identify the transmitted data by using the identifier. That is, the consumer can receive desired data with reliability by the simple construction, and identify the data. Further, when there are plural pieces of target internal function control means of the same kind or when the connection of the second protocol is shared by plural pieces of target internal function control means, the consumer can also decide the transmitter with reliability by the simple construction.

A network control system according to an eighth aspect of the present invention is a network control system for transmitting data between devices by using plural protocols, in a network in which at least two devices for handling at least one kind of data among video data, audio data, and information data, are connected through a transmission line. In this network control system, each of the devices comprises at least one of the following units: at least one controller which receives and transmits a message; a target which performs processing according to the message; a consumer which receives data from the target; and an initiator which establishes a connection for data transmission between the target and the consumer. The network control system comprises, at least, the controller, the target, the consumer, and the initiator. The plural protocols comprise a first protocol which comprises message transmission for transmitting the message and a message response which is a response to the message transmission, and a second protocol for data transmission onto the connection. The controller transmits an identifier which specifies the destination in the consumer, to the target, by using the first protocol. Further, the target transmits the data including the identifier which indicates the destination and which is received by the first protocol, onto the connection, by using the second protocol.

In the network control system so constructed, since the data including the identifier indicating the destination information transmitted by the first protocol is transmitted through the connection of the second protocol, the data can be automatically distributed to an appropriate internal function control means even when the identity of the data is not clear. Therefore, when there are plural pieces of similar controller internal function control means or when the second protocol is shared by plural pieces of controller internal function control means, the data can be reliably transmitted to the destination by the simple construction.

A network control system according to a ninth aspect of the present invention is a network control system for transmitting data between devices by using plural protocols, in a network in which at least two devices for handling at least one kind of data among video data, audio data, and information data, are connected through a transmission line. In this network control system, each of the devices comprises at least one of the following units: at least one controller which receives and transmits a message; at least one target which performs processing according to the message and which includes at least one internal function control means; a consumer which receives data from the target; and an initiator which establishes a connection for data transmission between the target and the consumer. The network control system comprises, at least, the controller, the target, the consumer, and the initiator. The plural protocols comprise a first protocol which comprises message transmission for transmitting the message and a message response which is a response to the message transmission, and a second protocol for data transmission onto the connection. The controller transmits the message by using the first protocol to a plug through which data is input and output to/from a desired internal function control means. The target executes the process which is specified by the message that is directed to the plug.

In the network control system so constructed, the controller transmits the message by using the first protocol to the plug through which data is input and output to/from the internal function control means of the target, and the target operates according to this message. Thereby, the relationship between the connection of the second protocol and the message is defined and, further, the data flowing through the connection of the second protocol can be associated with the message. Further, since the message is transmitted to the plug, the target can easily select a controller for handling the data that is transmitted by using this plug, or the target can easily permit only control from a specific controller. Further, connection and disconnection of the internal connection of the target may be performed by the plug. Since the controller need not establish the connection inside the target, the construction of the network control system is simplified.

A network control system according to a tenth aspect of the present invention is a network control system in accordance with any one of the first through ninth aspects, wherein the message includes a message for confirming the data transmission by the second protocol.

In the network control system so constructed, since confirmation of data transmission by the second protocol and request for retransmission are performed by the first protocol, the data transmission by the second protocol can be reliably performed, whereby the reliability of the system can be improved. Further, even when normal transmission is not performed due to errors not only in the transmission line but also in the controller or target, since the data is checked at both of the transmitter and receiver as described above, these errors can be detected, whereby normal transmission is assured.

A network control system according to an eleventh aspect of the present invention is a network control system in accordance with any one of the first through ninth aspects, wherein the data that is transmitted by the second protocol includes version information, and the version of the data is managed by using the version information.

In the network control system so constructed, since the data that is transmitted by the second protocol has the version information and the version of the data is managed by using the version information, the controller can always check the version information of the received data, whereby the controller can always use the latest data and, further, the reliability is improved. Furthermore, when the controller caches the data, the controller can easily decide whether or not the information in the function chart has been changed, according to the state change in the target. Therefore, the controller can cache the data easily and effectively.

A network control system according to a twelfth aspect of the present invention is a network control system in accordance with any one of the first through ninth aspects, wherein the data that is transmitted by the second protocol is information about a graphical user interface which forces the controller to make a notification to the user.

In the network control system so constructed, since the data to be transmitted by the second protocol is the GUI data which instructs the controller to make a forced message to, the user, when something unusual occurs in the target, a warning or the like by the GUI can be given to the user. Therefore, the user can get the state of the target precisely and speedily.

A network control system according to a thirteenth aspect of the present invention is a network control system in accordance with any one of the first through ninth aspects, wherein the data that is transmitted by the second protocol includes attribute information of the data.

In the network control system so constructed, since the data that is transmitted by the second protocol includes the identifier of the data, the controller can correctly recognize the data which is transmitted by the target by using the second protocol, spontaneously or under control of the controller. Further, since the data that is transmitted by the second protocol includes the attribute information of the data, the controller can check the detail of the data that is transmitted by the target before checking the actual data section of the data. Thereby, the controller can refuse to receive data that cannot be displayed by the controller or the controller can discard such data immediately after reception, whereby the resources inside the controller such as memories can be utilized effectively.

A network control system according to a fourteenth aspect of the present invention is a network control system in accordance with the thirteenth aspect, wherein the attribute information includes an identifier, size information, and a data section.

In the network control system so constructed, since the attribute information includes the identifier, the size information, and the data section, the object is identified by the identifier, and the breaks of the data are defined by the size information, which results in simple and high-speed processing. By making the attribute information common in this format, the processing for each object is simplified, and the system can easily cope with new attribute information. Further, a set of plural pieces of attribute information may be handled as one attribute information with the same effects as mentioned above.

A network control system according to a fifteenth aspect of the present invention is a network control system in accordance with any one of the first through ninth aspects, wherein the data that is transmitted by the second protocol is based on an object as a unit.

In the network control system so constructed, since the data that is transmitted by the second protocol is based on an object as a unit, large-size data can be divided into several objects for every function unit or display unit, whereby the data becomes resistive to errors during transmission and, further, the load on the controller or the target can be reduced.

A network control system according to a sixteenth aspect of the present invention is a network control system in accordance with the fifteenth aspect, wherein the object has the same structure as attribute information of the data transmitted by the second protocol.

In the network control system so constructed, since the object and the attribute information have the same structure, the controller can handle both of the object and the attribute information in the same processing, whereby the processing of the controller is reduced, which results in speedup. Further, the system can cope with various kinds of objects and attribute information.

A network control system according to a seventeenth aspect of the present invention is a network control system in accordance with the fifteenth aspect, wherein the object has an identifier, size information, and a data section.

In the network control system so constructed, since the object includes the identifier, the size information, and the data section, the object is identified by the identifier, and the breaks of data are defined by the size information, which results in simple and high-speed processing. Further, by making the data common in this format, processing for each object is simplified, and the system can easily deal with a new object.

A network control system according to an eighteenth aspect of the present invention is a network control system in accordance with the fifteenth aspect, wherein the object has attribute information in the data section.

In the network control system so constructed, since the object has the attribute information in the data section, the attribute information can be easily detected, whereby processing of the attribute information is simplified.

A controller according to a nineteenth aspect of the present invention is a controller which is used a network control system for transmitting data between devices by using plural protocols, in a network in which at least two devices for handling at least one kind of data among video data, audio data, and information data, are connected through a transmission line. In the network control system, each of the devices includes either or both of at least one controller which transmits a message and at least one target which receives the message and performs processing according to the received message. The network control system comprises, at least, the controller and the target. A connection for data transmission between the controller and the target is established by an initiator or the controller. The plural protocols comprise a first protocol which comprises message transmission for transmitting the message and a message response which is a response to the message transmission, and a second protocol for data transmission onto the connection. Further, the controller supports the plural protocols, transmits the message by using the first protocol, and receives the data from the connection by using the second protocol.

Therefore, a controller is provided which is capable of transmitting mass data rapidly with high transmission efficiency.

A controller according to a twentieth aspect of the present invention is a controller which is used in a network control system for transmitting data between devices by using plural protocols, in a network in which at least two devices for handling at least one kind of data among video data, audio data, and information data, are connected through a transmission line. In this network control system, each of the devices includes either or both of at least one controller which transmits a message and at least one target which receives the message and performs processing according to the received message. The network control system comprises, at least, the controller and the target. A connection for data transmission between the controller and the target is established by an initiator or the controller. The plural protocols comprise a first protocol which comprises message transmission for transmitting the message and a message response which is a response to the message transmission, and a second protocol for data transmission onto the connection. Further, the controller supports the plural protocols, makes a data request by using the first protocol, and receives the data that is transmitted according to the data request, from the connection, by using the second protocol.

Since the controller is so constructed, when transmitting a control code and mass data, an appropriate protocol can be used as desired for each transmission, whereby a controller is obtained which minimizes waste and provides satisfactory transmission efficiency.

A controller according to a twenty-first aspect of the present invention is a controller which is used in a network control system for transmitting data between devices by using plural protocols, in a network in which at least two devices for handling at least one kind of data among video data, audio data, and information data, are connected through a transmission line. In this network control system, each of the devices includes either or both of at least one controller which transmits a message and at least one target which receives the message and performs processing according to the received message. The network control system comprises, at least, the controller and the target. A connection for data transmission between the controller and the target is established by an initiator or the controller. The plural protocols comprise a first protocol which comprises message transmission for transmitting the message and a message response which is a response to the message transmission, and a second protocol for data transmission onto the connection. The controller supports the plural protocols, establishes the connection to the target before data transmission, makes a data request by using the first protocol when receiving data, and receives the data that is transmitted according to the data request, from the connection, by using the second protocol.

Since the controller is so constructed, an appropriate protocol can be used for mass data such as icon data, resulting in a controller which is capable of performing rapid data transmission with high transmission efficiency.

A controller according to a twenty-second aspect of the present invention is a controller which is used in a network control system for transmitting data between devices by using plural protocols, in a network in which at least two devices for handling at least one kind of data among video data, audio data, and information data, are connected through a transmission line. In this network control system, each of the devices includes either or both of at least one controller which transmits a message and at least one target which receives the message and performs processing according to the received message. The network control system comprises, at least, the controller and the target. A connection for data transmission between the controller and the target is established by an initiator or the controller. The plural protocols comprise a first protocol which comprises message transmission for transmitting the message and a message response which is a response to the message transmission, and a second protocol for data transmission onto the connection. The controller supports the plural protocols, and receives the data which is transmitted onto the connection spontaneously by the target using the second protocol.

Therefore, a controller is obtained which is capable of performing rapid data transmission with high transmission efficiency.

A controller according to a twenty-third aspect of the present invention is a controller which is used in a network control system for transmitting data between devices by using plural protocols, in a network in which at least two devices for handling at least one kind of data among video data, audio data, and information data, are connected through a transmission line. In this network control system, each of the devices includes either or both of at least one controller which transmits a message and at least one target which receives the message and performs processing according to the message. The network control system comprises, at least, the controller and the target. A connection for data transmission between the controller and the target is established by an initiator or the controller. The plural protocols comprise a first protocol which comprises message transmission for transmitting the message and a message response which is a response to the message transmission, and a second protocol for data transmission onto the connection. The controller supports the plural protocols, establishes the connection of the second protocol to the target before data transmission, and receives the data which is transmitted onto the connection spontaneously by the target using the second protocol.

Therefore, a controller is obtained which is capable of performing rapid data transmission with high transmission efficiency.

A controller according to a twenty-fourth aspect of the present invention is a controller which is used in a network control system for transmitting data between devices by using plural protocols, in a network in which at least two devices for handling at least one kind of data among video data, audio data, and information data, are connected through a transmission line. In this network control system, each of the devices comprises at least one of the following units: at least one controller which receives and transmits a message; a target which performs processing according to the message; a consumer which receives data from the target; and an initiator which establishes a connection for data transmission between the target and the consumer. The plural protocols comprise a first protocol which comprises message transmission for transmitting the message and a message response which is a response to the message transmission, and a second protocol for data transmission onto the connection. The network control system comprises, at least, the target which transmits data including an identifier indicating the destination and received by the first protocol, onto the connection, by using the second protocol, the controller, the consumer, and the initiator. The controller transmits the identifier indicating the destination in the consumer, to the target, by using the first protocol.

When the controller so constructed is used in the network control system, the data can be automatically distributed to an appropriate internal function control means even when the identity of the data is not clear. Therefore, when there are plural pieces of similar controller internal function control means or when the second protocol is shared by plural pieces of controller internal function control means, the data can be reliably transmitted to the destination by the simple construction.

A controller according to a twenty-fifth aspect of the present invention is a controller which is used in a network control system for transmitting data between devices by using plural protocols, in a network in which at least two devices for handling at least one kind of data among video data, audio data, and information data, are connected through a transmission line. In this network control system, each of the devices comprises at least one of the following units: at least one controller which receives and transmits a message; at least one target which performs processing according to the message and which includes at least one internal function control means; a consumer which receives data from the target, and an initiator which establishes a connection for data transmission between the target and the consumer. The plural protocols comprise a first protocol which comprises message transmission for transmitting the message and a message response which is a response to the message transmission, and a second protocol for data transmission onto the connection. The network control system comprises, at least, the target which executes the process specified by the message that is directed to a plug through which data is input and output to/from a desired internal function control means, the controller, the consumer, and the initiator. Further, the controller transmits the message to the plug by using the first protocol.

When the controller so constructed is used in the network control system, the relationship between the connection of the second protocol and the message is defined and, further, the data flowing through the connection of the second protocol can be associated with the message. Further, since the message is transmitted to the plug, the target can easily select a controller for handling the data that is transmitted by using this plug, or the target can easily permit only control from a specific controller. In addition, connection and disconnection of the internal connection of the target may be performed by the plug. Since the controller need not establish the connection inside the target, the construction of the network control system is simplified.

A target according to a twenty-sixth aspect the present invention is a target which is used in a network control system for transmitting data between devices by using plural protocols, in a network in which at least two devices for handling at least one kind of data among video data, audio data, and information data, are connected through a transmission line. In this network control system, each of the devices includes either or both of at least one controller which transmits a message and at least one target which receives the message and performs processing according to the received message. The network control system comprises, at least, the controller and the target. A connection for data transmission between the controller and the target is established by an initiator or the controller. The plural protocols comprise a first protocol which comprises message transmission for transmitting the message and a message response which is a response to the message transmission, and a second protocol for data transmission onto the connection. The target supports the plural protocols, and transmits the data onto the connection by using the second protocol according to the message received by the first protocol.

Therefore, a target is obtained which is capable of transmitting mass data rapidly and with a high transmission efficiency.

A target according to a twenty-seventh aspect of the present invention is a target which is used in a network control system for transmitting data between devices by using plural protocols, in a network in which at least two devices for handling at least one kind of data among video data, audio data, and information data, are connected through a transmission line. In this network control system, each of the devices includes either or both of at least one controller which transmits a message and at least one target which receives the message and performs processing according to the received message. The network control system comprises, at least, the controller and the target. A connection for data transmission between the controller and the target is established by an initiator or the controller. The plural protocols comprise a first protocol which comprises message transmission for transmitting the message and a message response which is a response to the message transmission, and a second protocol for data transmission onto the connection. The target supports the plural protocols, and transmits the data onto the connection by using the second protocol, according to a data request from the controller by using the first protocol.

In the target so constructed, when a control code and mass data are transmitted, an appropriate protocol can be used as desired for each transmission, which results in a target minimizing waste and providing satisfactory transmission efficiency.

A target according to a twenty-eighth aspect of the present invention a target which is used in a network control system for transmitting data between devices by using plural protocols, in a network in which at least two devices for handling at least one kind of data among video data, audio data, and information data, are connected through a transmission line. In this network control system, each of the devices includes either or both of at least one controller which transmits a message and at least one target which receives the message and performs processing according to the received message. The network control system comprises, at least, the controller and the target. A connection for data transmission between the controller and the target is established by an initiator or the controller. The plural protocols comprise a first protocol which comprises message transmission for transmitting the message and a message response which is a response to the message transmission, and a second protocol for data transmission onto the connection. The target has the plural protocols, and spontaneously transmits the data onto the connection by using the second protocol.

Therefore, a target is obtained which is capable of performing rapid data transmission with high transmission efficiency.

A target according to a twenty-ninth aspect of the present invention is a target which is used in a network control system for transmitting data between devices by using plural protocols, in a network in which at least two devices for handling at least one kind of data among video data, audio data, and information data, are connected through a transmission line. In this network control system, each of the devices comprises at least one of the following units: at least one controller which receives and transmits a message; at least one target which performs processing according to the message and includes at least one internal function control means; a consumer which receives data from the target; and an initiator which establishes a connection for data transmission between the target and the consumer. The network control system comprises, at least, the controller, the target, the consumer, and the initiator. The plural protocols comprise a first protocol which comprises message transmission for transmitting the message and a message response which is a response to the message transmission, and a second protocol for data transmission onto the connection. In the target, when the internal function control means performs the data transmission, a connection management means in the target connects the output of the internal function control means to the connection of the second protocol, according to a request from the internal function control means.

In the target so constructed, the initiator need not create an internal connection of the target, and the target can arbitrarily create its internal connection, whereby the target can change the internal connection according to the responsivity of each internal function control means to perform data transmission. As a result, the target can be designed with desired performance. Further, the internal connection of the target can be established as desired, and plural internal function control means can share one connection of the second protocol, whereby the resources such as buffers and plugs which are needed for the second protocol are utilized effectively. As a result, the construction of the target is simplified, and the processing inside the target is simplified, which results in a reduced load on the target. Furthermore, since only one connection is needed even when controlling the target having plural internal function control means, the construction and processing of the controller can be simplified. Moreover, even when a device having a new function comes on, this target can cope with the device with the new function, and the consumer and the controller can easily support this target.

A target according to a thirtieth aspect of the present invention is a target which is used in a network control system for transmitting data between devices by using plural protocols, in a network in which at least two devices for handling at least one kind of data among video data, audio data, and information data, are connected through a transmission line. In the network control system, each of the devices comprises at least one of the following units: at least one controller which receives and transmits a message; at least one target which performs processing according to the message and which includes at least one internal function control means; a consumer which receives data from the target; and an initiator which establishes a connection for data transmission between the target and the consumer. The network control system comprises, at least, the controller, the target, the consumer, and the initiator. The plural protocols comprise a first protocol which comprises message transmission for transmitting the message and a message response which is a response to the message transmission, and a second protocol for data transmission onto the connection. The target transmits data including an identifier which specifies the output source of the data, onto the connection, by using the second protocol.

When the target so constructed is used in the network control system, the consumer, as a component of this network control system, can easily identify the data that is transmitted. That is, the consumer can reliably receive desired data by a relatively simple construction, and identify the data. Further, when there are plural pieces of target internal function control means of the same kind or when the connection of the second protocol is shared by plural pieces of target internal function control means, the transmitter can be decided reliably by a simple construction.

A target according to a thirty-first aspect of the present invention is a target which is used in a network control system for transmitting data between devices by using plural protocols, in a network in which at least two devices for handling at least one kind of data among video data, audio data, and information data, are connected through a transmission line. In this network control system, each of the devices comprises at least one of the following units: at least one controller which receives and transmits a message; a target which performs processing according to the message; a consumer which receives data from the target; and an initiator which establishes a connection for data transmission between the target and the consumer. The plural protocols comprise a first protocol which comprises message transmission for transmitting the message and a message response which is a response to the message transmission, and a second protocol for data transmission onto the connection. The network control system comprises, at least, the controller which transmits an identifier indicating the destination in the consumer by the first protocol, the target, the consumer, and the initiator. The target transmits data including the identifier indicating the destination and received by the first protocol, onto the connection, by using the second protocol.

When the target so constructed is used in the network control system, the data can be automatically distributed to an appropriate internal function control means even when the identity of the data is not clear. Therefore, when there are plural pieces of similar controller internal function control means or when the second protocol is shared by plural pieces of controller internal function control means, the data can be reliably transmitted to the destination by the simple construction.

A target according to a thirty-second aspect of the present invention is a target which is used in a network control system for transmitting data between devices by using plural protocols, in a network in which at least two devices for handling at least one kind of data among video data, audio data, and information data, are connected through a transmission line. In this network control system, each of the devices comprises at least one of the following units: at least one controller which receives and transmits a message; at least one target which performs processing according to the message and which includes at least one internal function control means; a consumer which receives data from the target; and an initiator which establishes a connection for data transmission between the target and the consumer. The plural protocols comprise a first protocol which comprises message transmission for transmitting the message and a message response which is a response to the message transmission, and a second protocol for data transmission onto the connection. The network control system comprises, at least, the controller which transmits the message by using the first protocol to a plug through which data is input and output to/from a desired internal function control means, the target, the consumer, and the initiator. Further, the target executes the process specified by the message which is directed to the plug.

When the target so constructed is used in the network control system, the relationship between the connection of the second protocol and the message is defined and, further, the data flowing through the connection of the second protocol can be associated with the message. Further, since the message is transmitted to the plug, the target can easily select a controller for handling the data that is transmitted by using this plug, or the target can easily permit only control from a specific controller. Further, connection and disconnection of the internal connection of the target may be performed by the plug. Since the controller need not establish the connection inside the target, the construction of the network control system is simplified.

A consumer according to a thirty-third aspect of the present invention is a consumer which is used in a network control system for transmitting data between devices by using plural protocols, in a network in which at least two devices for handling at least one kind of data among video data, audio data, and information data, are connected through a transmission line. In the network control system, each of the devices comprises at least one of the following units: the consumer; at least one controller which receives and transmits a message; a target which performs processing according to the message; and an initiator which establishes a connection for data transmission between the target and the consumer. The network control system comprises, at least, the controller, the target, the consumer, and the initiator. The plural protocols comprise a first protocol which comprises message transmission for transmitting the message and a message response which is a response to the message transmission, and a second protocol for data transmission onto the connection. The consumer receives data including an identifier identifying the destination in the consumer, which data is transmitted by the target onto the connection by using the second protocol and received from the controller by using the first protocol.

In the consumer so constructed, the consumer which has received the data can easily and rapidly decide an internal function control means inside the consumer to which the received data is to be transmitted, whereby the data can be automatically transmitted to an appropriate internal function control means even when the identity of the data is not clear.

Therefore, when there are plural pieces of similar controller internal function control means or when the second protocol is shared by plural pieces of controller internal function control means, the data can be reliably transmitted to the destination by the simple construction.

DETAILED DESCRIPTION OF THE INVENTION

Hereinafter, embodiments of network control systems according to the present invention will be described with reference to the drawings. The embodiments described hereinafter are merely examples, and the present invention is not restricted thereto.

Figure 1:
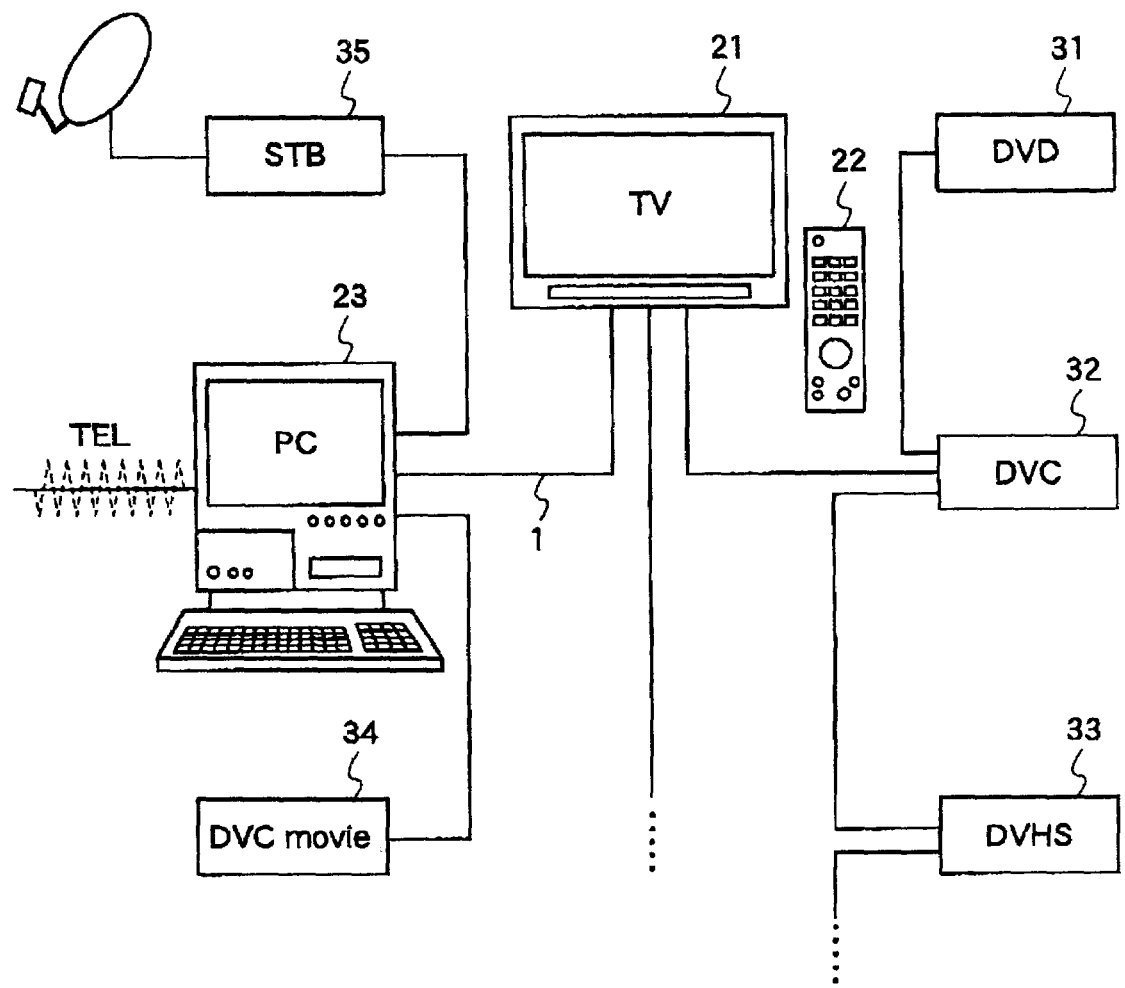
FIG. 1 is a system configuration diagram illustrating an example of a network control system according to a first embodiment of the present invention.

As a network construction of an AVC system utilizing a network control system described hereinafter, for example, a construction comprising video/audio/information devices as shown in FIG. 1 is considered. A "target" described in this specification is an object to be controlled, and a "controller" is a device for controlling the object to be controlled. Further, a "consumer" is a device for receiving data from the target, and an "initiator" is a device for creating a connection based on a second protocol between the target and the consumer. Further, in this specification, video/audio/information devices are called a "device", and these devices include not only existing video/audio/information devices such as printers and minidisks but also devices relating to these fields which will be developed in the future. An arbitrary combination of a target, a controller, a consumer, and an initiator may coexist in one device, or only one of them may exist in one device. Further, one device may include plural controllers, plural targets, plural consumers, and plural initiators.

Further, each device corresponds to one node on the transmission line, and it may be constructed such that plural nodes are included in one body.

When one device includes plural targets, or when one device has different functions, or when one device has plural targets, controllers, consumers, or initiators, the respective constituents, i.e., targets, controllers, consumers, or initiators, described hereinafter may be shared with another function or means.

"Plugs" in the following description indicate openings for inputting and outputting data, and these plugs are logical plugs. For example, these plugs possess respective plug numbers so that they are distinguished from each other with their plug numbers. Further, these plug numbers may be constructed by one-to-one correspondence with IO (Input/Output) addresses or the like.

FIRST EMBODIMENT

Initially, with reference to the drawings a description will be given of a network of an AVC system utilizing a network control system according to the present invention.

FIG. 1 is a diagram illustrating an example of a system construction according to a first embodiment of the invention. In this first embodiment, reference numeral 21 denotes a TV, reference numeral 22 denotes a remote controller of the TV 21, reference numeral 23 denotes a personal computer (hereinafter, referred to as "PC"), reference numeral 31 denotes a digital video disk (hereinafter referred to as "DVD") which is capable of recording and playback, reference numeral 32 denotes a digital video system (hereinafter referred to as "DV system") digital VTR (hereinafter referred to as "DVC"), reference numeral 33 denotes a VHS system digital VTR (hereinafter referred to as "DVHS"), reference numeral 34 denotes a DV system digital movie (hereinafter referred to as "DVC movie"), and reference numeral 35 denotes a set-top box (hereinafter referred to as "STB") for CS digital broadcasting or the like. These devices are connected through a transmission line 1 to constitute an AVC system as shown in FIG. 1.

The TV 21 is a device comprising a controller and a target (in this case, a ground wave tuner and a video monitor), and the user gives an instruction to a display/function selection means 14 by using the remote controller 22.

The PC 23 is a device comprising a controller and a target (in this case, a modem interfacing with a telephone line, and a video monitor), and the user gives an instruction to a display/function selection means 14 by using a keyboard or a mouse.

Each of the TV 21 and the PC 23 is defined as a device in which the target and the controller are united. Amongst the target functions in the device, the functions which are accessible from another device are written in a function chart 8 described later, but the device does not enter its own functions in a function database 13 of the controller in the device. The reason therefor will be described later in the description of the controller.

The TV 21 or the PC 23 may be defined as a device comprising a target and a controller and having a function chart 8 for each target in the device. In this case, each function chart 8 of the device may be entered in a function database 13 of the controller in the device which will be described later.

The DVD 31 and the DVC movie 34 are targets which are capable of recording and playing AV data. Further, the DVC 32 and the DVHS 33 are devices each comprising a target which is capable of recording and playing AV data, and a target having a digital broadcasting tuner function. The STB 35 is a target having a tuner function for receiving CS digital broadcasting.

Although the DVD 31, the DVC 32, the DVHS 33, the DVC movie 34, and the STB 35 are described as targets, each of them may be a device comprising a controller and a target as long as such a device realizes an environment for controlling another target with a liquid crystal panel or the like regardless of the size of the device, and the device permits the user to select the function of another target with a touch panel or a remote controller.

Further, each of the above-described devices constituting the AVC system may be constructed such that it functions as a controller and includes a remote controller, only the display and audio are shown on a monitor by analog connection or the like, and the user controls the device with the remote controller while watching the monitor screen. In this case, the device may be a device including a controller and a target.

Hereinafter, with reference to the drawings a description will be given of a target which is used for the network control system for the AVC system so constructed.

Figure 2:
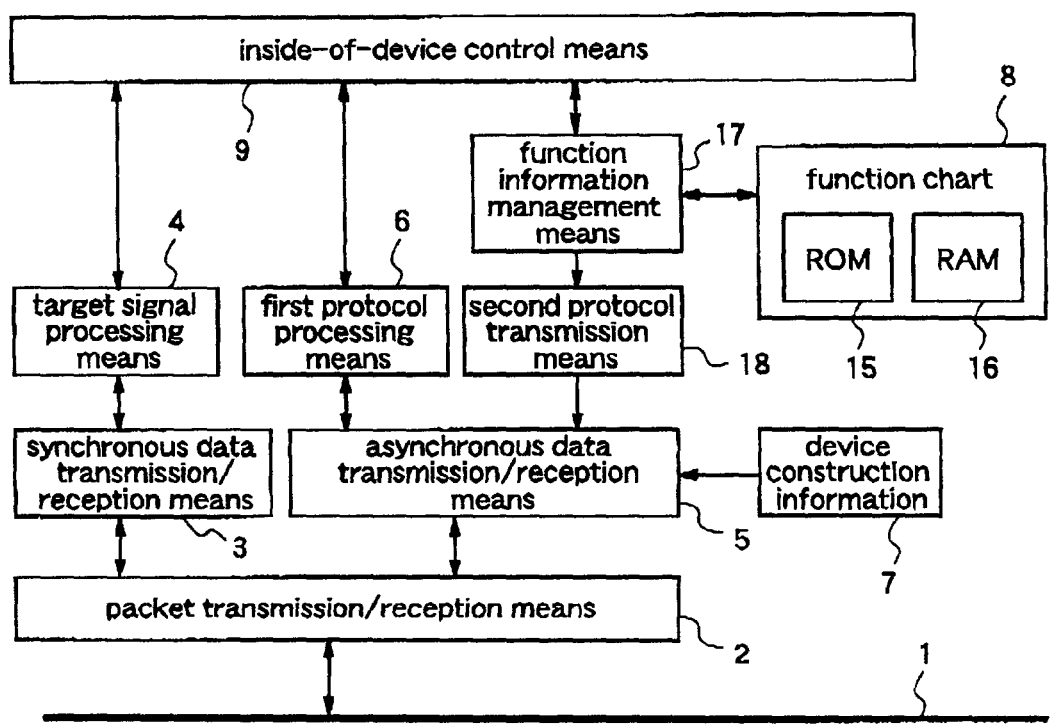
FIG. 2 is a block diagram illustrating a target in the network control system according to the first embodiment of the present invention.

FIG. 2 is a block diagram of a target which is included in the network control system according to the first embodiment. Hereinafter, constituents of the target and the operations of the respective constituents will be described.

In FIG. 2, reference numeral 1 denotes a transmission line, reference numeral 2 denotes a packet transmission/reception means, reference numeral 3 denotes a synchronous data transmission/reception means, reference numeral 4 denotes a target signal processing means, reference numeral 5 denotes an asynchronous data transmission/reception means, reference numeral 6 denotes a first protocol processing means, reference numeral 7 denotes device construction (configuration) information, reference numeral 8 denotes a function chart, reference numeral 9 denotes an inside-of-device control means, reference numeral 15 denotes a read only memory (ROM) in which a part of the function chart 8 is placed, reference numeral 16 denotes a random access memory (RAM) in which a part of the function chart 8 is placed, reference numeral 17 denotes a function information management means, and reference numeral 18 denotes a second protocol transmission means.

The transmission line 1 is, for example, a serial bus (1394 bus) which is defined by the IEEE 1394 standard (IEEE1394-1995 and upper standard having compatibility with this). The transmission line 1 is not necessarily the 1394 bus, and it may be an ATM, the Ethernet, or an infrared transmission line.

Next, the packet transmission/reception means 2 physically and electrically interfaces with the transmission line 1, and performs arbitration of the right to use the bus, cycle control for synchronous transmission, and the like. Further, the packet transmission/reception means 2 selects a packet on the transmission line 1 according to its destination, and transmits the packet onto the transmission line 1.

The synchronous data transmission/reception means 3 performs, when transmitting data, management of the transmission rate (division of data), and addition of headers. For example, when using the AV protocol (IEC 61883) standard of the 1394 bus, the synchronous data transmission/reception 3 performs addition of CIP (Common Isochronous Packet) headers. When receiving data, the synchronous data transmission/reception 3 performs rearrangement of received packets in correct order, and removal of headers from the packets.

The target signal processing means 4 receives synchronous data from the synchronous data transmission/reception means 3, and performs signal processing according to the target. For example, when the target is a recording/playback device such as a DVC, the target signal processing means 4 records the synchronous data on a recording medium such as a magnetic tape. Further, the target signal processing means 4 takes the synchronous data from a recording medium, a broadcast wave or the like, and transmits it to the synchronous data transmission/reception means 3.

The asynchronous data transmission/reception means 5 performs transaction of the asynchronous data according to the transmission line 1. For example, when the transmission line 1 is the 1394 bus, the asynchronous data transmission/reception means 5 performs read transaction, write transaction, locked transaction or the like. The asynchronous data transmission/reception means 5 may be constituted by software. The asynchronous data transmission/reception means 5 may transmit or receive an acknowledge signal to a request (e.g., read request) or a response (e.g., read response), amongst these transactions. However, this acknowledge signal is omitted in the description of the present invention.

The first protocol processing means 6 processes the asynchronous data (message) that is supplied from the asynchronous data transmission/reception means 5, transmits the message to an appropriate constituent of the target, and responds to the controller according to the first protocol.

When using, as the first protocol, the AV/C command (Audio/video Control Digital Interface Command Set) which is discussed in the FCP and the 1394 TA (1394 Trade Association) of the AV protocol (IEC 61883) standard, the first protocol processing means 6 operates so as to convert the received message to a message which is available in the target, and to respond to the received message according to the first protocol. For example, when the received message is a request for data, the first protocol processing means 6 judges the effectiveness of the received message, and when the message is effective, the first protocol processing means 6 acknowledges the receipt of the message to the controller and, simultaneously, instructs the inside of device control means 9 to execute the function corresponding to the request of data.

Further, the first protocol processing means 6 can transmit asynchronous data (message) and, at this time, the first protocol processing means 6 converts the message which is available in the target to the message to be used in the first protocol, and waits for a response to the message so as to understand it. In this case, when the controller requests to read the device configuration information 7, the asynchronous data transmission/reception means 5 transmits the information that is written in the device construction information 7 to the controller according to the received request.

The asynchronous data transmission/reception means 5 and the first protocol processing means 6 may be constructed as one means.

The device configuration information 7 indicates the information about the configuration of the device. As for the method of describing the device configuration information 7, for example, it may be described according to the rule indicated by the configuration ROM of the CSR (Command and Status Registers) architecture indicated by the ISO/IEC13213:1994 standard. When using the 1394 bus, the device configuration information 7 includes a unit directory including information about the bus corresponding to the device as to whether or not the bus manager or isochronous operation is supported and information as to whether or not the AV protocol is supported, and an unique ID that is an identifier of this device. Further, information about the target is also described in the device configuration information 7.

The target information is, for example, the kind of protocol or command which is supported by the target, the target type which is obtained by coding the type of the target, the version information of the target, etc.

The target type is information by which the outline of the function of the target is known, such as a VTR or a STB. For example, the target type may be indicated by a code or text string that is indicated by the subunit type of the AV/C digital interface command set (AV/C-CTS) as discussed by the 1394 TA.

The target information may include information indicating the feature of the function chart 8 described later, in addition to those mentioned above, and the support level, size and the like of the function chart 8 may be described as unique information. Thereby, before the controller reads the information of the function chart 8, the controller itself can decide whether or not the function chart 8 is in the supportable level or how large of a memory space should be reserved, whereby needless transmission can be avoided.

Further, the target information may include user interface information of the target. The user interface information may be the target name expressed by a character string, the model name that is the model number of the product which is indicated by a character string by the maker, a still-picture object indicating the target such as an icon of the target, etc.

Hereinafter, the function chart 8 will be described. The function chart 8 is a chart showing the operation display information for constituting the operation display of the target mentioned above, that is, the information showing the functions and states of the target. The function chart 8 includes objects which are required for constituting the operation display of the target, and each object includes ID information for identifying the object, for example, an ID number or information indicating the type of the object.

The objects will now be described briefly. As long as the objects can be identified, the target may use arbitrary characters or numbers as the ID information, and the meaning of the characters or numbers may be unique to the target. Thereby, the load on the target when the target assigns the ID information can be reduced.

The objects are as follows: display data such as text data or still-picture data; display parts each indicating the display data and its attribute information; groups each comprising several pieces of display parts; and a panel which is used as a menu indicating the operations and states of the target, on which the display elements such as the display parts and the groups are put together. Each display part comprises the following display data: still-picture data of an operation button or the like of the device; text data indicating a function or the like; audio data such as an effective sound; and a program code including still-picture data and text data. The display part may have attribute information.

The information of the object is as follows: a data object comprising display data; a list of the display parts and the display elements; attribute information such as various kinds of header information and unique information; and ID information.

Each object has a list type hierarchical structure, and in the following description, each data object and its list are called an "object". However, each object does not necessarily have the list structure, and each object may be composed of only the data object or the attribute data and the data object, as long as it can be identified by the ID information or the like.

Information of the function chart 8 comprising these data is transmitted to the controller, through the function information management means 17, the second protocol processing means 18, and the asynchronous data transmission/reception means 5, in response to a request from the controller on the transmission line 1.

The function chart 8 is stored in the ROM 15 and the RAM 16. To be specific, the information which is unique to the target and thus not rewritten frequently, i.e., the objects such as the still-picture data indicating the operation button of the target, are stored in the ROM 15. The ROM 15 may be implemented by a flash ROM. When using a flash ROM, the functions of the device can be rewritten.

Further, in the RAM 16 where the function chart 8 is stored, the controller on the transmission line 1 or the inside-of-device control means 9 writes the objects as required through the function information management means 17. The information so written is contents information, operating state information, or the like.

When the target is a broadcast receiver such as a STB, the contents information is program information such as the title of a program which is currently broadcast, the title image, the theme music, the outline, the cast, and the like. When the target is a recorder for recording data on a DVD or the like, the contents information is information which is recorded on the DVD disk such as the title, the title image, the theme music, the outline, the cast, and the like.

In the case of a VTR, the operating state information is the objects corresponding to the display parts indicating the operating states of the device, such as "playback", "fast-reverse", "programming", and the like.

Further, the following information may be written in the RAM 16: information which is required for network control such as the ID information of the controller which uses this target; the date of a reserved program; and the channel number.

In this description, the information indicating the states of the target includes the contents information and the operating state information described above. Further, the information indicating the states of the target also includes the state of each display part such as the still picture when the user pushes the playback button of the VTR, and the still picture when the user releases the button.

The function information management means 17 will now be described. The function information management means 17 performs conversion of the object ID information indicating the object ID or the type of the object into an address in the ROM 15 or the RAM 16, and performs management of each object. Further, in addition to converting the object ID information into the address, the function information management means 17 assigns a new address when the display part is updated since the data size increases and therefore the data cannot be written in the original address area.

Accordingly, the function information management means 17 can read and write each object, according to the object ID information, from the controller on the transmission line 1, the inside-of-device control means 9, and the first protocol processing means 6.

When the address of each object is known in advance, the object may be read or written by using the address of the ROM 15 or the RAM 16. Further, the display part or the like can be read or written by using a combination of them, and the display part can be read or written according to the relative address in the display part which is indicated by the object ID information.

The function information management means 17 manages the object ID information as follows. When a new object is added, the function information management means 17 provides this object with ID information that is not used by other objects, and when an object is deleted, the function information management means 17 nullifies the ID information of this object.

Further, when the object is changed by the target itself, the function information management means 17 spontaneously transmits the changed object to the controller. Therefore, the controller need not observe the object which might be changed, whereby the processing of the controller is reduced, and therefore, the controller can deal with the objects indicating the status information and the contents information which change momentarily.

When the function information management means 17 is provided with a notification range for notifying the controller that the information within a specific range of the target has been changed, the controller is prevented from being given undesired data at an arbitrary point of time from the target, therefore, the controller is prevented from processing the undesired data. As a result, the processing efficiency is increased.

The function information management means 17 may transmit only the ID information of the changed object to the controller instead of transmitting the changed object to the controller. In this case, the controller sends a request for transmission of the changed object by the first protocol by using the ID information of the object, and obtains the changed object by using the second protocol.

The inside-of-device control means 9 will now be described. The inside-of-device control means 9 is for controlling the respective constituents including the mechanism inside the target. When the data received by the first protocol processing means 6 is the control code indicating the operation of the target, the first protocol processing means 6 instructs the inside-of-device control means 9 to perform an operation according to this control code.

Further, the inside-of-device control means 9 processes the information in the notification range which is included in the data request from the controller. The notification range which is included in the data request from the controller is a range in which the target notifies the change when the state or function of the target has been changed. A range which is desired by the controller is designated as the notification range to be included in the data request from the controller.

That is, the inside-of-device control means 9 obtains information about the notification-range from the data request from the controller, and when the state or function of the target is changed, the inside-of-device control means 9 notifies the controller of the change in this notification range by using the second protocol. Either the whole function chart 8 (all of the information that is included in the function chart 8) or each constituent of the function chart 8, that is, either a panel unit or a display part unit, is designated as the notification range. When there are plural controllers, the inside-of-device control means 9 informs the change to only the controller whose notification range includes the changed state or function, according to the notification range of each controller.

Although the notification range is either the whole function chart 8 or each constituent of the function chart 8, the whole target including the function chart 8 and the target information may be designated as the notification range, with the same effects as described above.

The inside-of-device control means 9 performs version management for the information in the function chart 8, in addition to the operations mentioned above. The version number used for the version management is generated by using a counter, and the inside-of-device control means 9 increments the counter inside a version data generation means each time the information stored in the RAM 16 in the function chart 8 is changed by the function information management means 17.

The version data which is indicated by the counter value includes function chart version information indicating the version of the function chart 8, and constituent version information indicating the version of each constituent of the function chart 8 such as the function menu, the display part, the data object, etc.

When the target receives a message from the controller indicating a request for data in the target, the target transmits the data to the controller. Since the version data corresponding to this data is included in this data, the controller can confirm the version data of the received data. That is, the controller can always use the latest data, and the reliability of the data is increased. Further, when the controller caches the data, the controller can easily decide whether or not the information in the function chart 8 is changed, according to the state change in the target, whereby the controller can cache the data easily and effectively.

The second protocol used by this target will now be described. The second protocol is a protocol different from the first protocol. In the second protocol, data transmission is performed after creating a connection between a transmitter and a receiver, and a response is sent back to only a certain transmitter.

For example, the transmission mode, such as the address where data is to be written and the buffer size for continuous writing, is initially decided by exchanging information between the transmitter and the receiver, and a connection is created. Then, data is written in the receiver by continuously performing a plurality of 1394 write transactions. As an example of this method, there is Asynchronous Serial Bus Connections discussed in the 1394TA.

Further, as another example of the second protocol which is applicable to this target, there is stream data to be transmitted by using the Isochronous transmission method according to the IEEE 1394-1995. This stream data is data of an audio or video signal. In this case, bit map data or the like can be laid as GUI data over the audio or video stream data. Further, the GUI data is, for example, bit map format data which is known as icon, still-picture animation, JPEG, or HIP, or AIFF audio format data used for effective sound or the like.

The second protocol transmission means 18 performs processing at the target end of the second protocol, i.e., the processing at the transmitter. The second protocol tranmission means 18 receives the information of the function chart 8 from the function information management means 17, and performs data transmission through the asynchronous data transmission/reception means 5. The connection/disconnection of the target to the connection is performed by the inside-of-device control means 9 by using the first protocol, through the first protocol processing means 6 and the asynchronous data transmission/reception means 5.

Hereinafter, a description will be given of the operation of the target comprising the above-described constituents, in response to a request from the controller.

Initially, when the target is connected to the transmission line 1 or the controller is connected to the transmission line 1, the controller reads the device construction information 7 of the target, confirms the location of the information relating to the target (e.g., the type of the device, and the presence or absence of GUI data), and reads the information. The device construction information 7 may have the address information of the function chart 8, or the device construction information 7 may show only the existence thereof.

Next, the controller creates a connection for the second protocol between itself and the target. Then, the controller issues, to the target, a data request which requests the objects in the function chart 8 (i.e., the panel, the display parts, and like) so as to obtain the information of the function chart 8. At this time, the controller may issue a command requesting a part of the function chart 8, e.g., only a display part, so as to obtain only the display part and its ID.

Further, when the target receives the control code and the user operation information from the controller, the target performs the processing indicated by the control code and the user operation information, according to the situation. For example, with respect to an object such as a display part indicating the function of the target, when the control code of this object is transmitted from the controller to the target together with "selection" as the user operation information, the asynchronous data transmission/reception means 5 instructs the inside-of-device control means 9 to execute the function which is indicated by this object. As the control code of the object, the ID information of the object, such as the ID information of the display part, is used.

In this way, the target presents only the information of the function chart 8 in response to the request for the GUI data from the controller, whereby the load on the target can be reduced. Further, it is not necessary for the group of standardization to define a command for each function of the target, and even when the target has a new function which cannot be supposed at present, the user can easily use this new function through the transmission line 1.

In the target described above, the constituents such as the synchronous data transmission/reception means 3 and the target signal processing means 4 may be arbitrarily constructed according to the functions of the target, and these constituents may be dispensed with in some cases. Further, each of these means may be constituted by either hardware or software.

While each function of the target is specified according to the user operation information and the object control code in the target according to this first embodiment, the function of the target may be constructed so that the user operations other than "selection" cannot be recognized. In this case, since the function of the target can be specified by only the control code of the object, the target can execute the function by the control code alone, whereby the size of the packet to be transmitted can be reduced.

Further, while the control code is used as the object ID information in the target of this first embodiment, the control code may be arbitrarily set by the target. For example, the control code may be composed of a number given for each type of the function of the target, and a serial number for each type.

Alternatively, a unique control code that is used inside the target may be used. Thereby, mounting of each function in the target is facilitated.

With reference to the drawings, a description will now be given of a controller which is used in the network control system for the AVC system.

Figure 3:
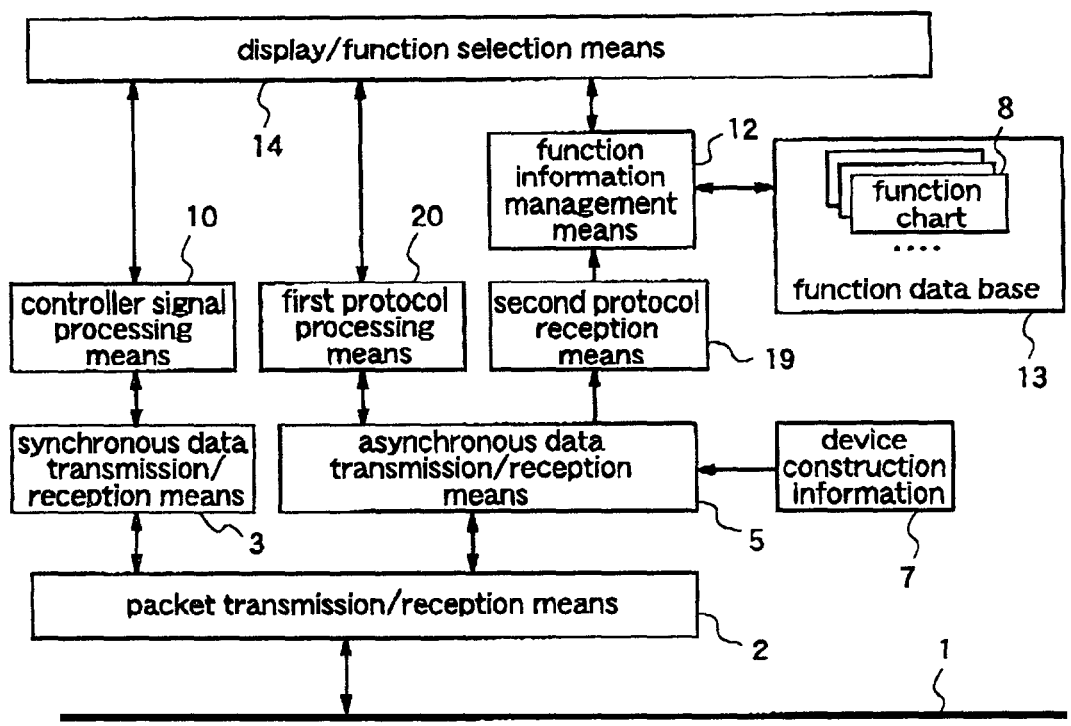
FIG. 3 is a block diagram illustrating a controller in the network control system according to the first embodiment of the present invention.

FIG. 3 is a block diagram illustrating a controller in the network control system according to the first embodiment of the present invention. In FIG. 3, reference numeral 20 denotes a first protocol processing means, reference numeral 10 denotes a controller signal processing means, reference numeral 12 denotes a function chart (information) management means, reference numeral 13 denotes a function data base, reference numeral 14 denotes a display/function selection means, and reference numeral 19 denotes a second protocol transmission means.

Hereinafter, these constituents will be described briefly. In FIG. 3, the same reference numerals as those shown in FIG. 2 denote the same or corresponding parts.

Initially, the controller signal processing means 10 receives synchronous data from the synchronous data transmission/reception means 3, and performs signal processing according to the controller. For example, when the controller is a device which is capable of displaying video, such as a video monitor, the controller signal processing means 10 decodes the synchronous data, e.g. an MPEG2 stream, and displays the decoded data on a screen.

The first protocol processing means 20 receives the information about the target on the transmission line 1, such as connection of a new connected target or the disconnection of the existing target, from the packet transmission/reception means 2 through the asynchronous data transmission/reception means 5, and transmits the information about the target to the display/function selection means 14 which will be described later. Further, the first protocol processing means 20 performs, according to the first protocol, connection/disconnection of the connection for the second protocol, and transmission/reception of a message for controlling the target.

The function database 13 is placed in the rewritable memory space, and includes the function chart 8 which is received from the target as a database. By searching this database by using the function chart management means 12, which will be described later, the following data can be taken out: the object such as the information of each target or the information of each function; the ID information of the object; the display part for notifying the user of this object, and the display part to be displayed or the control code to be transmitted when the user operates this display part. While the function database 13 does not necessarily have all of the information in the function chart 8, the function database 13 may have only a necessary part of the function chart 8.

When the controller and the target are included in the same device, it is not necessary to indicate the functions of the target in this device to the controller. Further, the inside of the device is controlled by the inside-or-device control means 9.

Therefore, although the target has the function chart 8 to be used by another controller, it is not necessary to record this function chart 8 in the function database 13 of the controller. Furthermore, when the controller and the target are included in the same device, the location of the function chart 8 may be written in the device construction data 7, or the location of the function chart may be recorded in the function database 13 in advance.

The second protocol transmission means 19 performs the processing of the second protocol at the controller end, i.e., the processing at the receiver. The second protocol transmission means 19 receives the function chart 8 or the like from the target through the asynchronous data transmission/reception means 5, and transmits the function chart 8 to the function chart management means 12 which will be described later. The inside-of-device control means 9 performs connection/disconnection of the target to/from the connection according to the first protocol through the first protocol processing means 20 and the asynchronous data transmission/reception means 5.

The function chart management means 12 manages the information in the function chart 8 which is supplied from the target on the transmission line 1.

The information management will now be described briefly. When the function chart management means 12 receives information that a new target is connected, from the asynchronous data processing means 5, the function chart management means 12 instructs the asynchronous data transmission/reception means 5 to read the information of the function target 8 of this new target.

When the information of the function chart 8 of the new target and its version information are read, the function chart management means 12 records this function chart 8 in the function database 13, and stores the version information of the function chart 8 in association with the function chart 8.

The version information may be stored in the function database 13 together with the function chart 8, or the version information may be stored in and managed by the function chart management means 12. Further, when a constituent of the function chart 8 is read together with its version information, this constituent is associated with the version information and stored in the function chart 8 of the controller. The version information of the constituent may be stored in and managed by the function chart management means 12.

Further, when the function chart management means 12 receives information that an existing target is disconnected from the transmission line 1, the function chart management means 12 deletes the corresponding function chart 8 from the function database 13.

When the existing target is disconnected, the function chart 8 of this target may be stored in the storage means in the controller. When this target is connected again, this target is identified by its ID or the like, and the corresponding function chart 8 is read from the storage means so as to be recorded in the function database 13. Thereby, registration of connected devices can be performed speedily.

The function chart 8 in the controller may be different in form from the function chart 8 in the target as long as these function charts include the same information. Further, the function chart 8 in the controller is not necessarily in the form that is transmitted on the transmission 1 by the second protocol.

Next, the display/function selection means 14 displays the display part indicating the GUI information of the target or the GUI information of the function which is received by using the second protocol (e.g., video information, audio information, or text information) on the screen of the controller, and notifies the user of this display part. Further, the display/function selection means 14 selects a target or function according to the user operation, and instructs execution of each function by using the first protocol.

Further, the display/function selection means 14 can display or play the data that is received from the controller signal processing means 10 (e.g., video or audio data), or the data that is received from the first protocol processing means 20 or the second protocol transmission means 19. At this time, the GUI information may be laid over the video data which is received from the controller signal processing means 10, or the display (screen) may be switched between the GUI information display and the video data display according to the user instruction or the like.

Further, the display/function selection means 14 instructs the function chart management means 12 to search the function chart 8, and displays the display part showing the target on the transmission line 1 or the function of the target (e.g., the target name, the function name, or the still-picture for display) on the screen.

Hereinafter, a description will be given of the operation of the controller constituted as described above.

Initially, when the user selects a display part indicating a target, the controller reads the panel (menu) of this target from the function chart 8 and displays the panel on the screen.

Next, when the user selects a display part indicating a function from the panel, the controller issues the control code and the user operation data, which correspond to this display part and are obtained from the function chart 8, through the first protocol processing means 20. The display/function selection means 14 receives a response of the target to the control code and the user operation data, through the first protocol processing means 20.

Further, when the controller is informed that the object is changed, from the target by the second protocol, for example, when the controller receives the changed object, the controller displays the changed object on the screen. Therefore, the controller can display the latest GUI with respect to the state of the target at the present time so as to inform it to the user.

The object can be managed by using the version information. In this case, when the object to which the version information is added is transmitted from the target, the controller checks the version information and displays the object only when the version information is updated.

Since the controller operates as described above, when the target distributes the function chart to plural controllers, each controller need not perform a useless operation even when a specific controller requires the data of the same version due to a restriction on this controller such as memory capacity, whereby the processing is simplified and preferable display with less updating is performed.

Further, the controller does not necessarily recognize each function of the target. For example, even when a target has a new function that cannot be supposed at present, the controller can take the display part corresponding to this new function from the function chart 8 and display the display part on the screen to inform the user of this new function. When the user recognizes the new function and selects it, the display/function selection means 14 of the controller obtains the control code corresponding to this new function with reference to the function chart 8, and issues this control code and the user operation to the target so as to make the target execute this new function. Accordingly, by adopting the construction mentioned above, the user can execute even a new function which cannot be supposed at present.

In this first embodiment, the constituents such as the synchronous data transmission/reception means 3 and the controller signal processing means 10 may be arbitrarily constituted according to the functions of the controller. Further, the constituents such as the synchronous data transmission/reception means 3 and the controller signal processing means 10 may be dispensed with according to the functions of the controller.

Next, with reference to the drawings, description will be given of the method of connecting/disconnecting the devices to/from the connection for the second protocol.

Figure 4:
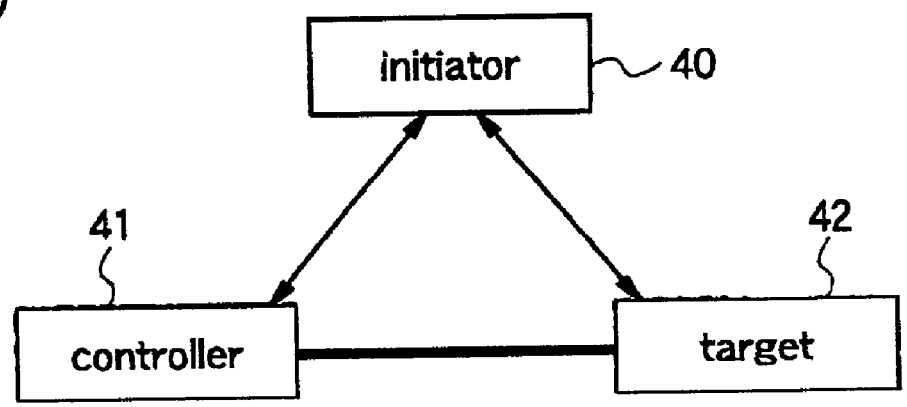
FIG. 4(a) is a system configuration diagram in the case where an initiator according to the first embodiment of the present invention is present.
FIG. 4(b) is a system configuration diagram in the case where the initiator according to the first embodiment of the present invention is absent.
Figure 4:

FIGS. 4(*a*) and 4(*b*) are diagrams illustrating the method of connecting/disconnecting the devices to/from the connection used by the second protocol, and FIG. 4(*a*) shows the case where there is an initiator while FIG. 4(*b*) shows the case where there is no initiator. In these figures, reference numeral 40 denotes an initiator, reference numeral 41 denotes a controller, and reference 42 denotes a target.

The connection is a path for data transmission which is logically constituted for the data flowing on the transmission line 1, and the target and the controller may possess plural connections. In this case, each connection designates an address for data transmission/reception by using a logical plug number or port number, and each connection is distinguished from another connection by the plug number or the port number.

The case where the initiator is present will be described first. In FIG. 4(*a*), the initiator 40 creates a connection of the second protocol between the controller 41 and the target 42. In this connection, the transmitter of the data that is transmitted by the second protocol is the target 42, and the receiver is the controller 41.

The initiator 40 obtains, from the controller 41, the information which is required for connection, e.g., the controller's resource information such as an address of a connectable buffer, and tries to connect the target 42 to the connection by using this information. When this is successful, the initiator 40 tries to connect the controller 41 to the connection. In this way, the connection is established between the controller 41 and the target 42.

Further, when disconnecting the devices from the connection, the initiator 40 disconnects the controller 41 from the connection, and then disconnects the target 42 from the connection. When this is successful, the initiator 40 releases the resources which have been reserved for connection by the controller 41.

Next, a description will be given of the case where the initiator is absent. In FIG. 4(*b*), the controller 41 creates a connection of the second protocol between the controller 41 and the target 42. In this connection, the transmitter of the data that is transmitted by the second protocol is the target 42, and the receiver is the controller 41. That is, the controller 41 doubles as the initiator shown in FIG. 4(*a*).

The controller 41 obtains information which is required for connection of itself, e.g., resource information such as an address of a connectable buffer, and tries to connect the target 42 to the connection by using the information. When this is successful, the controller 41 tries to connect itself to the connection. In this way, the connection is established between the controller 41 and the target 42.

Also, when disconnecting the devices from the connection, the controller 41 disconnects itself from the connection, and then disconnects the target 42 from the connection.

When this is successful, the controller 41 releases the resources which have been secured for connection by itself.

Since this connection establishment method depends on the second protocol, the initiator creates the connection by a method suited to the second protocol.

Next, with reference to drawings, a description will be given of the construction of the function chart 8 according to this first embodiment.

Figure 5:
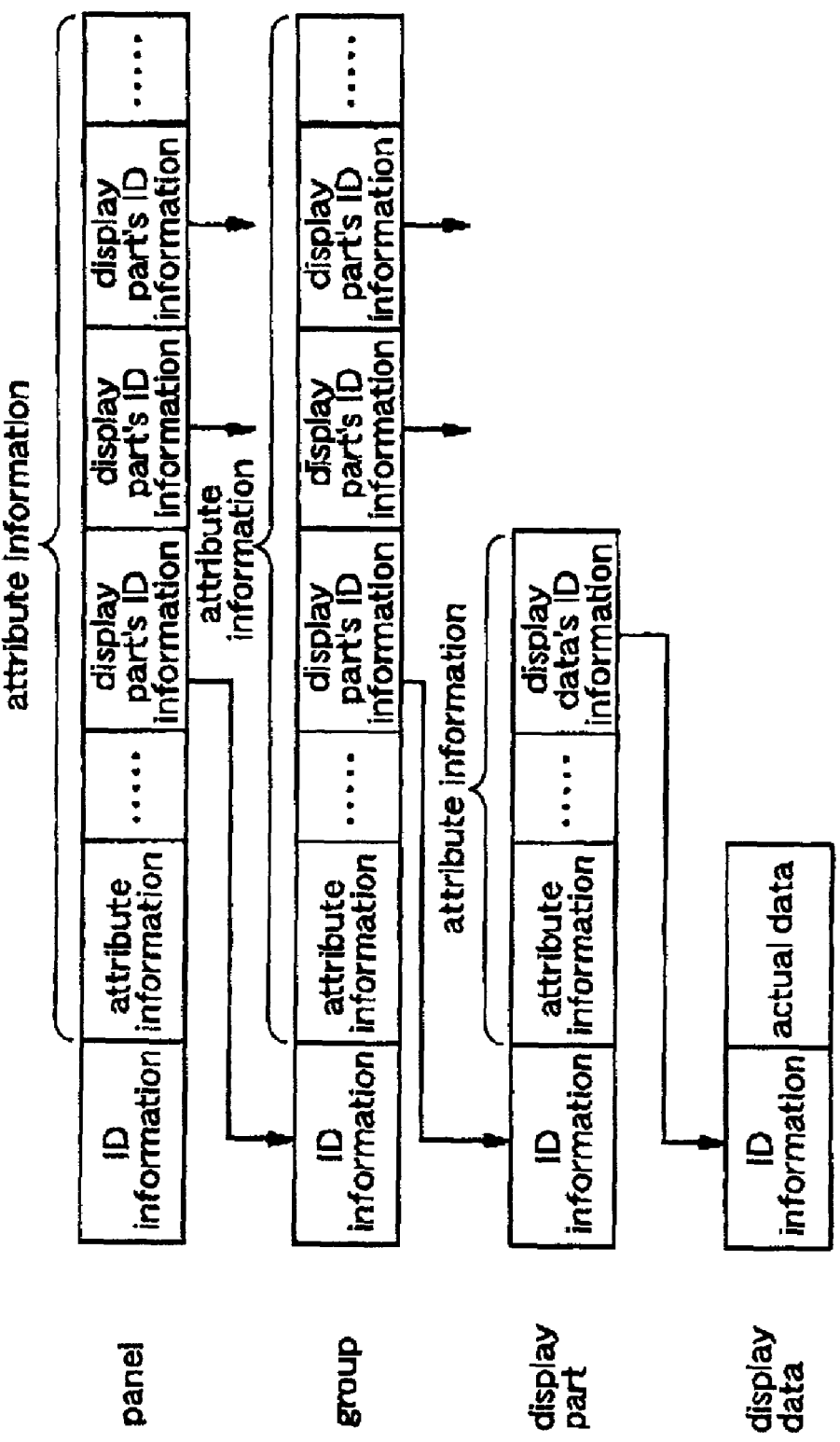
FIG. 5 is a diagram illustrating the configuration of a function chart according to the first embodiment of the present invention.

FIG. 5 shows the function chart 8 described with respect to FIGS. 2 and 3, and this chart has one panel. In FIG. 5, the panel, group, and display part are referred to as "display elements".

The panel shows the GUI information in the target, and it is constituted by using a list.

The group shows an aggregate of display elements in the panel, and this is constituted by using a one-dimensional array. Since the group is not necessarily required, this may be omitted. When the group is omitted, ID information of each display part may be directly written in the panel list.

The display part shows an icon, a button, or the like, and this may have ID information of display data. The display data shows actual data of the display part, such as still-picture data, audio data, text data, etc. The function chart 8 may have plural panels.

The panel, group, display part, display data are generically referred to as "objects". Each object is shown as a one-dimensional array, and the array is composed of ID information and a data section, i.e., attribute information, or actual data ID information of another object may be written in the attribute information and, in this case, each object can have a list structure.

Each object has ID information for identifying the object, and the ID information is constituted by using an ID number as an identifier, type information indicating the type of the object, and the like. The object is specified by them.

Each object also has attribute information. The attribute information in each object has ID information for identifying the attribute of the object, and this ID information is constituted by using an ID number as an identifier, type information indicating the type of the attribute, and the like. Each attribute information is specified by them.

Besides the information mentioned above, each object has its own information. This information is unique to each object, for example, an object's version information, size information, arrangement information, font size information, etc. Each of the unique information is written in each object as attribute information.

Further, the ID information of the display element or the display part to be referred to shows the link between objects. Thereby, it shows an aggregate such as the panel or the group. Further, when the display part has links to the display data, plural display parts can share the same display data. The ID information of the object to be referred to is handled as attribute information, and it has reference information as a kind of attribute information which is discriminated by the ID information.

The physical/logical construction of the function chart 8 in the controller or the target does not necessarily have the construction shown in FIG. 5, and the construction is not restricted thereto as long as the controller and the target can share information of the same contents.

To be specific, each part of the function chart 8 does not necessarily have the link shown in FIG. 5 as long as the part can be accessed in object units from the controller.

As described above, since the ID information and the unique information of the objects to be referred to are integrated in the same format as attribute information, the processes performed by the controller are reduced, whereby the code size of the program is reduced, which results in simplified processing. Further, when creating the data of the function chart, debug, alteration and formation are facilitated. The form of the function chart is not restricted to a list, it may be a table or a directory.

Further, the target may have plural panels like other objects, and the target may designate a desired panel when the controller reads the function information.

Further, the panel may be composed of one main panel and plural sub-panels. In this case, display parts indicating links to the sub-menus are written in the attribute information indicating the reference objects of the main panel. At this time, each display part shows the sub-menu of the reference object by a still picture or text data. When the user selects this display part on the controller, the controller displays the sub-menu of the reference object on the screen. The sub-menu is as follows: an operation menu indicating a function in the target; a help menu indicating how to use; a contents menu comprising only contents information in the target; an edition menu for edition work; or a setting menu for setting the target. However, the sub-menu is not restricted thereto.

Hereinafter, with reference to the drawings, a description will be given of the operations of the controller and the target in the network control system according to the first embodiment.

Figure 6:
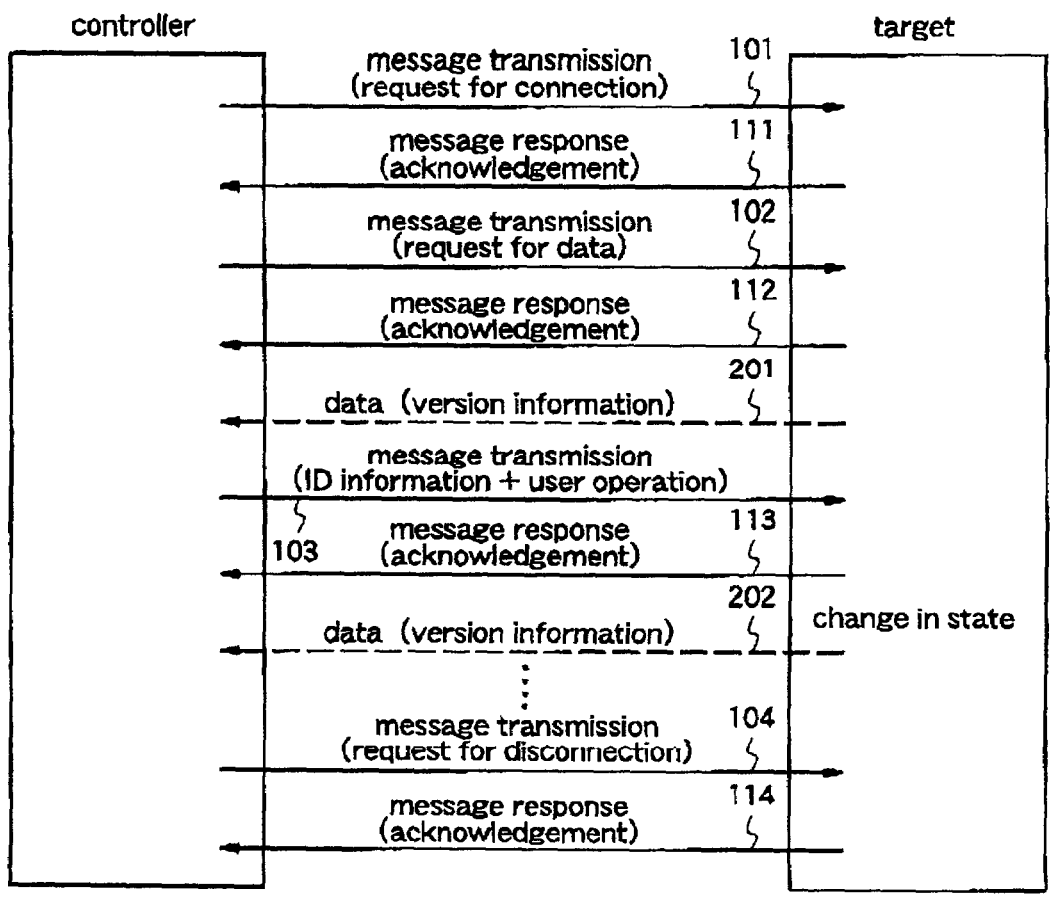
FIG. 6 is a diagram for explaining a protocol according to the first embodiment of the present invention.

FIG. 6 is a diagram for explaining the network control system according to the first embodiment. The following description will be given for the case where the system has no initiator, i.e., where the controller doubles as an initiator.

First of all, when a target is connected to the transmission line 1, the controller on the transmission line 1 recognizes the new target by a bus reset signal or the like, and reads the information of the new target, which is written in the device construction information 7, from the new target through the transmission line 1, under an instruction of the function chart management means 12. Then, the controller reads the data objects indicating the target itself, e.g., text object, still-picture object, etc., and records these data in the function database 13 of the controller.

At this time, the display/function selection means 14 refers to the function database 13 through the function chart management means 12, and displays the chart of the target connected to the controller by using the data object indicating the target itself.

Next, when the user selects the still-picture object of the target by using a pointing function (e.g., crosshairs key) of the remote controller, the display/function selection means 14 makes a request for the GUI information of the target to the function chart management means 12, reads the panel (menu) of the target, and stores it in the function chart 8 of the controller.

At this time, the controller reserves resources in the controller which are required for the second protocol, and transmits a message 101 shown in FIG. 6, i.e., a request for making a connection, to the target by using the first protocol. Next, it is checked as to whether or not the target is connectable to the connection, and when it is connectable, the target is connected to the connection. Then, the controller confirms that the target acknowledges the request, by a message response 111, and connects itself to the connection, whereby the connection is established.

Next, the controller transmits a request for data transmission by a message transmission 102 to the target. This message transmission 102 includes information of a notification range within which the controller desires to match the information with that of the target. As a response to this transmission, the target returns a primary response 112, and transmits the data of the panel (main menu) in the function chart 8 to the controller by using the second protocol.

At this time, the controller may notify the information indicating the notification range to the target. In this case, the target does not notify the controller of a change in unnoticed information such as information that is not currently displayed by the controller. Accordingly, the controller is prevented from being supplied with unnecessary data at the present time and being compelled to process the data, whereby the throughput of the controller is improved.

The message response 112 may include the version information according to the notification range. At this time, the controller can obtain the version information of the function chart 8 of the target in advance of reading the function chart 8. Thus, the controller need not read the function chart 8 again if the function chart is the same as the function chart which has already been cached by the controller, and the controller may discard the transmitted data. That is, the controller is prevented from performing unnecessary data updating and screen updating, and the controller can provide the user with a user-friendly screen, and therefore, the processing of the controller is simplified. Further, the data transmitted by the second protocol may be either the whole data of the function chart 8 or the panel that is designated by the message transmission 102.

In this way, the controller obtains the whole data of the panel, and displays the data on the screen. The notification range may be transmitted to the target by the message transmission 101, with the same effects as described above. Further, the message response 111 may include the version information of the function chart 8 of the target. At this time, the controller can obtain the version information of the function chart of the target before performing the message transmission 102, and the controller need not read the function chart again if it is the same as the function chart which has already been cached by the controller. This saves the trouble of transmitting the function chart, which results in a reduced amount of data to be transmitted.

Next, when the user selects the display part indicating the playback function of the target by using the pointing function of the remote controller such as a crosshairs key which shows up, down, left, and right, the display/function selection means 14 transmits the ID information of the display part which is given by the target, as a control code, to the target together with the user operation information such as "selection". That is, after the user moves the cursor onto the display part by using the crosshairs key showing the up, down, left, and right and pushes the "selection" button, even when the user moves the cursor out of the display part, the ID information (control code) of this display part and the user operation information ("selection") are transmitted as a message transmission 103 to the target.

Further, more precise user operation information can be transmitted to the target. That is, when the user performs operations like "push", "release", "push twice" on the display part by using the remote controller or the pointing target, the information of these operations can be transmitted to the target. Further, as more precise operation information, the operation information of the remote controller itself, such as when the user pushed button "1" of the remote controller, can be transmitted directly to the target.

The user operation information may be coded and transmitted together with the ID information of the display part, or each operation information may be transmitted as a command (operand is the control code such as the ID information of the display part).

When only "selection" is permitted with respect to the display part, the controller is constructed so as to transmit only the control code (ID information) of the display part to the target. In this case, the processing is simplified, and the traffic on the transmission line 1 is reduced.

Next, as a response to the operation request, the target returns a message response 113 indicating that the message transmission 103 is received, rejected, or not supported by the target.

The message response 113 may include the version information. In this case, the controller can know whether or not the data of the function chart is changed according to the message transmission 103, before the controller makes the next request for data or before the target transmits data spontaneously. Thus, the controller can prepare for screen updation or the like-in advance, whereby the controller can provide the user with an easily-readable display.

When the state of the target is changed and thereby the object inside the target such as the function menu list, the display part list, or the data object is changed, the target spontaneously transmits the changed data (display part) to the controller by using the second protocol. The changed data (display part) is not restricted to one. When plural display parts are changed at one time, the target can transmit the plural display parts. Transmission of the changed data is performed not only by the user operation but also by the target when the state of the target is changed.

While data transmission is performed in display part units in the above-description, only the attribute information which is changed may be transmitted. In this case, the changed attribute information is transmitted together with the ID information of the changed display part. Likewise, when only the display data is changed, only the display data is transmitted to the controller. By transmitting only the changed attribute information or display data as described above, the quantity of data to be transmitted is reduced, whereby the responsibility is improved, and the processes performed by the target and the controller are reduced.

Further, when the panel unit is designated as the notification range and the display menu is changed by the user operation or the like, the target transmits a new panel to the controller, and only when the information in the new panel is changed, the target notifies the controller of the change in the target information. Thereby, the controller can obtain the state change information with simple structure and efficiency, i.e., with less storage area. This is not restricted to the panel and is applicable to every display part.

The function chart management means 12 writes the data of the changed display part in the corresponding function chart 8 so as to update the function chart 8, and the display/function selection means 14 displays the updated function chart 8 so updated.

When the controller ends display of the function chart 8 of the target, the controller disconnects itself from the connection, and makes a message transmission 104 (disconnection, request) to the target by using the first protocol.

The target checks whether or not disconnection from the connection is proper or not, and disconnects itself from the connection when disconnection is proper.

When the controller checks by a message response 114 that the target acknowledges the request, the controller releases the resources which are required for the second protocol, which have been stored by itself.

In the above description, the connection is created when the controller displays the information of the target on the screen. However, the connection may be created while power is on the target, or the connection may be created when the controller displays the GUI information of the function chart of the target. The same can be said for the disconnection.

Further, information indicating a forced message to the user may be added in the ID information or attribute information of the data that is transmitted by the second protocol. When the controller receives this data, display or audio playback is performed compulsorily.

As described above, when an operation which is not permitted by the target, such as an overlap of program reservations, is performed or when an abnormality, such as entangled tape of VTR, occurs in the target, a warning or instruction can be given to the user by using GUI information such as video and audio, whereby the user can perceive the status of the target correctly and quickly.

As the data to be transmitted by the second protocol, OSD (On Screen Data) may be constituted by using bit map, text data, and the like of a part or the whole of the screen, and the controller may display the OSD on the screen. Further, the location of the OSD on the screen of the controller may be decided by the controller in this case, and the OSD is displayed for the user with an appropriate size and in an appropriate position according to the screen size and the aspect ratio.

Further, the message response may include the version information. In this case, it is decided whether or not the data that is transmitted by the second protocol is correct data by deciding whether this version information matches that of the data that is transmitted by the second protocol. In this case, it is not necessary for the controller to obtain all of the data transmitted by the second protocol, whereby the processing of the controller is simplified, which results in speedup.

Further, a specific value of the version information may have a particular meaning. For example, when the value of the version information is "0", the corresponding display part is "invariable". That is, invariable display parts and variable display parts can be handled without additional information, whereby the processing of the controller is simplified, and the quantity of information is reduced.

Next, the transmission/reception operation of the controller will be described with reference to the drawings.

Figure 7:
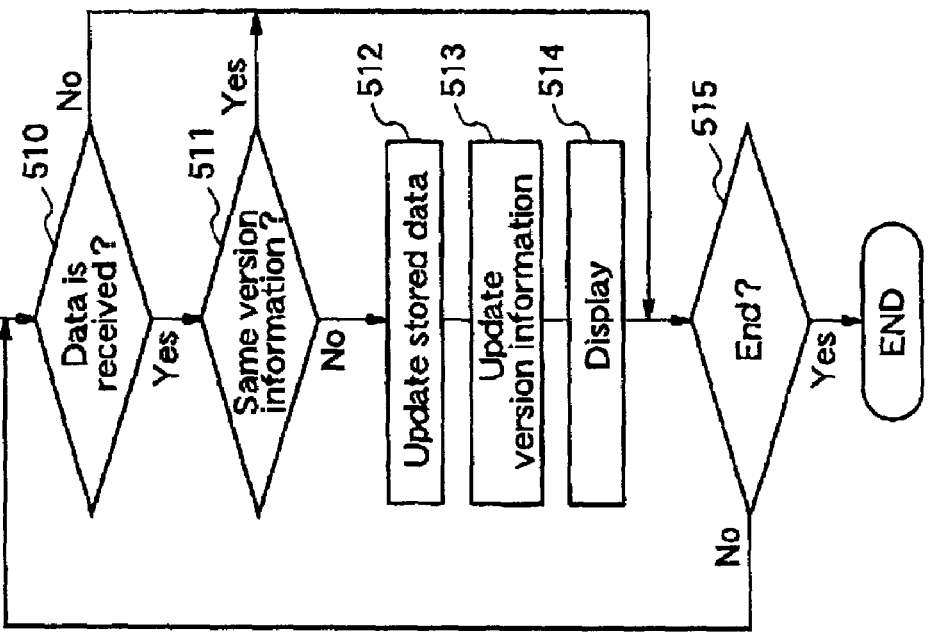
FIG. 7 is a flowchart illustrating the operation of the controller according to the first embodiment of the present invention.
Figure 7:
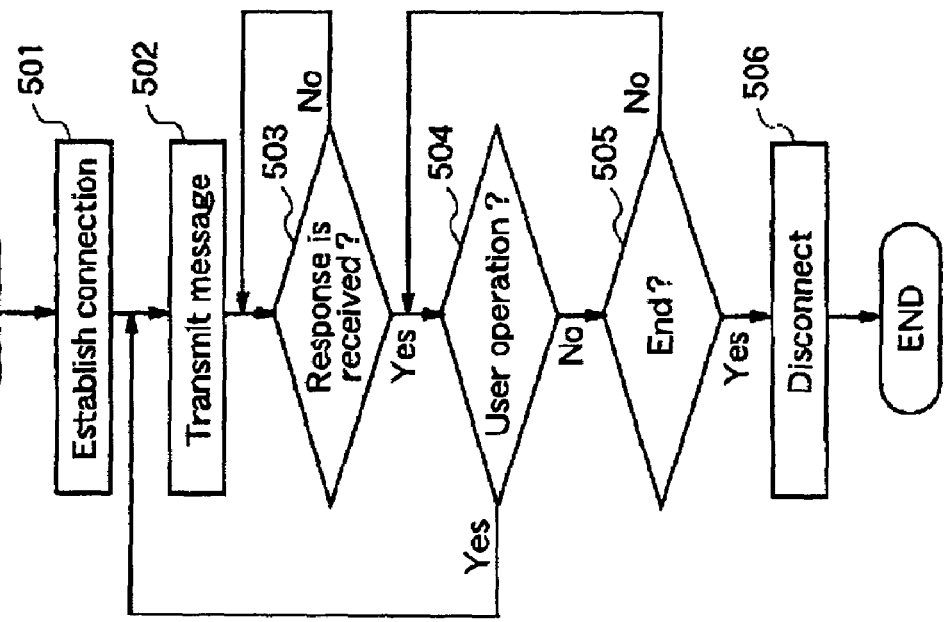

FIGS. 7(a) and 7(b) are flowcharts each illustrating the operation flow of the controller. FIG. 7(a) shows the operation relating to the first protocol, and FIG. 7(b) shows the operation relating to the second protocol. The operation flow shown in FIGS. 7(a) and 7(b) are performed in parallel with each other on the controller.

In FIG. 7(a), the controller establishes a connection for the first protocol, to the target, according to a request inside the controller such as user's pushing a menu button on the remote controller (step 501). Then, in order to display the GUI information of the target according to the user operation, the controller transmits a message indicating a request for the data to the target (step 502). The controller waits for a response to this request (step 503), and detects the user operation after receiving the response from the target (step 504).

When the user performs an operation on the screen of the controller and the controller notifies the target of this operation, the ID information of the object and the user operation information are transmitted to the target (step 502).

On the other hand, when there is no user operation, it is decided whether or not the processing is to be ended (step 505). When it is decided by the user operation or the like that the controller need not display the GUI information of the target, the target is disconnected (step 506). On the other hand, when it is decided that the controller should continue to display the GUI information of the target, the user operation to be transmitted to the target is checked (step 504).

The operation flow shown in FIG. 7(b) is started after the controller has established the connection in step 501 of FIG. 7(a). Initially, in step 510, the controller checks whether it receives data or not by the second protocol. When the controller receives data, the controller checks the version number (step 511). When the received data is newly read data or has different version information, the data stored in the controller is updated (step 512), the version information is updated (step 513), and then the display is updated (step 514). When the version information is the same, steps 512 to 514 are skipped and the display is not updated.

After the display is updated in step 514 or when the controller receives no data in step 510, it is decided whether or not the operation flow is to be ended (step 515). When it is decided by the user operation or the like that the controller need not display the GUI information of this target, the operation flow is ended. On the other hand, when it is decided that the controller should continue to display the GUI information of this target, the controller waits for next data (step 510). The END decisions in steps 510 and 515 may be performed at the same time.

Next, the transmission/reception operation of the target will be described with reference to the drawings. A description of error handling during communication is omitted.

Figure 8:
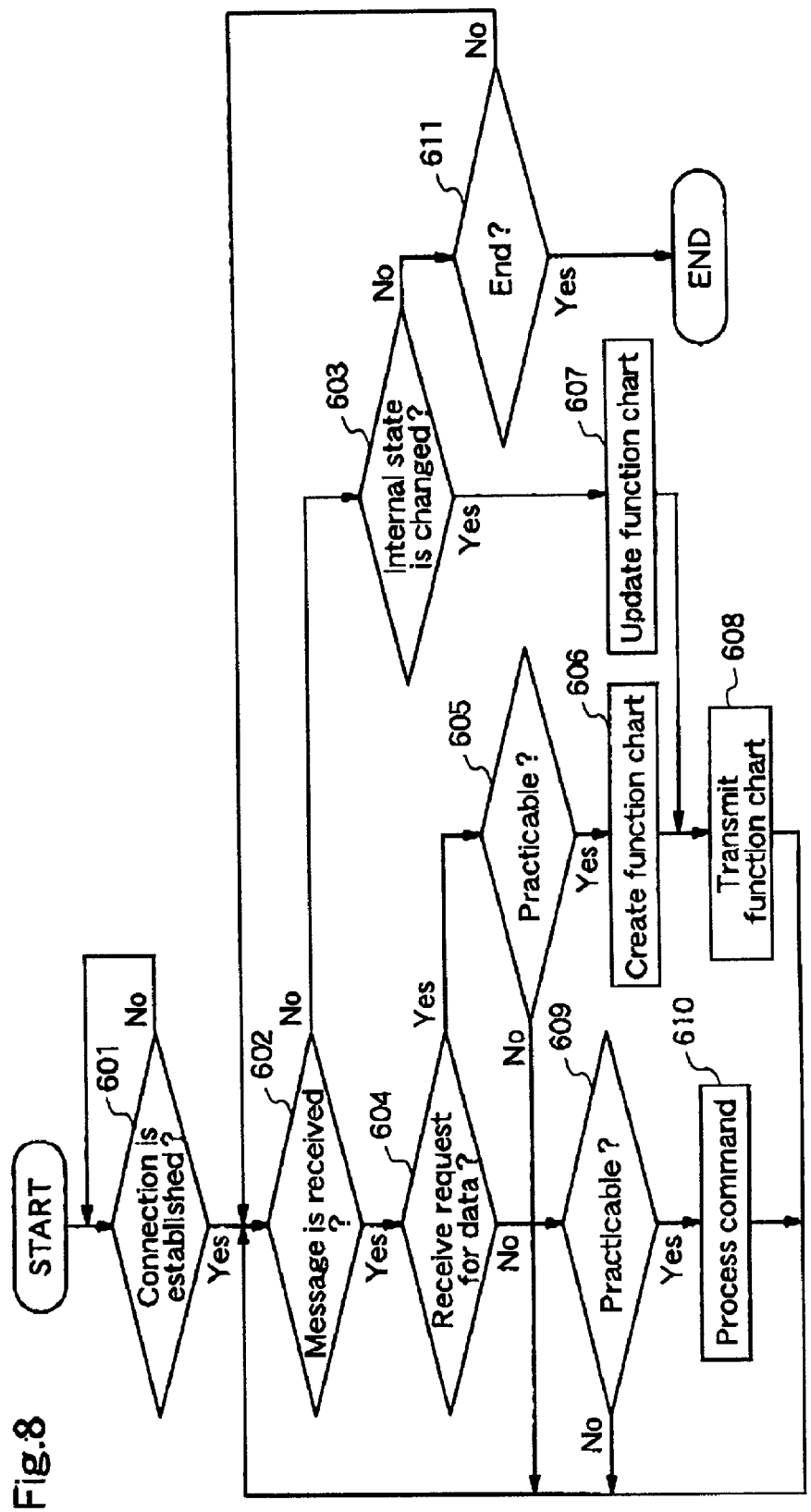
FIG. 8 is a flowchart illustrating the operation of the target according to the first embodiment of the present invention.

FIG. 8 is a flowchart showing the operation flow of the target. Initially, the target waits for the controller to establish the connection (step 601), and after the connection has been established, the target checks whether there is a message from the controller (step 602). When there is no message, the target checks its internal state (step 603). When its internal state is not changed, the target decides whether or not the operation flow is to be ended (step 611). When the target is disconnected from the connection by the controller or when the target receives an END message from the controller, the target ends this operation flow. On the other hand, when the operation is to be continued, the control returns to step 602.

When there is a message in step 602, the target decides the purpose of this message, checks the state of the target and whether or not the target supports this function according to the message, and then transmits a message response to the controller according to the practicability of the message (steps 604 and 609). When the received message is a request for data, the target decides its practicability (step 605). When the request is decided to be practicable, the target sends an acknowledgement to the controller and, simultaneously, creates a function chart (step 606). When the target already has a function chart, the target transmits the function chart to the controller (step 608). On the other hand, when the request is not practicable, the target transmits a message such as a rejection to the controller.

Likewise, when the state of the target is changed in step 603, the function chart is updated (step 607), and the function chart is transmitted to the controller (step 608).

Further, when the received message is not a request for data but the ID information of an object and the user operation information, the target performs a process corresponding to this message (step 609). That is, the practicability of the message is decided in step 609. When the message is decided to be practicable, the target transmits a message response (acknowledgement) to the controller, and performs a process corresponding to this message (step 610). When the message is not practicable, the target transmits a message such as a rejection to the controller.

Although the END decision is made in step 611, when the target receives a message of disconnection or a message about GUI display's being ended from the controller, the decision may be made in step 610 to end the operation flow.

Next, with reference to the drawings, a description will be given of the process of confirming data transmission by the second protocol.

Figure 9:
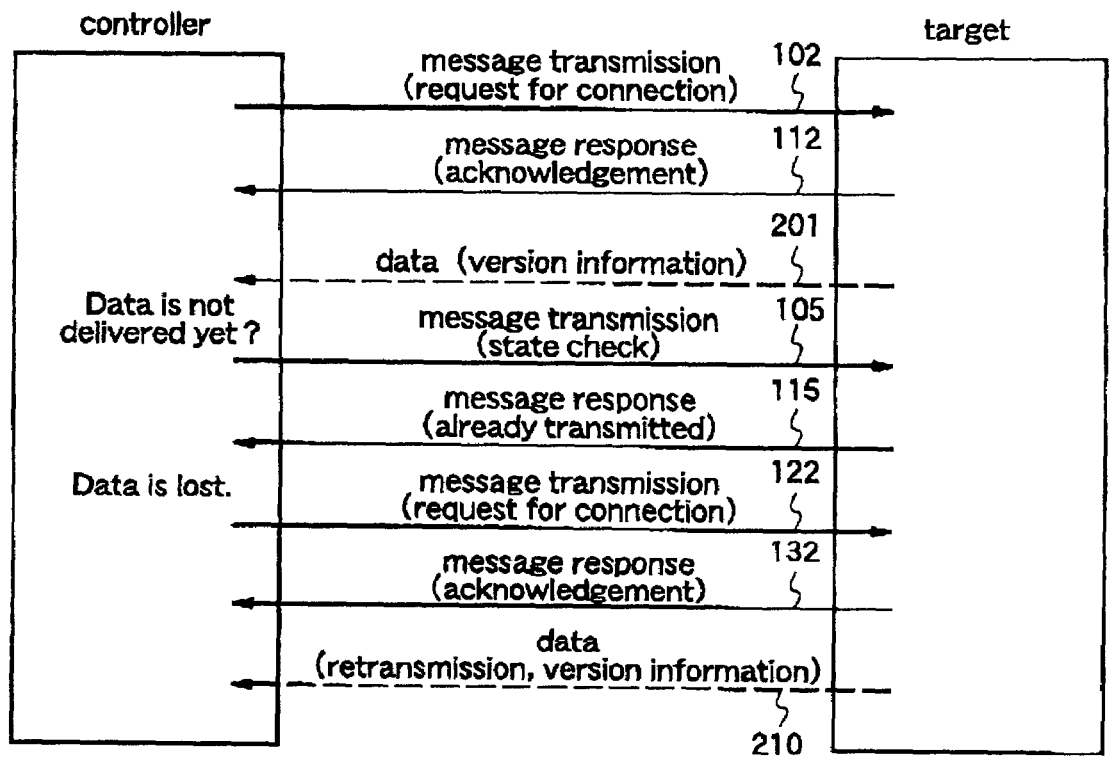
FIG. 9 is a diagram for explaining the protocol when transmission is confirmed, according to the first embodiment of the present invention.

FIG. 9 is a diagram for explaining the process of confirming data transmission by the second protocol according to the present invention. FIG. 9 shows the process of confirming the transmitted data from the message transmission 102 to the data 201 shown in FIG. 6. In FIG. 9, the same transmission processes as those shown in FIG. 6 are given the same reference numerals.

The controller makes a request for data by a message transmission 102, and the target returns, to the controller, a message response 112 indicating that the message is acknowledged. Then, the target transmits data 201 including version information, e.g., a function chart, by using the second protocol.

If a transmission error occurs in the transmission line, the target or the controller, whereby the data 201 is not correctly transmitted to the controller, the controller detects the possibility that normal transmission has not been performed by the second protocol, according to timeout, parity check, or data size check.

Next, the controller confirms by a message transmission 105 as to whether the target has correctly outputted the data by the second protocol. Then, the target confirms whether or not the data transmission by the second protocol has been normally ended. When the data transmission has ended normally, the target returns a message response 115 of "acknowledgement", and when the data transmission has not ended normally, the target returns a message response 115 of "error" according to the situation.

When a message indicating "already transmitted" or a message indicating "transmission error" is returned as the message response 115, the controller recognizes that the data transmitted by the second protocol has been lost or an error has occurred during transmission, and requests the data again by a message 122. Upon receipt of this request, the target informs the controller that the message is acknowledged, by a message response 132, and retransmits the data which is designated by the data 210, by using the second protocol.

With respect to the data transmission by the second protocol from the target, the controller may always confirm the situation by a message transmission.

Also, in the case where the target spontaneously transmits data by using the second protocol, when the controller detects incorrect data, the controller performs confirmation and request for retransmission as described above, by using a message of the first protocol.

In this way, since confirmation and request for retransmission with respect to data transmission by the second protocol are performed by the first protocol, the data transmission by the second protocol is performed reliably, whereby the reliability of the system is increased.

Furthermore, when normal transmission cannot be performed due to errors in the controller or the target, these errors can also be detected by checking the data at the transmitter end and the receiver end, whereby normal transmission is assured.

Next, with reference to the drawings, a description will be given of the structure of a display element according to the first embodiment.

Figure 10:
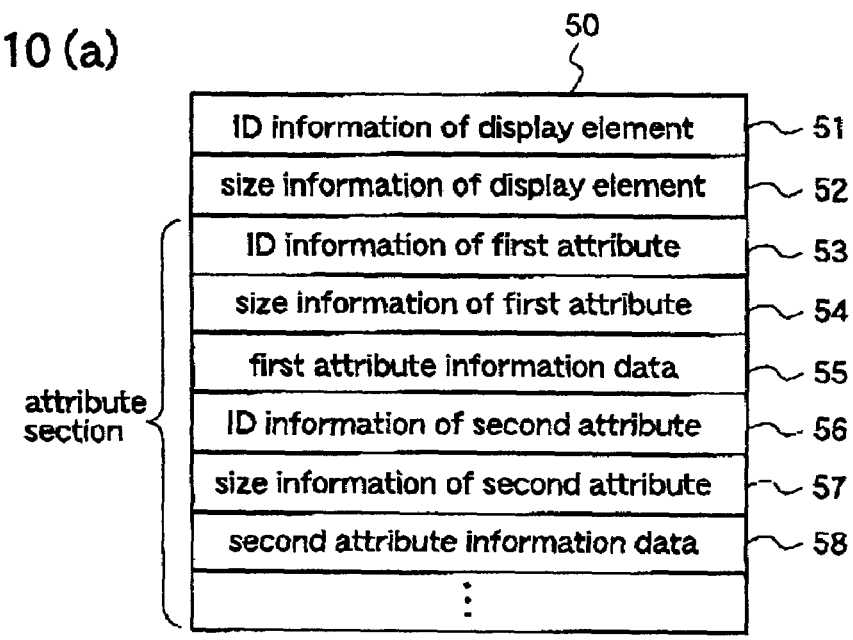
FIG. 10(a) is a diagram illustrating the configuration of display elements according to the first embodiment of the present invention.
FIG. 10(b) is a diagram illustrating the configuration of attribute information according to the first embodiment of the present invention.
Figure 10:
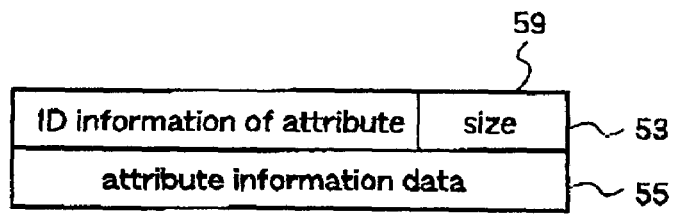

FIG. 10(*a*) is a diagram illustrating the structure of a display element according to the present invention.

In FIG. 10(*a*), reference numeral 50 denotes a display element, reference numeral 51 denotes ID information of the display element, reference numeral 52 denotes size information of the display element, reference numeral 53 denotes ID information of a first attribute, reference numeral 54 denotes size information of the first attribute, reference numeral 55 denotes first attribute information data, reference numeral 56 denotes ID information of a second attribute, reference numeral 57 denotes size information of the second attribute, and reference numeral 58 denotes second attribute information data. In FIG. 10(*a*), each information has 16 bits in the horizontal direction, but the number of bits is not restricted thereto.

The ID information of the display element comprises an ID number of the display element, type information indicating the type of the display element, and the like, and this ID information indicates what the display element is.

The size information of the display element indicates the size of the whole attribute information of this display element, i.e., the size of the attribute section, and this size information is represented by bytes, for example.

The attribute section is a section where the attribute of the display element is described. The attribute includes the size of the display element (number of pixels), positional information (number of pixels), and the like. When the display element is a panel or a group, the attribute includes the ID information of objects having links. These pieces of information, i.e., the ID information of each attribute, the size information of each attribute, and the attribute information data of each attribute are represented in the same format. The order of these pieces of attribute information is arbitrary, and each attribute is distinguished from one another attribute" by its ID information.

The ID information of each attribute comprises an ID number of the attribute, type information indicating the type of the attribute, and the like, and this ID information indicates what the attribute is.

The size information of each attribute indicates the size of the attribute information data of this attribute, and this size information is represented by bytes, for example.

In this way, the display elements, i.e., the panel, group, and display part, have the same data format, and the ID information and the size information are followed by one or plural pieces of attribute information. Further, each attribute information has the same data format as that of the display element.

By making the data format uniform among the respective display elements, the processing of the controller is simplified, whereby high-speed processing is achieved and debugging is facilitated.

Further, by making the data format uniform between each display element and each attribute information, the processing of the controller is unified, whereby high-speed and simple processing is achieved and, further, the creation of processing software and data is facilitated.

Next, FIG. 10(*b*) shows the structure of the attribute information according to the present invention.

First of all, the attribute size information is incorporated in the attribute ID information, and the size of the attribute information is represented by the field (e.g., 4 bits) of the size information. For example, when "1" is written in the size information field, the size of the attribute information means 1 word (16 bits), and when "2" is written in the size information field, the size of the attribute information means 2 words. Since the size information is written by using part of the field of the ID information, the quantity of data can be reduced with respect to the attribute information having a relatively small quantity of attribute information data.

For example, when one piece of large-size attribute information exists in the function chart, the attribute size information 53 should be increased according to this size (e.g., 4 bytes). At this time, with respect to a large number of small-size attribute information, the data quantity of each small-size attribute information can be reduced by using the method shown in FIG. 10(b), whereby the memory quantity can be reduced.

Further, when the unit of the size represented by the size information field is increased, even somewhat large-size data can be represented in this format, whereby the attribute side information 54 can be dispensed with.

It is not necessary to store these data with this data format in the controller or the target so long as the data format at transmission is uniform. Of course, when these data are transmitted on the transmission line 1, the data written in this data format are subjected to division-into-packets and addition of headers.

Next, with reference to the drawings a description will be given of the structure of display data according to the first embodiment, with reference to the drawings.

Figure 11:
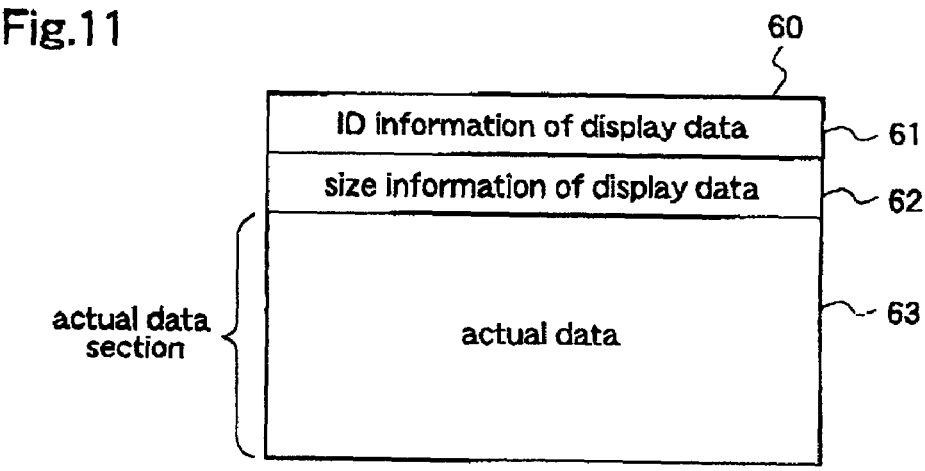
FIG. 11 is a diagram illustrating the configuration of display data according to the first embodiment of the present invention.

FIG. 11 is a diagram illustrating the structure of display data according to the present invention. In FIG. 11, reference numeral 60 denotes display data, reference numeral 61 denotes ID information of the display data, reference numeral 62 denotes size information of the display data, and reference numeral 63 denotes actual data.

The ID information of the display data comprises an ID number of the display data, type information indicating the type of the display data and the like, and this ID information indicates what the display data is.

The size information of the display data shows the size of the actual data of the display data, and this size information is represented by bytes, for example. The number of bits of the ID information or the size information may be different from that of the display element.

The actual data is a section where the actual data of the display data is stored, and bit mapped video data, audio data, text data, program data and the like are stored.

Further, attribute information indicating the types and sizes of these bit mapped data are described as attribute information of the display part. Further, in FIGS. 10 and 11, the data structure is in the following order: ID information→size information→ID information→size information . . . , but the data structure is not restricted to this order. For example, the data structure may be in the following order: size information→ID information→size information . . . .

Next, the structure of a function chart according to the first embodiment will be described with reference to the drawings.

Figure 12:
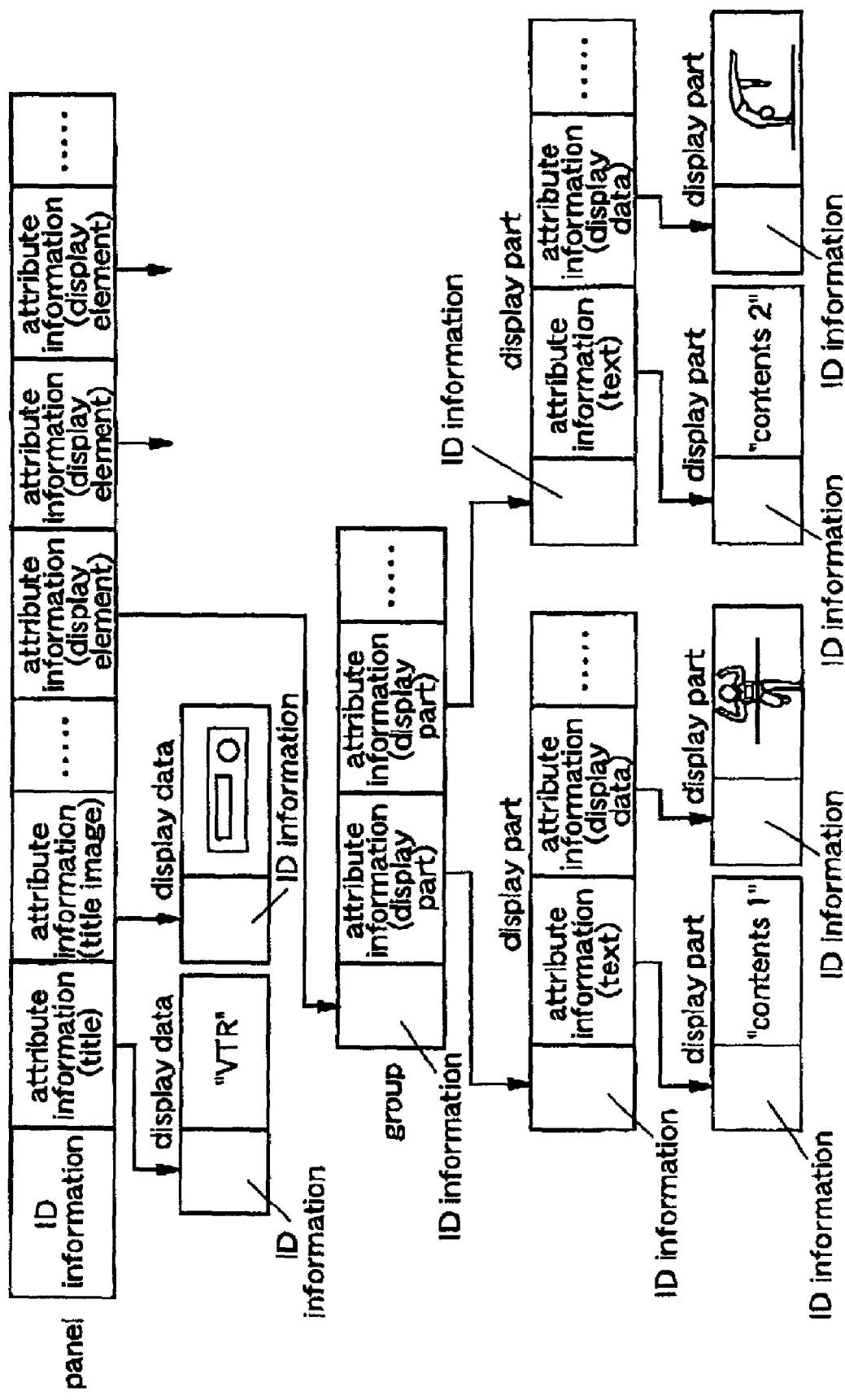
FIG. 12 is a diagram illustrating an example of a function chart according to the first embodiment of the present invention.
Figure 13:
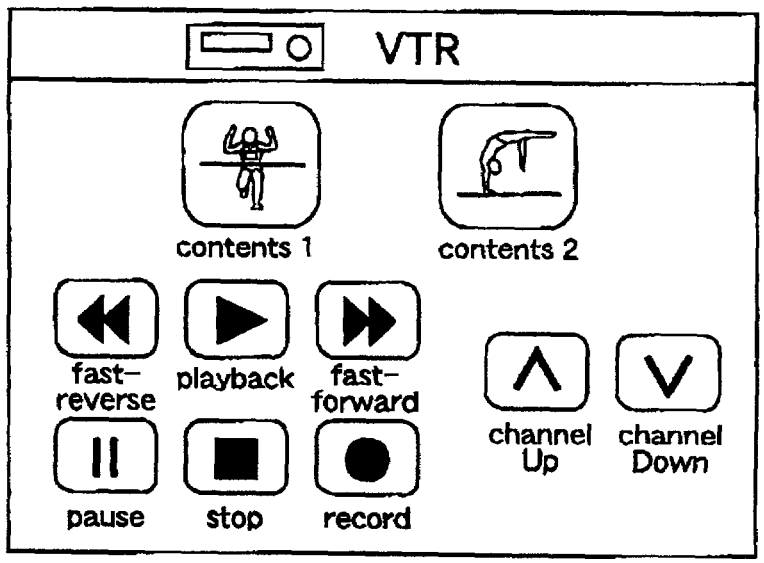
FIG. 13 is a diagram illustrating an example of a display on the screen of the controller according to the first embodiment of the present invention.

FIG. 12 is a diagram for explaining the structure of the function chart according to the present invention, and FIG. 13 shows an example of a panel display on the controller.

In FIG. 12, one panel in the function chart indicates a menu of a VTR, and the panel includes, as attribute information, a title, a title image, unique information such as its background and size, and links to groups, i.e., ID information of the groups. Each group shows an aggregate of display parts according to the function or display. For example, there are three groups such as contents, a deck, and a tuner.

Each group includes, as attribute information, unique information such as its size, location, background, and links to the display parts, i.e., ID information of the display parts. The links to the display parts indicate the display parts which belong to this group.

Each display part is a part for displaying an icon, button, slider, check box, text entry, or the like, and the display part includes, as attribute information, unique information such as its size, location, state, variable, etc., and links to display data (ID information of display data). However, a display part such as a slider, check box, or text entry has no display data, its feature, function, or operation is represented as a display part, and its display may depend on the controller.

Each display data is data such as still-picture data, video data, text data, audio data, program data, or the like, and it shows the display data of a panel, group, or display part.

Hereinafter, the panel will be described briefly with reference to the drawings.

FIG. 13 shows an example of a display on the above-described panel. Each group is not displayed on the screen of the controller. Of course, each group may be displayed on the screen together with its title and title image.

Figure 14:
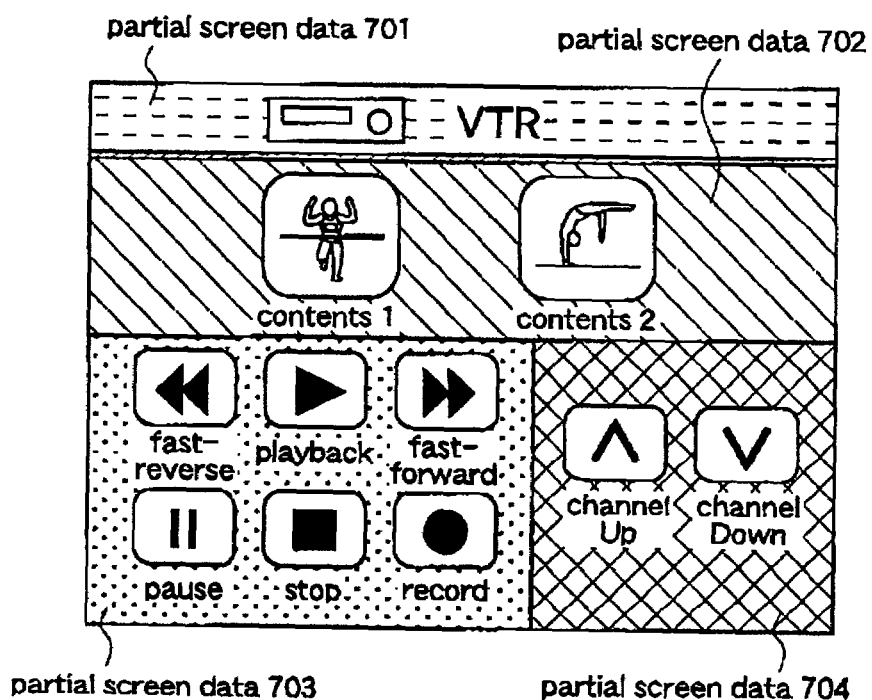
FIG. 14 is a diagram for explaining the example of the function chart according to the first embodiment of the present invention.

Further, FIG. 14 shows another example of a panel of the controller according to the first embodiment.

In FIG. 14, the panel is constructed as an aggregate of display parts into which one bit map data is divided arbitrarily. Partial screen data 701, 702, 703, and 704 are obtained by dividing data of one bit map indicating this panel, and each partial screen data corresponds to a display part and has ID information of the display part on the panel.

When the display data (partial screen data) of any display part is changed due to the user operation or a change in the state of the target, the target notifies the controller of this change for each display part, thereby notifying the user of this change.

While data of one bit map showing a panel is divided into plural parts in this first embodiment, a panel may be constituted by only data of one bit map showing the panel. In this case, although the quantity of data to be transmitted by the target due to the user operation or state change of the target is increased, the same effects as described above are achieved.

While the controller performs visual display in this first embodiment, means for visual display may be provided independently from the controller by and the target, and the user may operate the controller using a remote controller or the like while watching the screen of this display means. Also, in this case, the same effects as mentioned above are achieved. This display means may be included in the controller or the target, or the display means may be an independent device.

In this case, the data that is transmitted by the second protocol may be received not by the controller but by the display means, and the display means may arrange and display the data on the screen. Alternatively, the data may be received by the controller and arranged by the controller according to the screen size or the like of the display means. In this case, the controller creates bit map data having a size, aspect ratio, and the like which are suited to the display means, and transmits the bit map data to the display means by using the second protocol so that the display means can display the data.

SECOND EMBODIMENT

Next, with reference to the drawings, a description will be given of an AVC system utilizing a network control system having a target whose operation is different from that of the target according to the first embodiment.

Figure 15:
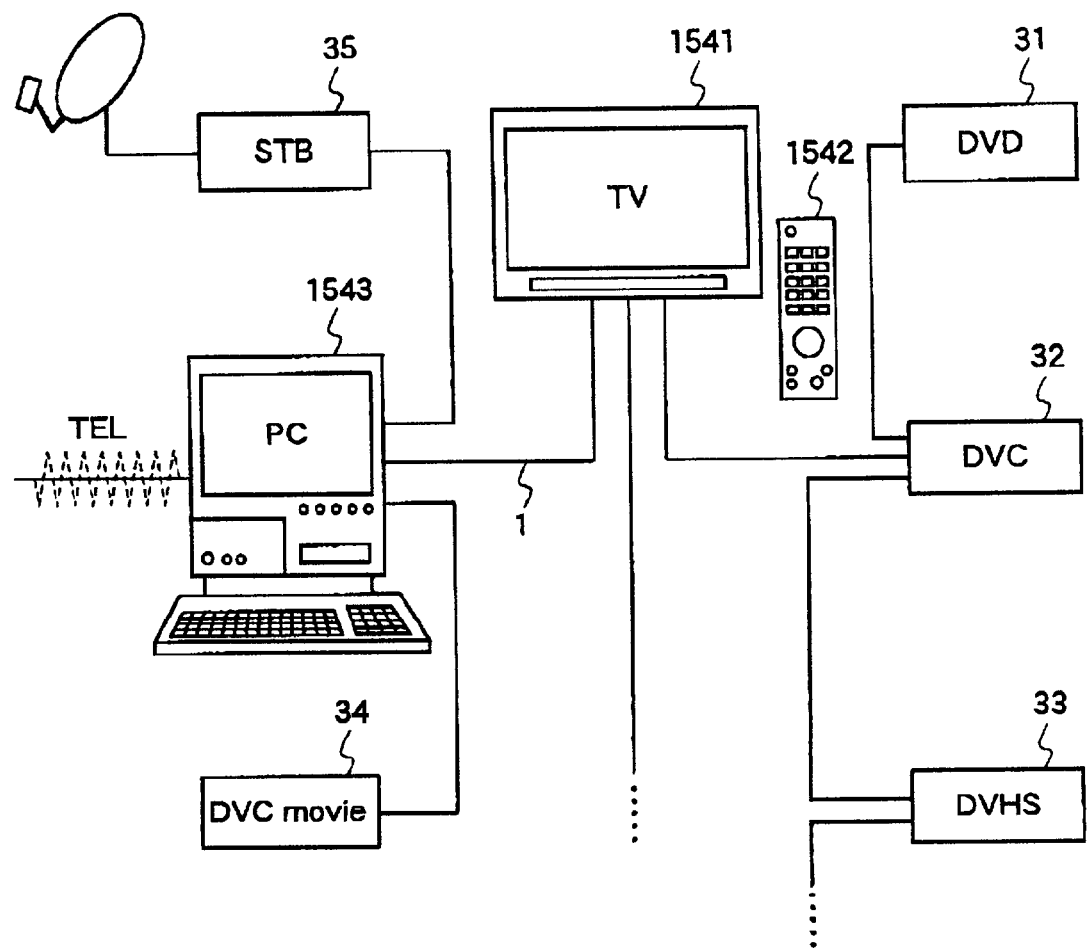
FIG. 15 is a system configuration diagram illustrating an example of a network control system according to a second embodiment of the present invention.

FIG. 15 shows an example of a system construction. In FIG. 15, reference numeral 1541 denotes a TV, reference numeral 1542 denotes a remote controller of the TV 1541, reference numeral 1543 denotes a PC, reference numeral 31 denotes a recordable and playable DVD, reference numeral 32 denotes a DV system DVC, reference numeral 33 denotes a VHS system DVBS, reference numeral 34 denotes a DV system DVC movie, and reference numeral 35 denotes a STB for SC digital broadcasting or the like. These devices are connected with each other by a transmission line 1, thereby constituting an AVC system network.

These constituents will be described first. The same constituents as those described for the first embodiment are given the same numbers as those shown in FIG. 1 and, therefore, a repeated description thereof is not necessary.

The TV 1541 is a device comprising a controller, a consumer, and a target (in this case, a ground wave tuner and a video monitor). An instruction is given to a controller internal function control means, which is described later, by using the remote controller 1542, and data which is obtained from another target is displayed on the screen.

The PC 1543 is a device comprising a controller, a consumer, and a target (in this case, a modem which interfaces with a telephone line, and a video monitor or the like). The user gives an instruction to the controller internal function control means by using a keyboard or a mouse so as to display data which is obtained from another target on the screen. Each of the TV 1541 and the PC 1543 is defined as a device in which the target, the controller, and the consumer are united.

In this second embodiment, the DVD 31, DVD32, DVHS 33, DVC movie 34, and STB 35 are described as targets, where each of these devices may include a controller and a target so long as the user can perform an operation such as selecting a function of another target with a touch panel or a remote controller although the size of the device is small. Further, each of these devices may include a consumer when it realizes an environment for displaying data of another target by a liquid, crystal panel or the like or when it has the function of processing data from another target.

Further, each of the above-mentioned devices constituting the AVC system network may be constructed as follows. That is, the device includes functions as a consumer and a controller and has a remote controller, and displays only display and audio on a monitor by analog connection so that the user can control the device with the remote controller while watching the display. In this case, the device may include a controller and a target.

Further, as a device including a consumer, there is a device for outputting data for printing or display, such as a printer and a TV, and a device for converting the format of data so as to transmit the data to another device, such as a modem, a bridge, a router, and a gateway.

Hereinafter, with reference to the drawings a description will be given of a target according to this second embodiment, which is used in the network control system so constructed.

Figure 16:
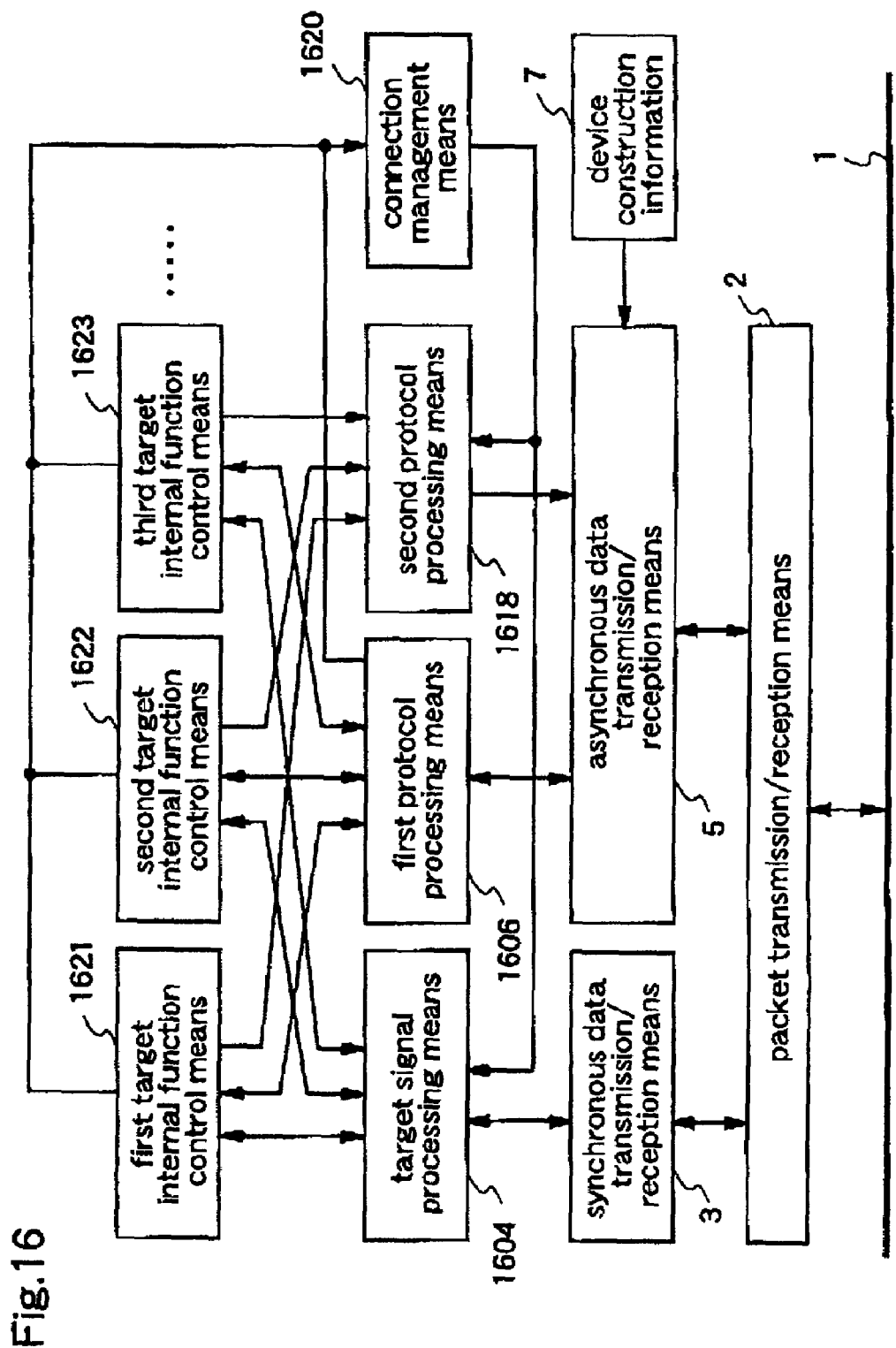
FIG. 16 is a block diagram illustrating a target in the network control system according to the second embodiment of the present invention.

FIG. 16 is a block diagram illustrating a target according to the second embodiment. In FIG. 16, reference numeral 1 denotes a transmission line, reference numeral 2 denotes a packet transmission/reception means, reference numeral 3 denotes a synchronous data transmission/reception means, reference numeral 1604 denotes a target signal processing means, reference numeral 5 denotes an asynchronous data transmission/reception means, reference numeral 1606 denotes a first protocol processing means, reference numeral 7 denotes device construction information, reference numeral 1618 denotes a second protocol transmission means, reference numeral 1620 denotes a connection management means, reference numeral 1621 denotes a first target internal function control means, reference numeral 1622 denotes a second target internal function control means, and reference numeral 1623 denotes a third target internal function control means. The number of target internal function control means may be arbitrary, that is, the target may have one piece or plural pieces of internal function control means. Further, it is supposed that a target having no internal function control means exists. In this second embodiment, three pieces of internal function control means are provided. Further, an internal function control means corresponds to a unit of function inside a target, a controller, or a consumer, and an internal function control means included in a target is called a target internal function control means.

Hereinafter, the respective constituents of the target will be described. The same constituents as those described for the first embodiment are given the same numbers as those shown in FIG. 2 and, therefore, a repeated description thereof is not necessary.

The target signal processing means 1604 receives synchronous data from the synchronous data transmission/reception means 3, and performs signal processing according to the target. For example, when the target is a recording/playback device such as a DVC, the target signal processing means 1604 subjects the synchronous data to signal processing as follows: format conversion for recording the data in a recording medium such as a magnetic tape; decoding of a transmission line code; alteration of a data compression method; and decoding of data. Then, the target signal processing means 1604 transmits the data to each of the target internal function control means according to an instruction from the connection management means 1620.

Further, the target signal processing means 1604 takes synchronous data of a recording medium or a broadcast wave from the first target internal function control means 1621, the second target internal function control means 1622, and the third target internal function control means 1623, performs format conversion and the like, and transmits the data to the synchronous data transmission/reception means 3.

The target signal processing means 1604 may be constructed so so as to perform only switching of a signal of synchronous data. In this case, the target signal processing means 1604 transmits the synchronous data which is obtained from the synchronous data transmission/reception means 3 to an appropriate target internal function control means, according to an instruction from the connection management means 1620. Then, in each target internal function control means 1621, 1622, or 1623, this data is subjected to signal processing such as format conversion, alteration of data compression method, and the like. Further, the target signal processing means 1604 selects the data which has been subjected to signal processing such as format conversion in each target internal function control means, according to an instruction from the connection management means 1620, and outputs the selected data as synchronous data to the synchronous data transmission/reception means 3.

The first target internal function control means 1621 corresponds to one function unit in the target. When the target is a VTR, the target is composed of two function units, i.e., a tuner and a deck. Each target internal function control means operates according to an instruction from the outside of the target internal function control means, and a part of each function realizes the whole. The same may be said of the second target internal function control means 1622 and the third target internal function control means 1623. These target internal function control means and controller internal function control means included in the controller are generically called "internal function control means".

When the data received by the first protocol processing means 1606 is a control code indicating the operation of a target internal function control means, the first protocol processing means 1606 makes the internal function control means indicated by this data perform the operation according to the control code. The same may be said of the second target internal function control means 1622 and the third target internal function control means 1623.

The data from the first target internal function control means 1621, second target internal function control means 1622, and third target internal function control means 1623 are transmitted to the controller through the second protocol transmission means 1618 and the asynchronous data transmission/reception means 5, according to an instruction from the connection management means 1620. A connection may be created according to an arbitrary protocol in the target between the target internal function control means 1621, 1622, 1623, and the second protocol transmission means 1618.

The connection management means 1620 manages the connection inside the target. For example, when the data received by the first protocol processing means 1606 is a message which instructs transmission of the synchronous data received from the transmission line 1 to the first target internal function control means 1621, the connection management means 1620 instructs the target signal processing means 1604 to transmit the synchronous data received by the target signal processing means 1604 in the target to the first target internal function control means 1621. Further, when each target internal function control means transmits the data by the second protocol to the consumer, the connection management means 1620 instructs the second protocol transmission means 1618 to receive the output from the target internal function control means, according to the target internal function control means.

Accordingly, the connection management means 1620 creates a connection between the target signal processing means and an appropriate target internal function control means among the first, second and third target internal function control means 1621, 1622 and 1623, according to an instruction from the first protocol processing means 1606, and then creates a connection between this target internal function control means and the second protocol transmission means 1618, according to a request from the target internal function control means.

In this way, when each target internal function control means desires wants to output the data by using the second protocol, the flow (connection) of data in the target can be automatically changed.

Next, a description will be given of the operation of the target in response to a request from the controller, according to the second embodiment. It is assumed that the controller and the consumer are included in the same device, and share data in the device. However, the controller and the consumer may be included in different devices.

Initially, when the target is connected to the transmission line 1 or the controller is connected to the transmission line 1, the controller reads the device construction information 7 of the target, and confirms the information relating to the target, such as the type of the device and the presence of GUI information.

Next, the controller (initiator) creates connections of the second protocol between the target and the consumer. These connections will be described later. Then, the controller issues a data request for the GUI information such as a panel, display parts and the like, to the target, and transmits the information to the consumer through the connection by using the second protocol. The controller may issue a command requesting only a specific display part in the GUI information, and may transmit only the display part and its ID. Thus, the controller (consumer) can display the received display part on the screen.

When the target receives the control code and the user operation information from the controller, the target performs the processing indicated by the control code and the user operation information according to the situation. For example, with respect to a display part indicating a function of the target, when the ID information of this display part is transmitted from the controller to the target together with the user operation information indicating "selection", the asynchronous data transmission/reception means 5 instructs the device internal function control means 9 to execute the function which is indicated by this display part. As the control code of the display part, the ID information of the display part is used, for example.

In this way, the target just presents the GUI information of the device in response to a request for the GUI information from the controller, and therefore, the load on the target is reduced.

Further, since it is not necessary to define a command by a standardization group or the like, even a device having a new function which cannot be supposed at present can easily use this new function through the transmission line 1.

In the target described above, since the synchronous data transmission/reception means 3 and the target signal processing means 1604 are not indispensable constituents of the present invention, these means may be arbitrarily constructed according to the functions of the target. In some cases, there are cases where these means may be dispensed with. That is, while synchronous data is received in the above description, this synchronous data may be dispensed with in some cases. Further, each means may be constituted by either hardware or software. The controller and the consumer may be included in different devices.

Hereinafter, a controller according to this second embodiment will be described with reference to the drawings.

Figure 17:
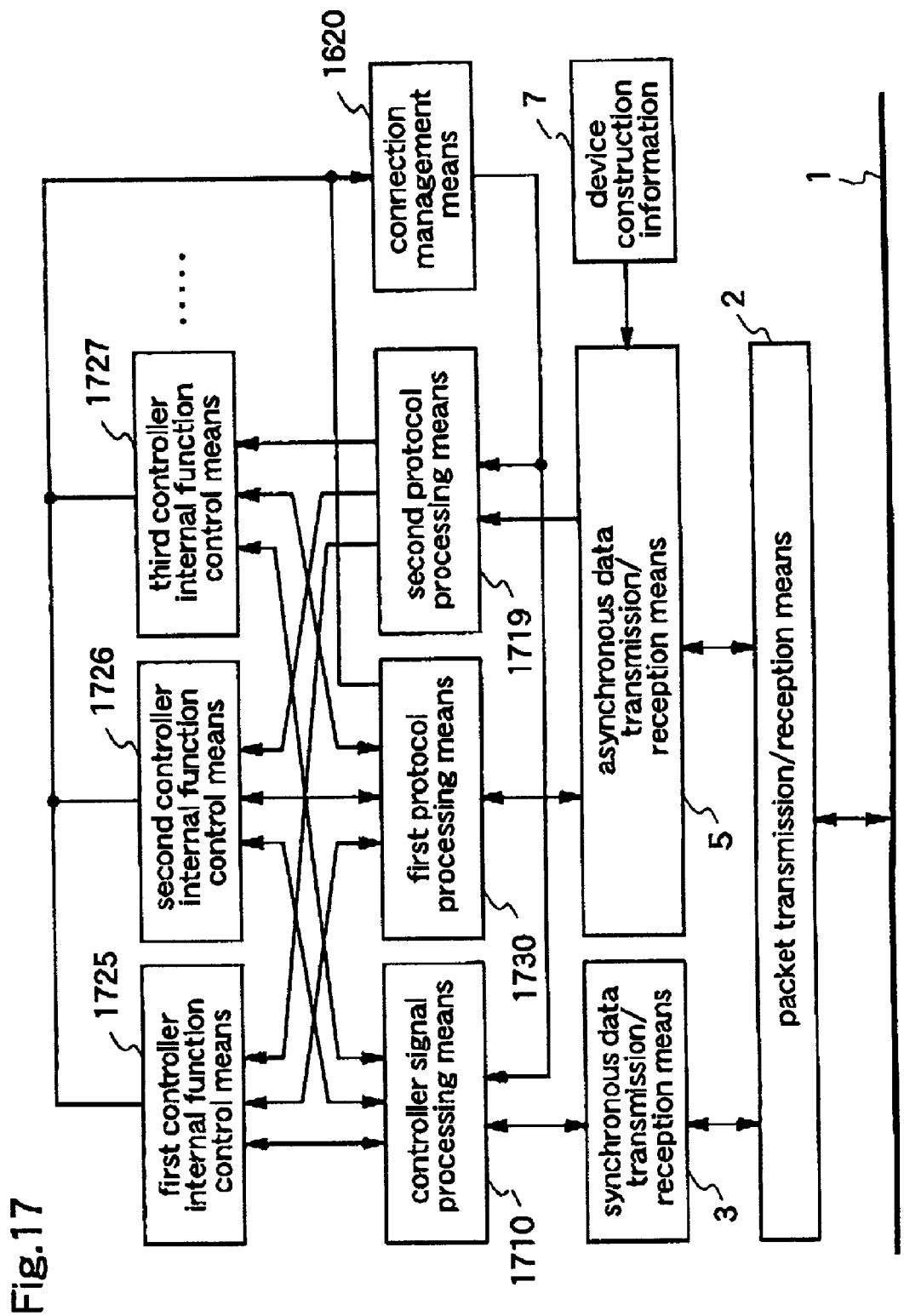
FIG. 17 is a block diagram illustrating a controller in the network control system according to the second embodiment of the present invention.

FIG. 17 is a block diagram illustrating a controller according to the second embodiment. In FIG. 17, reference numeral 1730 denotes a first protocol processing means, reference numeral 1710 denotes a controller signal processing means, reference numeral 1719 denotes a second protocol processing means, reference numeral 1725 denotes a first controller internal function control means, reference numeral 1726 denotes a second controller internal function control means, and reference numeral 1727 denotes a third controller internal function control means. The number of controller internal function control means may be arbitrary, or the controller may have no internal function control means. In this second embodiment, the controller possesses three internal function control means. While the consumer and the controller are included in the same device in this second embodiment, they may be included in different devices.

Hereinafter, the respective constituents of the controller will be described briefly. In FIG. 17, the same constituents as those shown in FIG. 16 are given the same numbers and, therefore, a repeated description thereof is not necessary.

The controller signal processing means 1710 receives synchronous data from the synchronous data transmission/reception means 3, and performs signal processing according to the controller. For example, when the controller is a device which is capable of displaying video, such as a video monitor, the controller decodes the synchronous data, e.g., an MPEG2 stream, transmits the data to the controller internal function control means which performs display, according to an instruction from the connection management means 1620, and then this controller internal function control means displays the data on the screen. The controller signal processing means 1710 subjects the data that is supplied from the controller internal function control means to signal processing, such as format conversion and stream compression or decompression, and transmits the data to the synchronous data transmission means 3.

The controller signal processing means 1710 may be constructed so as to perform only switching of a signal of synchronous data. At this time, the controller signal processing means 1710 transmits the synchronous data that is supplied from the synchronous data transmission/reception means 3 to an appropriate controller internal function control means, according to an instruction of the connection management means 1620. Likewise, the controller signal processing means 1604 selects the data which has been subjected to signal processing such as format conversion in each controller internal function control means, according to an instruction of the connection management means 1620, and outputs the data as synchronous data to the synchronous data transmission/reception means 3.

The first protocol processing means 1730 is identical to that used in the target. In this controller, however, the first protocol processing means 1730 is connected not with the target internal function control means in the target described above but with the first, second, and third controller internal function control means 1725, 1726, and 1727.

The second protocol processing means 1719 performs the processing at the consumer end, i.e., the receiver end. The second protocol processing means 1719 receives the data of the target internal function control means in the target, from the connection by using the second protocol, through the asynchronous data transmission/reception means 5, and transmits the data to the controller internal function control means which is described later. The connection management means 1620 performs the process of connecting/disconnecting the connection by the second protocol, through the first protocol processing means 1730 and the asynchronous data transmission/reception means 5, according to the first protocol.

The controller internal function control means such as the first controller internal function control means 1725, the second controller internal function control means 1726, and the third controller internal function control means 1727 are function units for realizing functions, such as various applications like an application for device control and an application for edition, display, printing, etc., and the controller (consumer) receives the data from these controller internal function control means by the second protocol. The received data is, for example, an instruction of display or instruction of printing. For example, a controller internal function control means displays a display part indicating the GUI information of the target which has been received by using the second protocol, on the screen of the controller, to inform it to the user, and further, the controller internal function means performs selection of a target and a function by using the first protocol according to the user operation. Further, the controller internal function control means can display or play back the data received from the controller signal processing means 1710, or the data received from the first protocol processing means 1730 or the second protocol receiving means 1719. Although the controller internal function control means are provided in this second embodiment, internal function control means may be included in the consumer.

The operation of the controller according to this second embodiment will be described hereinafter.

Initially, when the user selects a display part indicating a target, the controller reads the GUI information of this target from the target internal function control means (in this case, the first target internal function control means 1621) of the target, and displays the read GUI information on the screen.

Next, when the user selects a display part indicating a function from the GUI information, the controller issues a control code and user operation information corresponding to the display part which is obtained from the first target internal function control means 1621, through the first protocol processing means 1730 and the like. The controller internal function control means (in this case, the first controller internal function control means 1725) receives a response of the target to the control code and the user operation information, as GUI information, through the second protocol receiving means 1719.

Further, when the controller receives a notification about a change of the GUI information, e.g., the changed GUI information, from the target by the second protocol, the controller displays the changed device on the screen. Accordingly, the controller can display the latest GUI with respect to the state of the target at the present time, on the screen, to inform it to the user.

Next, with reference to the drawings a description will be given of the method of connecting/disconnecting the connection used by the second protocol.

FIGS. 18(a)–18(c) are diagrams each illustrating the method of connecting/disconnecting the connection used by the second protocol. FIG. 18(a) shows the case where an initiator and a consumer are independent devices, FIG. 18(b) shows the case where an initiator is an independent device, and FIG. 18(c) shows the case where an initiator and a consumer are included in a device where a controller exists. In these figures, reference numeral 1840 denotes an initiator, reference numeral 1841 denotes a controller, reference numeral 1842 denotes a target, and reference numeral 1843 denotes a consumer.

The "connection" is a path for data transmission, which is logically constituted for the data flowing on the transmission line 1, and the target and the consumer may possess plural connections. In this case, each connection designates an address or the like for data transmission/reception by a logical plug number or port number, and each connection is distinguished from one another connection by the plug number or port number.

FIG. 18(a) shows an example in the case where the initiator, the controller, the target, and the consumer are included in independent devices, respectively, and there is a connection created by the initiator between the target and the consumer.

Initially, the initiator 1840 creates a connection of the second protocol between the controller 1841 and the consumer 1843. In this connection, the transmitter of the data transmitted by the second protocol is the target 1842, and the receiver of the data is the consumer 1843.

The initiator 1840 obtains, from the controller 1841, information which is required for connection, e.g., information about resources of the controller such as an address of a connectable buffer, and tries to connect the target 1842 to the connection by using the obtained information. When the initiator 1840 succeeds in this, the initiator 1840 tries to connect the consumer 1843 to the connection. In this way, the connection is established between the controller 1841 and the consumer 1843.

Likewise, when disconnecting the devices from the connection, the initiator 1840 disconnects the consumer 1843 from the connection and then disconnects the target 1842 from the connection. When the initiator 1840 succeeds in this, the initiator 1840 releases the resources which have been reserved for connection by the consumer 1843.

Accordingly, the controller 1841 is not concerned with the establishment/disconnection of the connection between the target 1842 and the consumer 1843.

Figure 18:
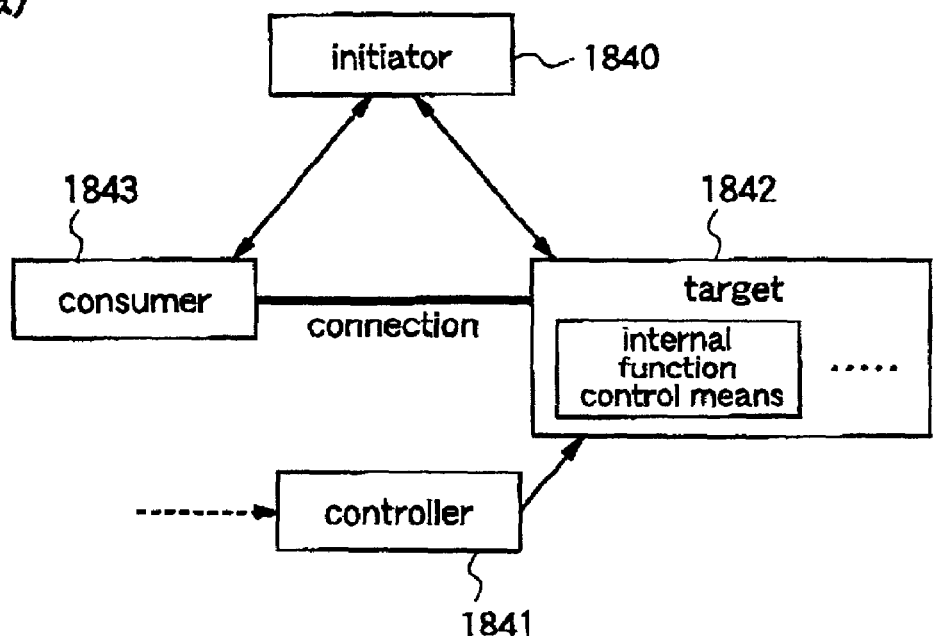
FIG. 18(a) is a system configuration diagram in the case where an initiator and a consumer according to the second embodiment of the invention are present as independent devices
FIG. 18(b) is a system configuration diagram in the case where the initiator according to the second embodiment is an independent device.
FIG. 18(c) is a system configuration diagram in the case where the initiator and the consumer according to the second embodiment are included in a device where a controller exists.
Figure 18:
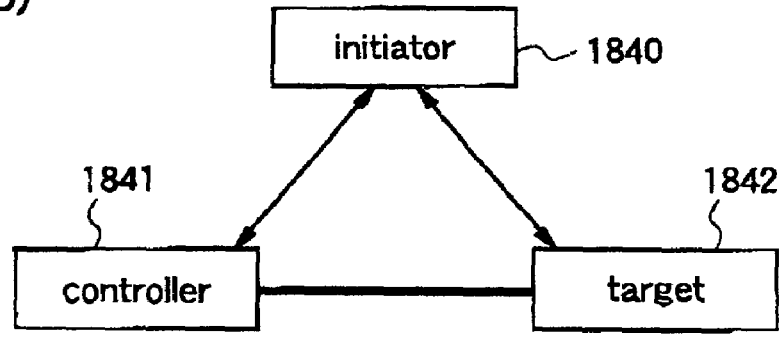
Figure 18:

FIG. 18(*b*) shows an example in the case where the initiator, the controller, and the target are included in independent devices, respectively, and the consumer is included in the device where the controller exists. A connection created by the initiator is present between the target and the controller.

In this connection, the transmitter of the data transmitted by the second protocol is the target 1842, and the receiver of the data is the controller 1841.

The initiator 1840 obtains, from the controller 1841, information which is required for connection, e.g., information about resources of the controller such as an address of a connectable buffer, and tries to connect the target 1842 to the connection by using the obtained information. When the initiator 1840 succeeds in this, the initiator 1840 tries to connect the controller 1841 to the connection. In this way, the connection is established between the controller 1841 and the target 1842.

Likewise, when disconnecting the devices from the connection, the initiator 1840 disconnects the controller 1841 from the connection and then disconnects the target 1842 from the connection. When the initiator 1840 succeeds in this, the initiator 1840 releases the resources which have been reserved for the connection by the consumer 1841.

Next, FIG. 18(*c*) shows an example in the case where the controller and the target are included in independent devices, and the initiator and the consumer are included in the device where the controller exists. A connection created by the initiator is present between the target and the controller.

The controller 1841 creates a connection of the second protocol between the controller 1841 and the target 1842. In this connection, the transmitter of the data transmitted by the second protocol is the target 1842, and the receiver of the data is the controller 1841. That is, the controller doubles as the initiator shown in FIG. 18(*b*). The controller 1841 obtains information which is required for the connection of itself, e.g., information about resources such as an address of a connectable buffer, and tries to connect the target 1842 to the connection by using the obtained information. When the controller 1841 succeeds in this, the controller 1841 tries to connect itself to the connection.

In this way, the connection is established between the controller 1841 and the consumer 1843.

Likewise, when disconnecting the devices from the connection, the controller 1841 disconnects itself from the connection and then disconnects the target 1842 from the connection. When the controller 1841 succeeds in this, the controller 1841 releases the resources which have been reserved for connection by itself.

Hereinafter, the method of establishing a connection according to this second embodiment will be described by using the model shown in FIG. 18(*c*). However, the method can also be realized using other models, and the same effects will be obtained.

Since the connection establishment method depends on the second protocol, the initiator creates a connection by a method which is suited to the second protocol.

Figure 19:
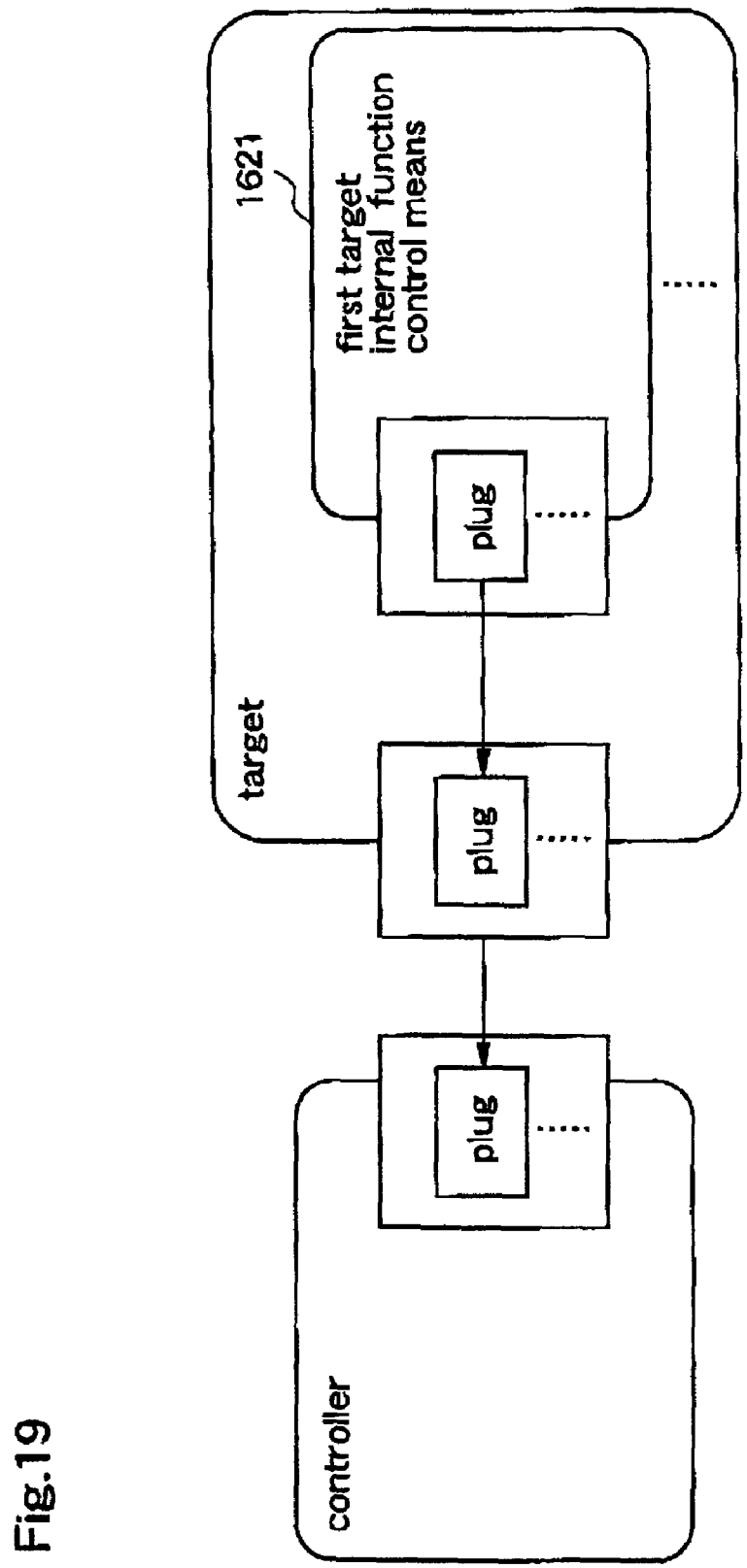
FIG. 19 is a diagram illustrating the relationship between a controller creating a connection, and a target, according to the second embodiment of the present invention.

FIG. 19 shows the flow of data when performing data transmission by the second protocol.

In FIG. 19, a "plug" indicates an opening through which data is input and output, and this is a logical plug. For example, each plug has a plug number, and is distinguished from another plug by this plug number. A plug of the target is included in the second protocol processing means 1618, and a plug of the controller is included in the second protocol processing means 1719.

Initially, as described with respect to FIG. 18, the controller (initiator) establishes a connection of the second protocol between the target and the controller (consumer). At this time, the connection of the second protocol is created between the plug of the target and the plug of the controller (consumer).

As shown in FIG. 19, a plug for outputting data to be transmitted by the second protocol is provided in each target internal function control means of the target. When a data output request is made to a certain target internal function control means by the first protocol from the controller, the first protocol processing means 1606 in the target outputs a data output command to the target internal function control means to which the request is made. Upon receipt of the command, the target internal function control means prepares for outputting data from its plug. To be specific, the target internal function control means searches for the data to be output. When the target internal function control means confirms the presence of the data, the target internal function control means acknowledges the receipt of the command, and instructs the connection management means 1620 to transmit the data which is supplied to the internal connection of the target, i.e., the plug of the target internal function control means, to the plug of the target.

The connection management means 1620 confirms that the connection of the second protocol is not used by another target internal function control means, and establishes a flow of data in the target (internal connection).

The protocol for data transmission/reception inside the target is arbitrary, and it may be performed by controlling writing of data into an arbitrary buffer.

Since the plug of the target is connected with the plug of the controller through the connection using the second protocol, the data supplied to the plug of the target is transmitted to the plug of the controller by the second protocol transmission means 1618, according to the second protocol. The data supplied to the plug of the controller is received by the second protocol reception means 1719, and is transmitted to an appropriate controller internal function control means according to an instruction of the connection management means 1620 in the controller.

When the target internal function control means ends the data transmission, the connection management means 1620 disconnects the internal connection of the target, according to an instruction of the target internal function control means. Accordingly, another target internal function control means can transmit data onto the connection between the target and the controller by using the second protocol.

Figure 20:
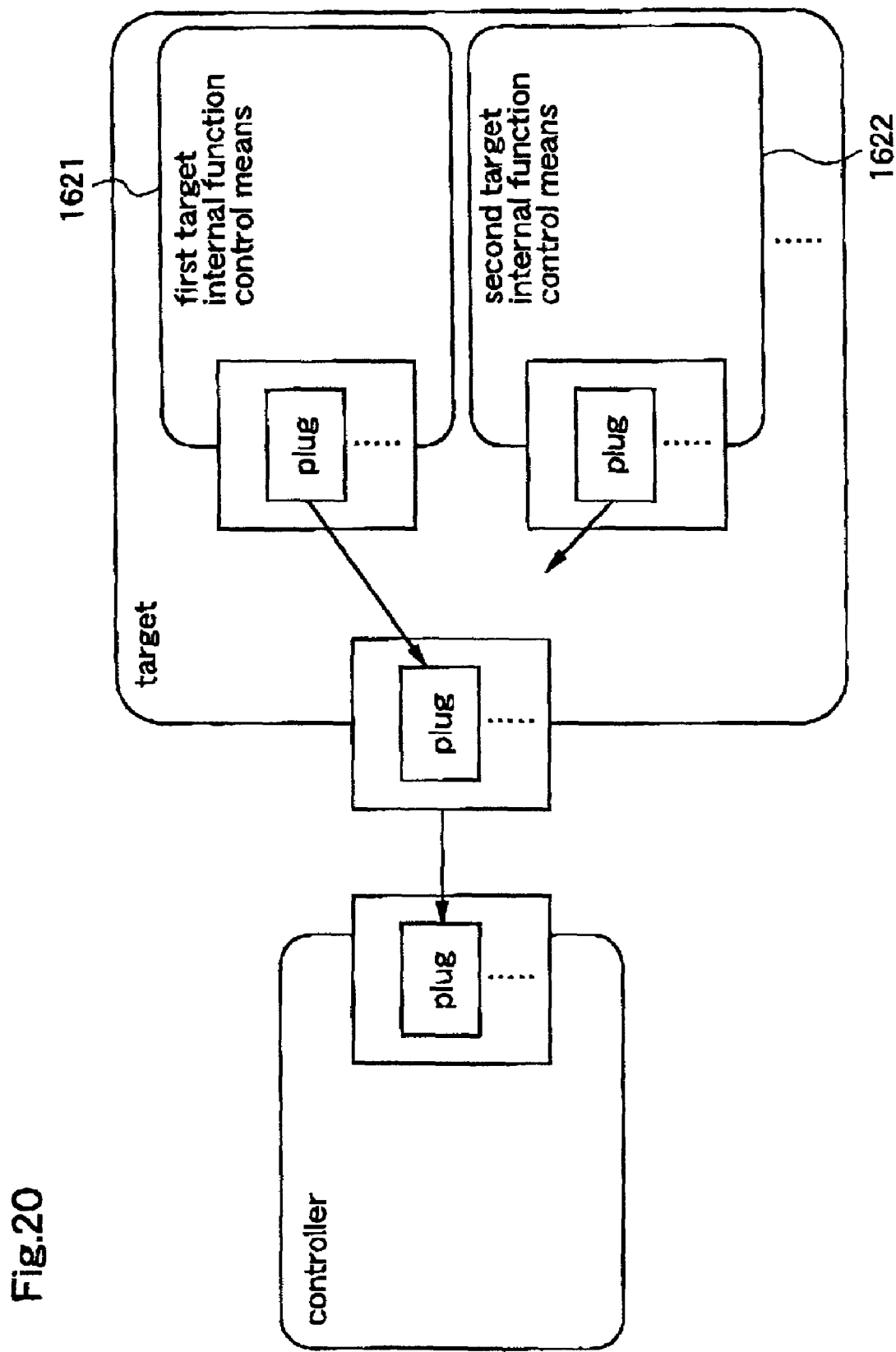
FIG. 20 is a diagram illustrating the relationship between a controller creating a connection, and a target having a plurality of internal function control means, according to the second embodiment of the present invention.

FIG. 20 shows the flow of data transmitted by the second protocol in the case where the target has plural pieces of target internal function control means.

Initially, as described with respect to FIG. 19, the controller (initiator) establishes a connection of the second protocol between the target and the controller (consumer). At this time, the connection of the second protocol is created between the plug of the target and the plug of the controller (consumer).

Further, each target internal function control means inside the target is provided with a plug for outputting data to be transmitted by the second protocol. When a data output request is made to the first target internal function control means by the first protocol from the controller, the first protocol processing means 1606 in the target outputs a data output command to the first target internal function control means. In response to this command, the first target internal function control means prepares for outputting data from its plug, and searches for the data to be output. When the first target internal function control means 1621 confirms the presence of the data, the first target internal function control means 1621 acknowledges the receipt of the command. At the same time, the first target internal function means 1621 outputs a request for connecting the internal connection of the target, to the connection management means 1620.

Assuming that the data output request from the controller is also transmitted to the second target internal function control means 1622, the second target internal function control means 1622 prepares for outputting data from its plug according to a command, and outputs a request for connecting the internal connection, to the connection management means 1620.

When the first target internal function control means 1621 and the second target internal function control means 1622 simultaneously output requests to transmit data onto the connection of the second protocol, to the connection management means 1620, the connection management means permits the data transmission with the priority which has previously been determined, and connects the internal connection. When output of data from the target internal function control means having the higher priority is ended, the connection management means 1620 disconnects this target internal function control means from the internal connection, and connects the other target internal function control means to the internal connection so as to perform data transmission from this target internal function control means.

The higher priority is set to an internal function control means to which a rapider response is requested. Accordingly, similar to like the GUI information, an internal function control means which can rapidly respond to the user operation is easily realized. The priority may be dynamically changed such that the internal function control means which has once performed data transmission is given the lower priority, whereby every internal function control means can transmit data. Further, the controller may specify this priority, whereby data transmission suited to the application of the controller is realized.

The data transmitted by the second protocol has ID information of the target internal function control means from which the data is transmitted, and the controller can distinguish the data that is transmitted through the connection by using this information. Accordingly, the controller can receive and distinguish desired data with relative ease.

The priority with respect to connection/disconnection of each target internal function control means to/from the internal connection may be managed by the plug.

Figure 21:
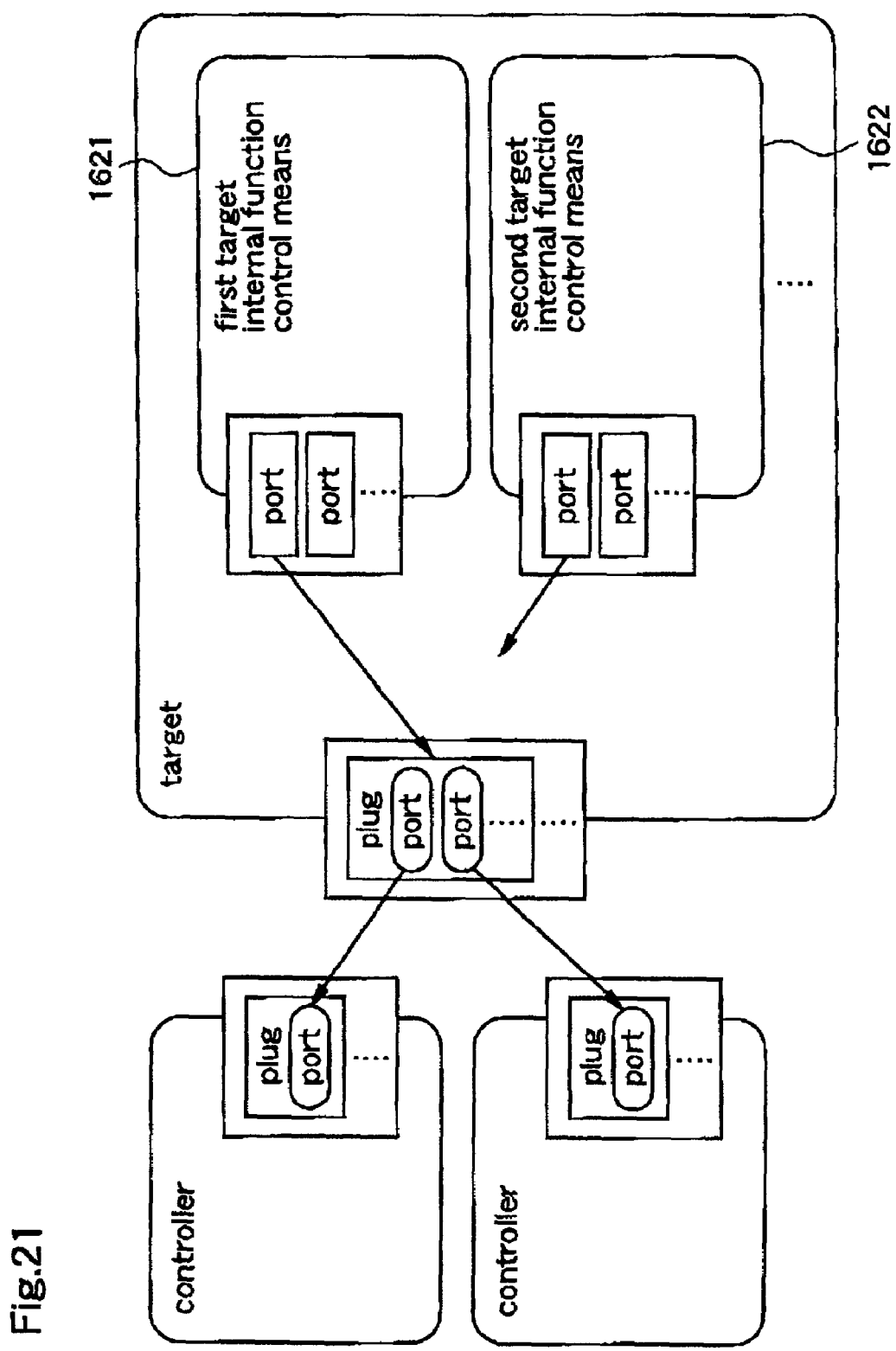
FIG. 21 is a diagram illustrating the relationship between controllers creating connections, and a target having a plurality of internal function control means.

FIG. 21 shows the flow of data that is transmitted by the second protocol in the case where there are plural transmitters.

In FIG. 21, a "port" indicates a logical place in each plug, through which data is input and output, and each port is connected to another port by one-to-one correspondence. Accordingly, each plug indicates an opening through which the same data is input and output, and each port indicates a place which is connected to the opposite port. For example, each port has a port number, and each port is distinguished from another port by this port number.

Initially, as described with respect to FIG. 19, the controller (initiator) establishes a connection of the second protocol between the target and the controller (consumer). At this time, the connection of the second protocol is created between the plug of the target and the plug of the controller (consumer). At this time, one port is assigned to each of the target and the controller. In FIG. 21, there are plural controllers, and each controller establishes a connection of the second protocol in this way. Each port indicates a logical opening for inputting and outputting data, and makes a one-to-one correspondence with the other port. For example, it corresponds to an address of a buffer for the other port.

Further, although each target internal function control means in the target is provided with a plug for outputting data to be transmitted by the second protocol, since there in no necessity of specifying the destination of the data, the plug has no port. When a data output request is made to the first target internal function control means 1621 by the first protocol from the controller, the first protocol processing means 1606 in the target outputs a data output command to the first target internal function control means 1621. In response to this command, the first target internal function control means 1621 prepares for outputting data from its plug, and searches for the data to be output. When the first target internal function control means 1621 confirms the presence of the data, the first target internal function control means 1621 acknowledges the receipt of the command. At the same time, the first target internal function control means 1621 outputs a request for connecting the internal connection of the target, to the connection management means 1620. The connection management means 1620 permits data transmission according to the priority which has previously been determined, and connects the internal connection.

Since the plug of the target is connected with the plug of the controller by the connection using the second protocol, the data supplied to the plug of the target is transmitted to the plug of the controller by the second protocol transmission means 1618 using the second protocol. Since each plug has a port, the same data is transmitted to all of the effective ports.

Accordingly, in the controller, the second protocol processing means 1719 receives the data that is transmitted through the port in the plug of the controller, and transmits the data to an appropriate controller internal function control means according to an instruction of the connection management means 1620.

When the target internal function control means ends the data transmission, the target internal function control means disconnects the internal connection of the target. Accordingly, another target internal function control means can transmit data onto the connection between the target and the controller by using the second protocol.

In this way, the same data can be transmitted to plural controllers.

As described above, the controller can obtain desired data by instructing the target to output the data from the corresponding target internal function control means. That is, in contrast with the conventional controller, the controller of this second embodiment need not establish a connection inside the target and, therefore, the controller need not have information relating to the construction of the target. Further, since the internal connection is established only when it is needed, plural target internal function control means can share the connection between the target and the controller, whereby the construction of the target is simplified, and the resources required for the second protocol, such as buffers and plugs, are effectively utilized.

Further, once a connection of the second protocol is created between the consumer and the target, there is no necessity of establishing a new connection even when a new internal function control means is generated in the consumer or the target or when new data transmission with the existing internal function control means is required. That is, these internal function control means can share the existing connection to perform data transmission, whereby the processing is simplified.

Further, in the network control system so constructed, even when the same data is transmitted from a target internal function control means in the target to plural controllers, the transmitted data can be relayed at the plug of the target.

As described above, since the target internal function means are provided in the target, the resources of the target such as plugs and buffers are effectively utilized, which results in a simplified structure of the target.

Next, a description will be given of the operation of the controller and the target in the network control system according to the second embodiment.

Figure 22:
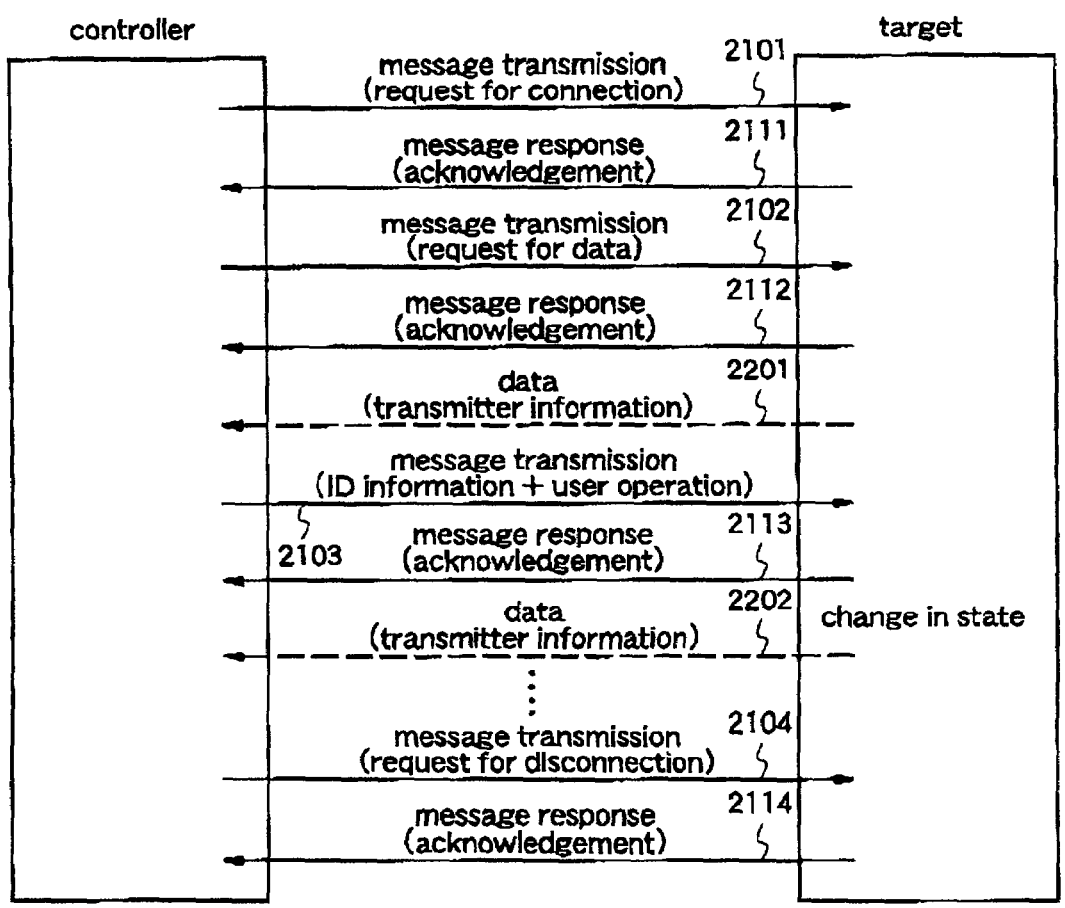
FIG. 22 is a diagram for explaining a protocol according to the second embodiment of the present invention.

FIG. 22 is a diagram for explaining data transmission and reception between the controller and the target in the network control system according to the second embodiment. In the following description, no initiator is provided, i.e., the controller doubles as an initiator. Although transmission of GUI information will be described as an example, data to be transmitted is not restricted to the GUI information. When the target or the controller is a digital still camera, data to be transmitted is still-picture data, and when the target or the controller is a printer, data to be transmitted is print data. Further, the data to be transmitted may be arbitrary file data, such as video data, audio data, program data, or data base information. Initially, when a target is connected to the transmission line 1, the controller existing on this transmission line 1 recognizes this new target by a bus reset signal or the like, reads information about the target which is written in the device construction information 7, from the target, through the transmission line 1, and recognizes what the target is and what kind of protocol the target supports. When the target supports the first protocol, the controller inquires of the target about the internal function control means possessed by the target, with the first protocol, and detects the first target internal function control means 1621 (it may be the second target internal function control means 1622 or the third target internal control means 1623) which supports the GUI information. In the target, these processes are performed by the first protocol processing means 1606. In the controller, these processes are performed by the first protocol processing means 1730 and the internal function control means. Further, these processes may be performed by the controller internal function control means.

When the first controller internal function control means 1725, which is one of applications in the controller (it may be the second controller internal function control means 1726 or the third controller internal function control means 1727), displays the GUI information of the target, the controller initially reverses the resources in the controller which are required for the second protocol, and makes a message transmission 2101 shown in FIG. 22, i.e., a request for connection, to the target by the first protocol. Then, the target checks whether it is possible to connect itself to the connection of the second protocol. When the connection is possible, the target connects itself to the connection of the second protocol. When the controller confirms, by a message response 2111, that the target acknowledges the request, the controller connects itself to the second protocol, whereby the connection of the second protocol is established.

Next, when the first controller internal function control means 1725 requires the GUI information of the target, the first controller internal function control means 1725 transmits a request for data transmission, by a message transmission 2102, to the first target internal function control means 1621. This message transmission 2102 may include information about a notification range that indicates a range within which the controller desires to match its information with that of the target. When the first target internal function control means 1621 acknowledges, the target returns a primary response 2112 as a response to the transmission. Then, the first target internal function control means 1621 transmits the request for data transmission by the second protocol to the connection management means 1620, and the connection management means 1620 transmits the data outputted from the first target internal function control means 1621 to the controller through the connection of the second protocol.

The message response 2112 may include version information or the like according to the notification range. In this way, the controller obtains the data of the GUI information, and displays the obtained data on the screen.

When the user selects the display part indicating the playback function of the target by using the pointing function of the remote controller such as a crosshairs key showing up, down, left, and right, the first controller internal function control means 1725 transmits the ID information of the display part which is assigned by the target, as a control code, to the target, together with the user operation information, i.e, "selection". That is, the controller transmits the ID information of the display part (control code) and the user operation information ("selection"), as a message transmission 2103, to the first target internal function control means 1621 of the target. The controller can transmit more precise user operation information to the target, and it is supposed that the controller may make another request for data.

The user operation information may be encoded and transmitted together with the ID information of the display part, or each user operation information may be transmitted as one command (the operand is the control code such as the ID information of the display part).

Next, as a response to the operation request, the target returns a message response 2113 indicating that the transmitted message 2103 is received by the target, is rejected, or is not supported.

Next, when the state inside the target is changed and thereby the display part of the GUI information in the target is changed, the first target internal function control means 1621 in the target spontaneously transmits the changed data (display part) by using the second protocol to the controller. That is, when the data inside the first target internal function control means 1621 is changed, the first target internal function control means 1621 transmits a request for data transmission by the second protocol to the connection management means 1620. Accordingly, the connection management means 1620 outputs the data outputted from the first target internal function control means 1621 to the plug of the target, and the second protocol transmission means 1618 transmits it onto the connection by the second protocol.

Further, when the controller designates a menu unit as a notification range in the case where the information is changed in the target and the menu to be displayed is changed by the user operation or the like, the target transmits a new menu to the controller and notifies the controller of the changed information only when the information in the new menu is changed. This is not restricted to the menu, and is also applicable to each display part.

Then, the controller internal function control means writes the data of the changed display part in the corresponding part so as to update it, and the controller internal function control means displays the updated function chart.

When the controller ends the display of the device of the target, the controller disconnects itself from the connection of the second protocol, and makes a message transmission 2104 (request for disconnection) to the target by using the first protocol.

The target checks whether or not disconnection of itself from the connection of the second protocol is proper. When disconnection is proper, the target disconnects itself from the connection.

After the controller confirms that the target acknowledges the request by a message response 2114, the controller releases the resources in the controller which are required for the second protocol, which have been reserved by itself.

In the above-description, the connection is established when the controller displays the information of the target on the screen. However, the connection of the second protocol may always be established while power is on the target, or the connection of the second protocol may be created every time the controller requests the GUI information. Alternatively, the initiator may create the connection of the second protocol according to a request from the controller internal function control means. The same may be said of disconnection of the devices from the connection.

Further, with respect to the internal connection of the target, the target internal function control means or the plug in the target may create the connection. The same may be said for the disconnection of the internal connection.

The order of the response message 2112 and the data transmission 2201 by the second protocol is arbitrary, and the response message 2112 may be returned after the data transmission 2201 has started. That is, a message indicating a data request only instructs data output, and it is not necessary to assure data transmission. When data transmission is assured, the controller receiving this data (or the controller internal function control means) decides whether the requested data has been received correctly, and when the requested data has not been received correctly, the controller makes a second data sequent, or the controller inquires about the state in the target (or target internal function control means) by the first protocol and checks the connection, and then makes a second request according to the situation. In this way, the network control system can deal with unexpected errors, whereby the data are transmitted with high reliability.

When the controller and the consumer are included in different devices, the controller also transmits a message (reception request) to the consumer by using the first protocol. Accordingly, when the consumer has received the data correctly, the consumer returns a response message indicating "completion" to the controller. When errors occur during data reception, the consumer returns a message indicating "error" to the controller. Thereby, the controller confirms whether or not the data has been correctly transmitted, and inquires about the state of the target and checks the connection if necessary. Then, according to the situation, the controller outputs a request for retransmission to the target, and a second reception request to the consumer. As described above, since an error check is performed according to whether or not the consumer has received the data correctly, errors are detected with reliability, and error recovery is executed by the simple method.

While the GUI information is transmitted by the second protocol in the above description, arbitrary data may be transmitted or received by the second protocol, for example, still-picture file data, bit map of part or all of the screen, text data, OSD (On Screen Data), and audio file data. Further, while the controller displays the data received by the second protocol on the screen in the above description, the controller may print or process the received data, with the same effects as mentioned above.

Next, the controller's transmission/reception operation will be described with reference to the drawings. The description about error handling during communication is omitted.

Figure 23:
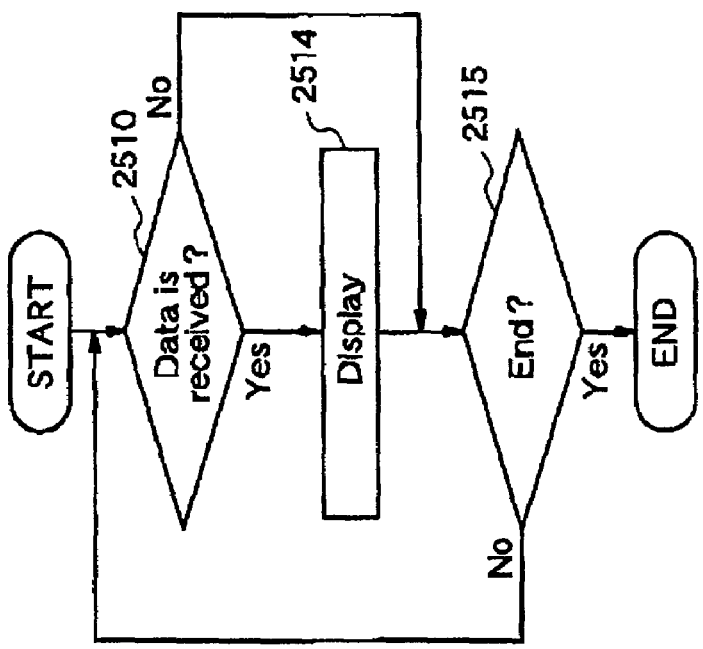
FIG. 23 is a flowchart illustrating the operation of the controller according to the second embodiment of the present invention.
Figure 23:
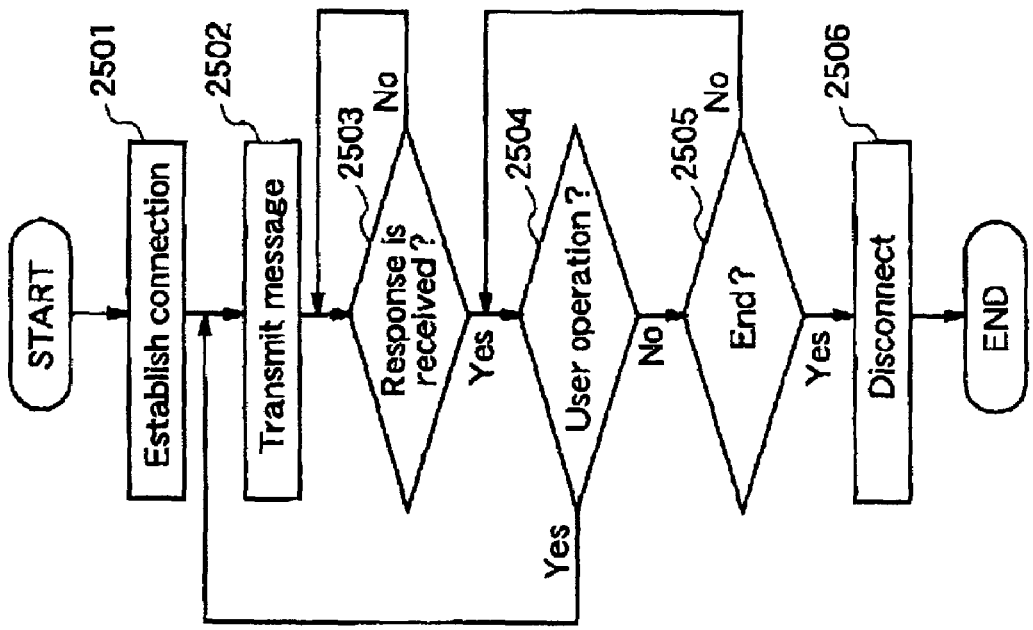

FIGS. 23(*a*) and 23(*b*) are flowcharts each illustrating the operation flow of the controller. To be specific, FIG. 23(*a*) shows the operation relating to the first protocol, and FIG. 23(*b*) shows the operation relating to the second protocol. The operation flows shown in FIGS. 23(*a*) and 23(*b*) are executed in parallel with each other on the controller.

With reference to FIG. 23(*a*), in step 2501, the controller establishes a connection for the second protocol to the target according to a request inside the controller such as the user's pushing a menu button of the remote controller. Then, in step 2502, in order to display the GUI of the target according to the user operation, the controller transmits a message of a request for data to the target. The controller waits for a response to this data request in step 2503. When the controller receives an acknowledgement from the target, the controller detects the user operation in step 2504.

In the case where the user performs an operation on the operation screen of the controller and then the controller notifies of the target about this operation, the controller transmits the ID information of the object and the user operation information to the target in step 2502.

On the other hand, when there is no user operation, the controller decides whether or not this operation flow should be ended in step 2505. When the controller decides that there is no necessity of displaying the GUI information of the target according to the user operation or the like, the controller disconnects the connection of the second protocol in step 2506. On the other hand, when the controller continues to display the GUI information of the target, the controller checks the user operation to be transmitted to the target in step 2504. Step 2504 is merely an example, and this step is not necessarily performed, that is, this step may be dispensed with.

The operation flow shown in FIG. 23(*b*) is started after the controller has established the connection in step 2501 shown in FIG. 23(*a*). Initially, the controller checks reception of data by using the second protocol in step 2510. When the controller receives data, the controller updates the display in step 2514.

After updating the display in step 2514 or when receiving no data in step 2510, the controller decides whether or not this operation flow should be ended in step 2515. When the controller decides that there is no necessity of displaying the GUI information of the target according to the user operation, the controller ends this operation flow. On the other hand, when the controller continues to display the GUI information of the target, the controller waits for data reception in step 2510. The END decisions in steps 2510 and 2515 may be performed at the same time.

Next, the target's transmission/reception operation will be described with reference to the drawings. The description about error handling during communication is omitted.

Figure 24:
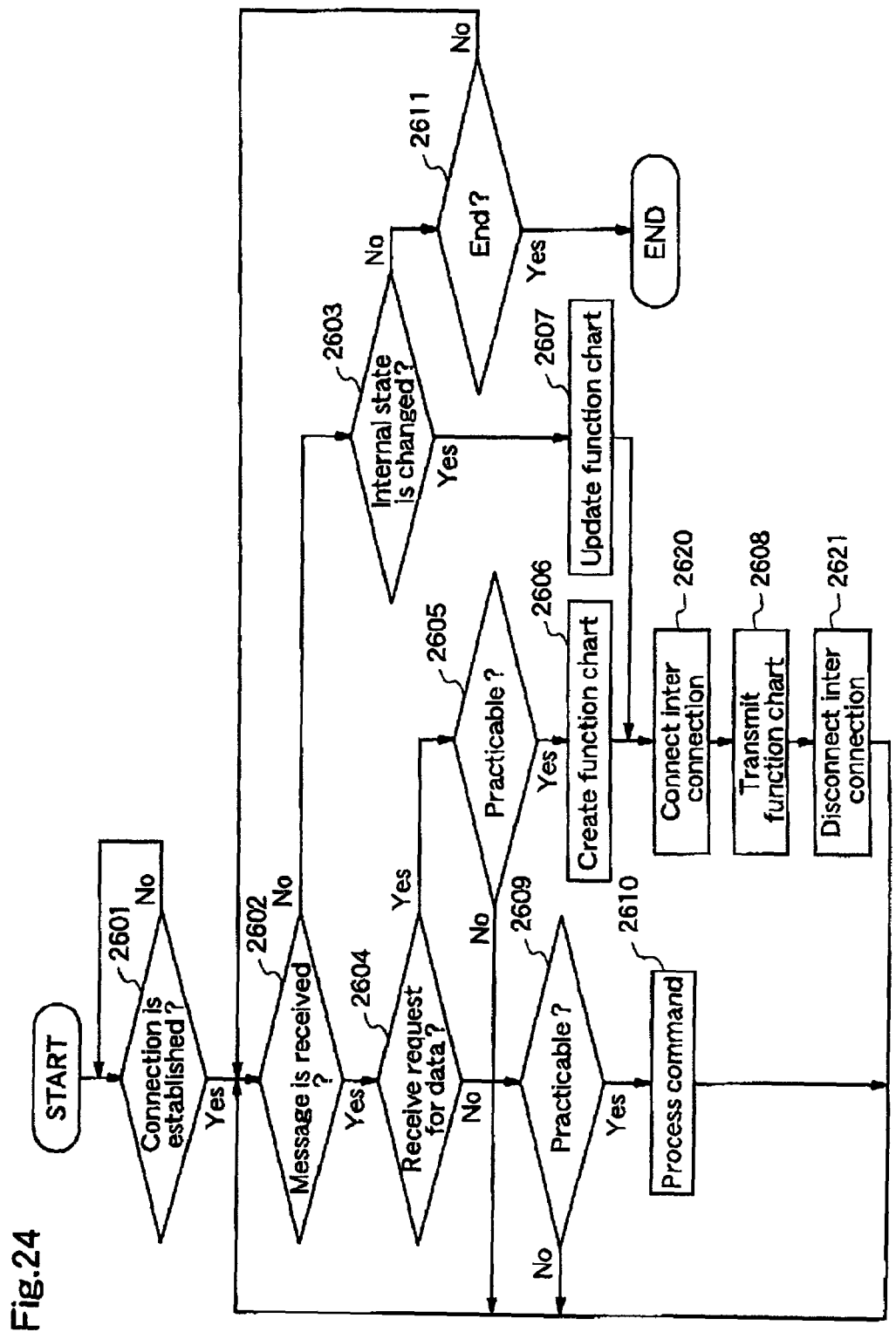
FIG. 24 is a flowchart illustrating the operation of the target according to the second embodiment of the present invention.

FIG. 24 is a flowchart showing the operation flow of the target. Initially, in step 2610, the target waits for the controller to establish the connection of the second protocol. After the connection has been established, the target checks whether there is a message from the controller in step 2602.

When there is no message, the target checks its internal state in step 2603. When the state is not changed, the target decides whether or not the operation flow should be ended in step 2611. When the target is disconnected from the connection by the controller or when the target receives an END message from the controller, the target ends this operation flow. On the other hand, when the target continues the operation, the control returns to step 2602.

When there is a message in step 2602, the target decides the purpose of this message, checks the state of the target and whether the target supports this function, and then transmits a response to the message to the controller according to the practicability of this message, in steps 2604 and 2609.

When the received message is a data request, the target decides the practicability of this request in step 2605. When the data request is practicable, the target sends an acknowledgement to the controller, and creates data (function chart) or prepares the existing data (function chart) when it is available, in step 2606. Then, the target establishes the internal connection between the target internal function control means and the plug of the target in step 2620, and transmits the data (function chart) to the controller in step 2608. After transmission, the target disconnects the internal connection between the target internal function control means and the plug of the target in step 2621. On the other hand, when the request is not practicable, the target sends a message such as "execution rejected" to the controller.

Likewise, when the internal state of the target is changed in step 2603, the target updates the data (function chart) in step 2607, establishes the internal connection between the target internal function control means and the plug of the target in step 2620, and transmits the data (function chart) to the controller in step 2608. After transmission, the target disconnects the internal connection between the target internal function control means and the plug of the target in step 2621.

When the received message is not a data request but ID information of a display part and user operation information, the target performs processing according to each message in step 2609. To be specific, the target decides the practicability of the message in step 2609. When the message is practicable, the target transmits an acknowledgement to the controller, and performs processing corresponding to this message in step 2610. On the other hand, when the message is not practicable, the target sends a message such as "execution rejected" to the controller.

While an END decision is made in step 2611 in the above description, when the target receives a message about disconnection or a message about end of GUI display from the controller, the END decision may be made in step 2610 to end the operation flow.

While the function chart possessed by the target is described as data to be transmitted, data possessed by the target is not restricted thereto.

As described above, since data are transmitted by using plural protocols, an appropriate protocol can be used for mass data such as icons, whereby rapid and efficient data transmission is realized. Further, the connection management means and the internal function control means are provided in the target, and the connection management means establishes the internal connection between the output of the internal function control means and the connection of the second protocol according to a request from the internal function control means. Therefore, even when plural pieces of internal function control means exist in the target as well as when a single internal function control means exists in the target, the initiator need not create the internal connection of the target, and the target can freely establish the internal connection, whereby the target can switch the internal connection according to the responsibility of each internal function control means for data transmission, with the result that the target can be designed with a desired performance.

Further, an arbitrary number of internal connections of the target can be established as needed, and plural internal function control means can share one connection of the second protocol, whereby the resources which are required for the second protocol such as buffers and plugs are effectively utilized, which results in a simplified construction of the target. Further, since the processing inside the target is simplified, the load on the target is reduced. Further, the consumer and the controller need not have information relating to the construction of the target, and only one connection is needed even when controlling the target having plural internal function control means, whereby the construction and processing of the controller are simplified. Furthermore, this target can deal with a new function of a device which will appear in the future, and the consumer and the controller can support this target.

Furthermore, since the controller doubles as the consumer, the controller and the consumer can share means and data, whereby association between a message and data which are closely related with each other is facilitated. Therefore, memories such as buffers and the processing are simplified, which results in a network control system having a simpler construction.

Furthermore, since the controller transmits a message by using the first protocol to a plug which indicates a data input/output port of the internal function control means of the target and then the target operates according to this message, the relation between the connection of the second protocol and the message is made clear, and moreover, the data flowing on the connection of the second protocol is associated with the message. Since the message is transmitted to the plug, the target can select a controller which handles the transmitted data by using this plug, or permit only control from a specific controller, or restrict a controller which can control the target. Further, the target may be constructed so that connection or disconnection of the internal connection of the target is performed by a plug. Since the controller itself need not establish the internal connection of the target, a network control system having a simplified construction is realized.

Furthermore, since the controller doubles as the consumer, the controller and the consumer can share means and data, whereby memories such as buffers and the processing can be simplified. Further, since the target executes the process which is specified by the message supplied to the plug of the connection of the second protocol, the relation between the instruction from the controller and the output data is made clear, and exclusive control is realized. Thereby, error handling in the case where data has not been received is simplified, whichi results in a network control system having a simpler construction.

Especially when plural pieces of internal function control means exist in the target, these internal function control means output data to different plugs, and receive messages that are directed to the respective internal function control means by the respective plugs, whereby a target having internal; function control means capable of completely synchronous operation is easily constructed.

Furthermore, in the case where an internal function control means is controlled by plural controllers, each internal function control means may be managed so that it is controlled by an arbitrary number of controllers, according to resources or the like of the internal function control means, whereby exclusive control is easily realized.

While the plug of each target internal function control means is described as an output plug in this second embodiment, the plug may be an input plug. To be specific, when the target internal function control means receives a message from the controller which indicates an instruction of reception, the connection management means 1620 initially establishes an internal connection between the plug of the target and the input plug of the target internal function control means according to a request from the first target internal function control means 1621. Then, the plug of the target receives data from the connection of the second protocol, and this data is transmitted from the plug of the target to the input plug of the target internal function control means. Also, in this case, the same effects as mentioned above are achieved.

Likewise, the controller may be constructed so that the controller internal function control means has an output plug, with the same effects as mentioned above.

APPLICABILITY IN INDUSTRY

As described above, in the network control system according to the present invention, mass data such as icon data can be transmitted efficiently, speedily, and reliably, with a relatively simple construction. Further, even when the target spontaneously transmit data, the controller can easily decide what the target has transmitted. Furthermore, the controller, target, and consumer for the network control system are very useful in constituting the above-described network control system.

The invention claimed is:

1. A network control system for transmitting data between devices by using a plurality of data transmission modes in a network in which at least two devices for handling at least one kind of data among video data, audio data, and information data are connected through one transmission line, wherein:
   each of said at least two devices includes either or both of
      at least one target operable to receive a message and perform processing according to the message, and
      at least one controller operable to transmit the message and establish a connection for data transmission with said target;
   said network control system comprises said controller and said target;
   said controller and said target are each connected to one transmission line;
   said plurality of data transmission modes comprise
      a first data transmission mode which comprises a message transmission for transmitting the message and a message response which is a response to the message transmission, and
      a second data transmission mode for data transmission on an established connection;
   said controller is operable to establish, before data transmission, a connection of said second data transmission mode to said target;
   when said controller receives data of the message from said target, said controller is operable to make a data request by using said first data transmission mode;
   said target is operable to transmit the data onto the established connection by using said second data transmission mode according to the data request; and
   said controller is operable to receive the data by using said second data transmission mode.

2. A network control system for transmitting data between devices by using a plurality of data transmission modes in a network in which at least two devices for handling at least one kind of data among video data, audio data, and information data are connected through one transmission line, wherein:
   each of said at least two devices includes either or both of
      at least one target operable to receive a message and perform processing according to the message, and
      at least one controller operable to transmit the message and establish a connection for data transmission with said target;
   said network control system comprises said controller and said target;
   said controller and said target are each connected to one transmission line; said plurality of data transmission modes comprise
      a first data transmission mode which comprises a message transmission for transmitting the message and a message response which is a response to the message transmission, and
      a second data transmission mode for data transmission on an established connection;
   said controller is operable to establish, before data transmission, a connection of said second data transmission mode to said target;
   said target is operable to spontaneously transmit data to said controller through the established connection by using said second data transmission mode; and
   said controller is operable to receive the data by using said second data transmission mode.

3. A network control system for transmitting data between devices by using a plurality of data transmission modes in a network in which at least two devices for handling at least one kind of data among video data, audio data, and information data are connected through one transmission line, wherein:
   each of said at least two devices comprises at least one of
      at least one controller operable to receive and transmit a message,
      at least one target operable to perform processing according to the message, and which includes at least one internal function control means for performing data transmission and a connection management means for connecting an output of said internal function control means,
      a consumer operable to receive data from said target, and an initiator operable to establish a connection for data transmission between said target and said consumer;

said network control system comprises said controller, said target, said consumer and said initiator;

said controller, said target, said consumer and said initiator are each connected to one transmission line;

said plurality of data transmission modes comprise
a first data transmission mode which comprises a message transmission for transmitting the message and a message response which is a response to the message transmission, and
a second data transmission mode for data transmission onto an established connection; and when said internal function control means performs the data transmission, said connection management means in said target connects the output of said internal function control means to a connection of said second data transmission mode according to a request of said internal function control means.

4. A network control system for transmitting data between devices by using a plurality of data transmission modes in a network in which at least two devices for handling at least one kind of data among video data, audio data, and information data are connected through one transmission line, wherein:

each of said at least two devices comprises at least one of
at least one controller operable to receive and transmit a message,
at least one target operable to perform processing according to the message, and which includes at least one internal function control means,
a consumer operable to receive data from said target, and
an initiator operable to establish a connection for data transmission between said target and said consumer;

said network control system comprises said controller, said target, said consumer and said initiator;

said controller, said target, said consumer and said initiator are each connected to one transmission line; said plurality of data transmission modes comprise
a first data transmission mode which comprises a message transmission for transmitting the message and a message response which is a response to the message transmission, and
a second data transmission mode for data transmission on an established connection; and said target is operable to transmit data including an identifier which specifies the output source of the data, on the connection, according to said second data transmission mode.

5. A network control system for transmitting data between devices by using a plurality of data transmission modes in a network in which at least two devices for handling at least one kind of data among video data, audio data, and information data are connected through one transmission line, wherein:

each of said at least two devices comprises at least one of
at least one controller operable to receive and transmit a message,
a target operable to perform processing according to the message,
a consumer operable to receive data from said target, and
an initiator operable to establish a connection for data transmission between said target and said consumer;

said network control system comprises said controller, said target, said consumer and said initiator;

said controller, said target, said consumer and said initiator are each connected to one transmission line;

said plurality of data transmission modes comprise
a first data transmission mode which comprises a message transmission for transmitting the message and a message response which is a response to the message transmission, and
a second data transmission mode for data transmission an established connection;

said controller is operable to transmit an identifier indicating the destination in said consumer, to said target, by using said first data transmission mode; and said target is operable to transmit the data including the identifier which indicates the destination and is received by said first data transmission mode, on the established connection, by using said second data transmission mode.

6. A network control system for transmitting data between devices by using a plurality of data transmission modes in a network in which at least two devices for handling at least one kind of data among video data, audio data, and information data are connected through one transmission line, wherein:

each of said at least two devices comprises at least one of
at least one controller operable to receive and transmit a message,
at least one target operable to perform processing according to the message, and which includes at least one internal function control means,
a consumer operable to receive data from said target, and
an initiator operable to establish a connection for data transmission between said target and said consumer;

said network control system comprises said controller, said target, said consumer, and said initiator;

said controller, said target, said consumer and said initiator are each connected to one transmission line;

said plurality of data transmission modes comprise
a first data transmission mode which comprises a message transmission for transmitting the message and a message response which is a response to the message transmission, and
a second data transmission mode for data transmission on an established connection;

said controller is operable to transmit the message by using said first data transmission mode to a plug through which data is input and output to/from a desired internal function control means of said target; and said target is operable to execute the process specified by the message which is directed to the plug.

7. A network control system as described claim 6 wherein the data transmitted by said second data transmission mode includes version information, and a version of the data is managed by using the version information.

8. A network control system as described claim 6 wherein the data transmitted by said second data transmission mode is information about a graphical user interface which forces said controller to make a notification to a user.

9. A network control system as described claim 6 wherein the data transmitted by said second data transmission mode includes attribute information of the data.

10. A network control system as described in claim 9, wherein the attribute information includes an identifier, size information, and a data section.

11. A network control system as described claim 6 wherein the data transmitted by said second data transmission mode is based on an object as a unit.

12. A network control system as described in claim 11, wherein the object has the same structure as attribute information of the data transmitted by said second data transmission mode.

13. A network control system as described in claim 11, wherein the object has an identifier, size information, and a data section.

14. A network control system as described in claim 11, wherein the object has attribute information in the data section.

15. A network control system as described claim 6 wherein the message includes a message for confirming the data transmission by said second data transmission mode.

16. A controller used in a network control system for transmitting data between devices by using a plurality of data transmission modes in a network in which at least two devices for handling at least one kind of data among video data, audio data, and information data are connected through one transmission line, wherein:
each of said at least two devices includes either or both of
at least one controller operable to transmit a message, and
at least one target operable to receive the message and perform processing according to the message;
said network control system comprises said controller and said target;
said controller and said target are each connected to one transmission line;
a connection for data transmission between said controller and said target is established by said controller;
said plurality of data transmission modes comprise
a first data transmission mode which comprises a message transmission for transmitting the message and a message response which is a response to the message transmission, and
a second data transmission mode for data transmission on an established connection; and
said controller is operable to support said plurality of data transmission modes, to transmit the message by using said first data transmission mode, and to receive the data from the connection by using said second data transmission mode.

17. A controller used in a network control system for transmitting data between devices by using a plurality of data transmission modes in a network in which at least two devices for handling at least one kind of data among video data, audio data, and information data are connected through one transmission line, wherein:
each of said at least two devices includes either or both of
at least one controller operable to transmit a message, and
at least one target operable to receive the message and perform processing according to the message;
said network control system comprises said controller and said target;
said controller and said target are each connected to one transmission line;
a connection for data transmission between said controller and said target is established by said controller;
said plurality of data transmission modes comprise
a first data transmission mode which comprises a message transmission for transmitting the message and a message response which is a response to the message transmission, and
a second data transmission mode for data transmission on an established connection; and
said controller is operable to support said plurality of data transmission modes, to make a data request by using said first data transmission mode, and to receive the data transmitted according to the data request, from the connection, by using said second data transmission mode.

18. A controller used in a network control system for transmitting data between devices by using a plurality of data transmission modes in a network in which at least two devices for handling at least one kind of data among video data, audio data, and information data are connected through one transmission line, wherein:
each of said at least two devices includes either or both of
at least one controller operable to transmit a message, and
at least one target operable to receive the message and perform processing according to the message;
said network control system comprises said controller and said target;
said controller and said target are each connected to one transmission line;
a connection for data transmission between said controller and said target is established by said controller;
said plurality of data transmission modes comprise
a first data transmission mode which comprises a message transmission for transmitting the message and a message response which is a response to the message transmission, and
a second data transmission mode for data transmission on the established connection; and
said controller is operable to support said plurality of data transmission modes, to establish the connection to said target in advance, to make a data request by using said first data transmission mode when receiving data, and to receive the data transmitted according to the data request, from the connection, by using said second data transmission mode.

19. A controller used in a network control system for transmitting data between devices by using a plurality of data transmission modes in a network in which at least two devices for handling at least one kind of data among video data, audio data, and information data are connected through one transmission line, wherein:
each of said at least two devices includes either or both of
at least one controller operable to transmit a message, and
at least one target operable to receive the message and perform processing according to the message;
said network control system comprises said controller and said target;
said controller and said target are each connected to one transmission line;
a connection for data transmission between said controller and the target is established by said controller;
said plurality of data transmission modes comprise
a first data transmission mode which comprises a message transmission for transmitting the message and a message response which is a response to the message transmission, and
a second data transmission mode for data transmission on the established connection; and
said controller is operable to support said plurality of data transmission modes, and to receive the data which is transmitted on the connection spontaneously by said target according to said second data transmission mode.

20. A controller used in a network control system for transmitting data between devices by using a plurality of data transmission modes in a network in which at least two devices for handling at least one kind of data among video data, audio data, and information data are connected through one transmission line, wherein:
- each of said at least two devices includes either or both of
  - at least one controller operable to transmit a message, and
  - at least one target operable to receive the message and perform processing according to the message;
- said network control system comprises said controller and said target;
- said controller and said target are each connected to one transmission line;
- a connection for data transmission between said controller and said target is established by said controller;
- said plurality of data transmission modes comprise
  - a first data transmission mode which comprises a message transmission for transmitting the message and a message response which is a response to the message transmission, and
  - a second data transmission mode for data transmission on the established connection; and
- said controller is operable to support said plurality of data transmission modes, to establish the connection of said second data transmission mode to said target in advance of data transmission, and to receive the data which is transmitted onto the connection spontaneously by said target according to said second data transmission mode.

21. A controller used in a network control system for transmitting data between devices by using a plurality of data transmission modes in a network in which at least two devices for handling at least one kind of data among video data, audio data, and information data are connected through one transmission line, wherein:
- each of said at least two devices includes at least one of
  - at least one controller operable to receive and transmit a message,
  - a target operable to perform processing according to the message,
  - a consumer operable to receive data from said target, and
  - an initiator operable to establish a connection for data transmission between said target and said consumer;
- said plurality of data transmission modes comprise
  - a first data transmission mode which comprises a message transmission for transmitting the message and a message response which is a response to the message transmission, and
  - a second data transmission mode for data transmission on the established connection;
- said network control system comprises said target, said controller, said consumer and said initiator;
- said target is operable to transmit data including an identifier indicating the destination and received by said first data transmission mode, onto the connection, according to said second data transmission mode;
- said target, said controller, said consumer and said initiator are each connected to one transmission line; and
- said controller is operable to transmit the identifier indicating the destination in said consumer, to said target, by using said first data transmission mode.

22. A controller used in a network control system for transmitting data between devices by using a plurality of data transmission modes in a network in which at least two devices for handling at least one kind of data among video data, audio data, and information data are connected through one transmission line, wherein:
- each of said at least two devices includes at least one of
  - at least one controller operable to receive and transmit a message,
  - at least one target operable to perform processing according to the message, and which includes at least one internal function control means,
  - a consumer operable to receive data from said target, and
  - an initiator operable to establish a connection for data transmission between said target and said consumer;
- said plurality of data transmission modes comprise
  - a first data transmission mode which comprises a message transmission for transmitting the message and a message response which is a response to the message transmission, and
  - a second data transmission mode for data transmission on the established connection;
- said network control system comprises said target, said controller, said consumer and said initiator;
- said target is operable to execute a process specified by the message which is directed to a plug through which data is input and output to/from a desired internal function control means of said target;
- said target, said controller, said consumer and said initiator are each connected to one transmission line; and
- said controller is operable to transmit the message to the plug by using said first data transmission mode.

23. A target used in a network control system for transmitting data between devices by using a plurality of data transmission modes in a network in which at least two devices for handling at least one kind of data among video data, audio data, and information data are connected through one transmission line, wherein:
- each of said at least two devices includes at least one of
  - at least one controller operable to transmit a message, and
  - at least one target operable to receive the message and perform processing according to the message;
- said network control system comprises said controller and said target;
- said controller and said target are each connected to one transmission line;
- a connection for data transmission between said controller and said target is established by said controller;
- said plurality of data transmission modes comprise
  - a first data transmission mode which comprises a message transmission for transmitting the message and a message response which is a response to the message transmission, and
  - a second data transmission mode for data transmission on the established connection; and
- said target is operable to support said plurality of data transmission modes, and to transmit the data onto the connection by using said second data transmission mode according to the message received by said first data transmission mode.

24. A target used in a network control system for transmitting data between devices by using a plurality of data transmission modes in a network in which at least two devices for handling at least one kind of data among video data, audio data, and information data are connected through one transmission line, wherein:

each of said at least two devices includes either or both of
  at least one controller operable to transmit a message, and
  at least one target operable to receive the message and to perform processing according to the message;
said network control system comprises said controller and said target;
said controller and said target are each connected to one transmission line;
a connection for data transmission between said controller and said target is established by said controller;
said plurality of data transmission modes comprise
  a first data transmission mode which comprises a message transmission for transmitting the message and a message response which is a response to the message transmission, and
  a second data transmission mode for data transmission on the established connection; and
said target is operable to support said plurality of data transmission modes, and to transmit the data onto the connection by using said second data transmission mode, according to a data request from said controller by using said first data transmission mode.

25. A target used in a network control system for transmitting data between devices by using a plurality of data transmission modes in a network in which at least two devices for handling at least one kind of data among video data, audio data, and information data are connected through one transmission line, wherein:
  said at least two devices includes either or both of
    at least one controller operable to transmit a message, and
    at least one target operable to receive the message and perform processing according to the message;
  said network control system comprises said controller and said target;
  said controller and said target are each connected to one transmission line;
  a connection for data transmission between said controller and said target is established by said controller;
  said plurality of data transmission modes comprise
    a first data transmission mode which comprises a message transmission for transmitting the message and a message response which is a response to the message transmission, and
    a second data transmission mode for data transmission on the established connection; and
  said target has said plurality of data transmission modes, and is operable to spontaneously transmit the data onto the connection by using said second data transmission mode.

26. A target used in a network control system for transmitting data between devices by using a plurality of data transmission modes in a network in which at least two devices for handling at least one kind of data among video data, audio data, and information data are connected through one transmission line, wherein:
  each of said at least two devices includes at least one of
    at least one controller operable to receive and transmit a message,
    at least one target operable to perform processing according to the message, and which includes at least one internal function control means for performing data transmission and connection management means for connecting an output of said internal function control means,
    a consumer operable to receive data from said target, and
    an initiator operable to establish a connection for data transmission between said target and said consumer;
  said network control system comprises said controller, said target, said consumer and said initiator;
  said controller, said target, said consumer and said initiator are each connected to one transmission line;
  said plurality of data transmission modes comprise
    a first data transmission mode which comprises a message transmission for transmitting the message and a message response which is a response to the message transmission, and
    a second data transmission mode for data transmission on the established connection; and
  in said target, when said internal function control means performs the data transmission, said connection management means in said target connects the output of said internal function control means to a connection of said second data transmission mode, according to a request from said internal function control means.

27. A target used in a network control system for transmitting data between devices by using a plurality of data transmission modes in a network in which at least two devices for handling at least one kind of data among video data, audio data, and information data are connected through one transmission line, wherein:
  each of said at least two devices includes at least one of
    at least one controller operable to receive and transmit a message,
    at least one target operable to perform processing according to the message, and which includes at least one internal function control means,
    a consumer operable to receive data from said target, and
    an initiator operable to establish a connection for data transmission between said target and said consumer;
  said network control system comprises said controller, said target, said consumer and said initiator;
  said controller, said target, said consumer and said initiator are each connected to one transmission line;
  said plurality of data transmission modes comprise
    a first data transmission mode which comprises a message transmission for transmitting the message and a message response which is a response to the message transmission, and
    a second data transmission mode for data transmission on the established connection; and
  said target is operable to transmit data including an identifier which specifies an output source of the data, onto the connection, by using said second data transmission mode.

28. A target used in a network control system for transmitting data between devices by using a plurality of data transmission modes in a network in which at least two devices for handling at least one kind of data among video data, audio data, and information data are connected through one transmission line, wherein:
  each of said at least two devices includes at least one of
    at least one controller operable to receive and transmit a message,
    a target operable to perform processing according to the message,
    a consumer operable to receive data from said target, and
    an initiator operable to establish a connection for data transmission between said target and said consumer;

said plurality of data transmission modes comprise
- a first data transmission mode which comprises a message transmission for transmitting the message and a message response which is a response to the message transmission, and
- a second data transmission mode for data transmission on the established connection;

said network control system comprises said controller, said target, said consumer and said initiator;

said controller is operable to transmit, to said target, an identifier indicating a destination in said consumer by using said first data transmission mode;

said controller, said target, said consumer and said initiator are each connected to one transmission line; and said target is operable to transmit the data which includes the identifier indicating the destination and which is received by said first data transmission mode, onto the connection, by using said second data transmission mode.

29. A target used in a network control system for transmitting data between devices by using a plurality of data transmission modes in a network in which at least two devices for handling at least one kind of data among video data, audio data, and information data are connected through one transmission line, wherein:
each of said at least two devices includes at least one of
- at least one controller operable to receive and transmit a message,
- at least one target operable to perform processing according to the message, and which includes at least one internal function control means,
- a consumer operable to receive data from said target, and
- an initiator operable to establish a connection for data transmission between said target and said consumer;

said plurality of data transmission modes comprise
- a first data transmission mode which comprises a message transmission for transmitting the message and a message response which is a response to the message transmission, and
- a second data transmission mode for data transmission on the established connection;

said network control system comprises said controller, said target, said consumer and said initiator;

said controller, said target, said consumer and said initiator are each connected to one transmission line;

said controller is operable to transmit the message by using said first data transmission mode to a plug through which data is input and output to/from a desired internal function control means of said target; and said target is operable to execute the process specified by the message which is directed to the plug.

30. A consumer used in a network control system for transmitting data between devices by using a plurality of data transmission modes in a network in which at least two devices for handling at least one kind of data among video data, audio data, and information data are connected through one transmission line, wherein:
each of said at least two devices includes at least one of said consumer,
- at least one controller operable to receive and transmit a message,
- a target operable to perform processing according to the message, and
- an initiator operable to establish a connection for data transmission between said target and said consumer;

said network control system comprises said controller, said target, said consumer and said initiator;

said controller, said target, said consumer and said initiator are each connected to one transmission line;

said plurality of data transmission modes comprise
- a first data transmission mode which comprises a message transmission for transmitting the message and a message response which is a response to the message transmission, and
- a second data transmission mode for data transmission on the established connection; and said consumer is operable to receive data including an identifier indicating the destination in the consumer, which data is transmitted by said target on the connection by using the second data transmission mode and which is received from said controller by using said first data transmission mode.

31. A network control system for transmitting data between devices by using a plurality of data transmission modes in a network in which at least two devices for handling at least one kind of data among video data, audio data, and information data are connected through one transmission line, wherein:
each of the devices includes either or both of
- at least one controller operable to transmit a message, and
- at least one target operable to receive the message and perform processing according to the message;

said network control system comprises said controller, said target, and an initiator for establishing a connection for data transmission between said controller and said target;

said controller, said target and said initiator are each connected to one transmission line;

said plurality of data transmission modes comprise
- a first data transmission mode which comprises message transmission for transmitting the message and message response which is a response to the message transmission, and
- a second data transmission mode for data transmission onto the connection established by said initiator; and said target is operable to transmit data onto the connection by using said second data transmission mode according to the message received by said first data transmission mode.

32. A network control system for transmitting data between devices by using a plurality of data transmission modes in a network in which at least two devices for handling at least one kind of data among video data, audio data, and information data are connected through one transmission line, wherein:
each of the at least two devices includes either or both of
- at least one target operable to receive a message and perform processing according to the message, and
- at least one controller operable to transmit the message and establish a connection for data transmission with said target;

said network control system comprises said controller, said target and an initiator for establishing a connection for data transmission between said controller and said target;

said controller, said target and said initiator are connected to one transmission line;

said plurality of data transmission modes comprise
- a first data transmission mode which comprises message transmission for transmitting the message and a message response which is a response to the message transmission, and
- a second data transmission mode for data transmission onto the connection;

said initiator is operable to establish, before data transmission, a connection of said second data transmission mode between said controller and said target;

when said controller receives the data from said target, said controller is operable to make a data request by using said first data transmission mode;

said target is operable to transmit the data onto the connection by using said second data transmission mode; and said controller is operable to receive the data by using said second data transmission mode.

33. A network control system for transmitting data between devices by using a plurality of data transmission modes in a network in which at least two devices for handling at least one kind of data among video data, audio data, and information data are connected through one transmission line, wherein:

each of the devices includes either or both of
- at least one controller operable to transmit a message, and
- at least one target which operable to receive the message and perform processing according to the message;

said network control system comprises said controller, said target, and an initiator for establishing a connection for data transmission between said controller and said target;

said controller, said target and said initiator are each connected to one transmission line;

said plurality of data transmission modes comprise
- a first data transmission mode which comprises message transmission for transmitting the message and a message response which is a response to the message transmission, and
- a second data transmission mode for data transmission onto the connection;

said initiator is operable to establish, before data transmission, a connection by using said second data transmission mode between said controller and said target;

said target is operable to spontaneously transmit data to said controller through the connection by using said second data transmission mode; and said controller is operable to receive the data by using said second data transmission mode.

* * * * *